United States Patent
Cooper et al.

(10) Patent No.: US 9,581,998 B2
(45) Date of Patent: Feb. 28, 2017

(54) SYSTEM AND METHOD FOR VEHICLE COMMUNICATION, VEHICLE CONTROL, AND/OR ROUTE INSPECTION

(71) Applicant: General Electric Company, Schenectady, NY (US)

(72) Inventors: Jared Klineman Cooper, Melbourne, FL (US); Eugene Smith, Melbourne, FL (US); Nick David Nagrodsky, Melbourne, FL (US); William Cherrick Schoonmaker, Melbourne, FL (US); Todd William Goodermuth, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/525,326

(22) Filed: Oct. 28, 2014

(65) Prior Publication Data

US 2015/0045993 A1    Feb. 12, 2015

Related U.S. Application Data

(63) Continuation of application No. 14/152,517, filed on Jan. 10, 2014, now Pat. No. 8,903,574, which is a
(Continued)

(51) Int. Cl.
*G05D 1/02* (2006.01)
*G05D 1/00* (2006.01)
(Continued)

(52) U.S. Cl.
CPC ........ *G05D 1/0011* (2013.01); *B61L 15/0027* (2013.01); *B61L 15/0036* (2013.01);
(Continued)

(58) Field of Classification Search
CPC .. G01D 1/0027; G01D 1/0287; G01D 1/0291; G01D 1/0293; G01D 1/0295;
(Continued)

(56) References Cited

U.S. PATENT DOCUMENTS 3,835,950 A    9/1974 Asano et al.
4,442,988 A    4/1984 Laurent et al.
(Continued)

FOREIGN PATENT DOCUMENTS

CN    1451148 A    10/2003
CN    101184059 A    5/2008
(Continued)

OTHER PUBLICATIONS

ISR and WO for PCT/US2010/053471 dated Jan. 21, 2011.
(Continued)

*Primary Examiner* — Thomas G Black
*Assistant Examiner* — Sara Lewandroski
(74) *Attorney, Agent, or Firm* — John A. Kramer; Global Patent Operation

(57) ABSTRACT

In a system and method for communicating data in a locomotive consist or other vehicle consist (comprising at least first and second linked vehicles), a first electronic component in the first vehicle of the vehicle consist is monitored to determine if the component is in (or enters) a failure state. In the failure state, the first electronic component is unable to perform a designated function. Upon determining the failure state, data is transmitted from the first vehicle to a second electronic component on the second vehicle, over a communication channel linking the first vehicle and the second vehicle. The second electronic component is operated based on the transmitted data, with the
(Continued)

second electronic component performing the designated function that the first electronic component is unable to perform.

4 Claims, 24 Drawing Sheets

Related U.S. Application Data continuation-in-part of application No. 12/908,214, filed on Oct. 20, 2010, now Pat. No. 8,645,010, and a continuation-in-part of application No. 13/339,008, filed on Dec. 28, 2011, now abandoned, and a continuation-in-part of application No. 13/478,388, filed on May 23, 2012, now abandoned.

(60) Provisional application No. 61/253,877, filed on Oct. 22, 2009.

(51) Int. Cl.
    G06F 11/20      (2006.01)
    B61L 15/00      (2006.01)
    H04W 84/00      (2009.01)

(52) U.S. Cl.
    CPC .......... *B61L 15/0081* (2013.01); *G06F 11/20* (2013.01); *H04W 84/005* (2013.01)

(58) Field of Classification Search
    CPC .. G01D 1/0289; G05D 1/0027; G05D 1/0287;
                G05D 1/0291; G05D 1/0293; G05D
                1/0295; G05D 1/0289; G05D 1/0011;
                G05D 1/02; G05D 1/021; G05D 1/0223;
                G05D 13/00; H04W 84/005; G08G 1/22;
                G08G 1/161; G08G 1/162; G08G 1/163;
                B60K 31/0058; B60W 30/143; B60W
                30/146; B60W 30/162; B60W 30/165;
                B60W 2710/0605; B60W 2710/0611
    USPC .................................................. 701/29.3, 482
    See application file for complete search history.

(56) References Cited

U.S. PATENT DOCUMENTS

| | | | |
|---|---|---|---|
| 4,476,954 A * | 10/1984 | Johnson ................ B60W 30/18 123/352 |
| 4,582,280 A | 4/1986 | Dahlman et al. |
| 4,700,574 A | 10/1987 | Turbe |
| 5,331,561 A * | 7/1994 | Barrett .................... G05D 1/024 340/903 |
| 5,530,328 A | 6/1996 | Fernandez et al. |
| 5,586,130 A * | 12/1996 | Doyle ..................... G07C 5/085 324/110 |
| 5,684,473 A * | 11/1997 | Hibino ................ B60K 31/0008 180/271 |
| 5,720,455 A | 2/1998 | Kull et al. |
| 5,738,311 A | 4/1998 | Fernandez |
| 5,740,547 A | 4/1998 | Kull et al. |
| 5,785,392 A | 7/1998 | Hart |
| 5,813,635 A | 9/1998 | Fernandez |
| 5,820,226 A | 10/1998 | Hart |
| 5,833,325 A | 11/1998 | Hart |
| 5,927,822 A | 7/1999 | Hart |
| 5,934,764 A | 8/1999 | Dimsa et al. |
| 5,950,967 A | 9/1999 | Montgomery |
| 5,969,643 A | 10/1999 | Curtis |
| 5,978,718 A | 11/1999 | Kull |
| 5,986,577 A | 11/1999 | Bezos |
| 5,986,579 A | 11/1999 | Halvorson |
| 5,995,881 A | 11/1999 | Kull |
| 6,108,732 A | 8/2000 | Klein |
| 6,114,974 A | 9/2000 | Halvorson |
| 6,125,311 A | 9/2000 | Lo |
| 6,128,558 A | 10/2000 | Kernwein |
| 6,128,559 A * | 10/2000 | Saitou ..................... B61L 23/34 340/436 |
| 6,163,089 A | 12/2000 | Kull |
| 6,216,095 B1 | 4/2001 | Glista |
| 6,275,165 B1 | 8/2001 | Bezos |
| 6,322,025 B1 | 11/2001 | Colbert et al. |
| 6,324,659 B1 | 11/2001 | Pierro |
| 6,360,998 B1 | 3/2002 | Halvorson et al. |
| 6,377,215 B1 | 4/2002 | Halvorson et al. |
| 6,401,015 B1 | 6/2002 | Stewart et al. |
| 6,435,624 B1 | 8/2002 | Kull et al. |
| 6,445,150 B1 | 9/2002 | Tanner et al. |
| 6,487,478 B1 | 11/2002 | Azzaro et al. |
| 6,574,748 B1 | 6/2003 | Andress et al. |
| 6,763,292 B1 * | 7/2004 | Smith .................. B60G 17/015 701/1 |
| 6,781,524 B1 | 8/2004 | Clark et al. |
| 6,782,044 B1 | 8/2004 | Wright et al. |
| 7,062,381 B1 | 6/2006 | Rekow et al. |
| 7,117,077 B2 * | 10/2006 | Michi ................ B60K 31/0008 342/71 |
| 7,164,368 B1 | 1/2007 | Ireland |
| 7,264,208 B2 | 9/2007 | Kovach et al. |
| 7,416,262 B2 | 8/2008 | Ring |
| 7,426,657 B2 | 9/2008 | Zorek, Sr. et al. |
| 7,653,465 B1 | 1/2010 | Geiger et al. |
| 7,715,956 B2 | 5/2010 | Bryant |
| 7,725,252 B2 | 5/2010 | Heddebaut et al. |
| 8,095,253 B2 * | 1/2012 | Kane ..................... B61C 17/12 246/182 R |
| 8,157,218 B2 | 4/2012 | Riley et al. |
| 8,264,330 B2 | 9/2012 | Yeldell et al. |
| 8,296,601 B2 | 10/2012 | Hatasaki et al. |
| 8,306,670 B2 | 11/2012 | Oda |
| 8,364,338 B2 | 1/2013 | Peltonen et al. |
| 8,386,830 B2 | 2/2013 | Tameshige et al. |
| 8,428,798 B2 | 4/2013 | Kull |
| 9,108,640 B2 | 8/2015 | Jackson |
| 2001/0029411 A1 | 10/2001 | Hawthorne |
| 2001/0044681 A1 | 11/2001 | Diana et al. |
| 2002/0087578 A1 | 7/2002 | Vroman |
| 2002/0183901 A1 | 12/2002 | Wolf et al. |
| 2003/0009274 A1 | 1/2003 | Peterson, Jr. et al. |
| 2003/0213875 A1 | 11/2003 | Chen et al. |
| 2003/0214417 A1 | 11/2003 | Bryant et al. |
| 2003/0223387 A1 | 12/2003 | Conrath et al. |
| 2004/0044447 A1 * | 3/2004 | Smith ..................... B60L 15/36 701/19 |
| 2004/0100938 A1 | 5/2004 | Aiken et al. |
| 2004/0117073 A1 | 6/2004 | Horst |
| 2005/0024001 A1 | 2/2005 | Donnelly et al. |
| 2005/0060068 A1 | 3/2005 | Ruckser |
| 2005/0099061 A1 | 5/2005 | Hollandsworth et al. |
| 2005/0121971 A1 | 6/2005 | Ring |
| 2005/0125112 A1 | 6/2005 | LaDuc et al. |
| 2005/0125113 A1 | 6/2005 | Wheeler et al. |
| 2005/0165886 A1 * | 7/2005 | Tuer ..................... G08G 1/0962 709/203 |
| 2006/0025903 A1 | 2/2006 | Kumar |
| 2006/0138285 A1 * | 6/2006 | Oleski .................. B61L 25/025 246/167 R |
| 2006/0180709 A1 | 8/2006 | Breton et al. |
| 2007/0093946 A1 * | 4/2007 | Gideoni ............... G05D 1/0027 701/24 |
| 2007/0179681 A1 * | 8/2007 | Shaffer .................. G07C 5/008 701/1 |
| 2007/0233337 A1 * | 10/2007 | Plishner ............... G05D 1/0295 701/23 |
| 2008/0173770 A1 | 7/2008 | Ruggiero et al. |
| 2008/0246338 A1 | 10/2008 | Donnelly et al. |
| 2008/0306640 A1 | 12/2008 | Rosenthal et al. |
| 2009/0037038 A1 | 2/2009 | Mollet et al. |
| 2009/0079839 A1 * | 3/2009 | Fischer .................... G01S 7/003 348/218.1 |
| 2009/0173839 A1 | 7/2009 | Groeneweg et al. |

(56) References Cited

U.S. PATENT DOCUMENTS

| | | | |
|---|---|---|---|
| 2009/0223760 A1* | 9/2009 | Smith | B60T 17/228 188/3 H |
| 2009/0248226 A1 | 10/2009 | Kellner et al. | |
| 2009/0326746 A1 | 12/2009 | Mian | |
| 2010/0049384 A1 | 2/2010 | Kraeling et al. | |
| 2010/0063673 A1* | 3/2010 | Anderson | G05D 1/0287 701/29.2 |
| 2010/0091663 A1 | 4/2010 | Takeyama et al. | |
| 2010/0145557 A1 | 6/2010 | Katzer | |
| 2010/0217462 A1 | 8/2010 | Shaffer et al. | |
| 2010/0241295 A1 | 9/2010 | Cooper et al. | |
| 2010/0256852 A1* | 10/2010 | Mudalige | G08G 1/22 701/24 |
| 2010/0286853 A1 | 11/2010 | Goodermuth et al. | |
| 2011/0027378 A1 | 2/2011 | Pendharkar et al. | |
| 2011/0107138 A1 | 5/2011 | Tameshige et al. | |
| 2011/0183605 A1 | 7/2011 | Smith, Jr. et al. | |
| 2011/0185010 A1 | 7/2011 | Shatsky et al. | |
| 2011/0224844 A1* | 9/2011 | Farwell | G05D 1/0295 701/2 |
| 2011/0284700 A1 | 11/2011 | Brand et al. | |
| 2012/0078452 A1 | 3/2012 | Daum et al. | |
| 2012/0078453 A1 | 3/2012 | Daum et al. | |

FOREIGN PATENT DOCUMENTS

| | | | | |
|---|---|---|---|---|
| DE | WO 2004077378 A1 * | 9/2004 | | G05D 1/0295 |
| DE | 202010006811 U1 | 7/2010 | | |
| EP | 1719688 | 6/2007 | | |
| EP | 1886893 | 2/2008 | | |
| KR | 20110039071 | 4/2011 | | |
| KZ | 386 U | 8/2008 | | |
| RU | 2025310 C1 | 12/1994 | | |
| RU | 2238860 C1 | 10/2004 | | |
| WO | 9960735 A1 | 11/1999 | | |
| WO | 0076828 A1 | 12/2000 | | |
| WO | 2007095401 | 8/2007 | | |
| WO | 2007095402 A2 | 8/2007 | | |
| WO | 2010039680 A1 | 4/2010 | | |
| WO | 2012021225 A2 | 2/2012 | | |
| WO | 2014026086 A2 | 2/2014 | | |
| ZA | 200101708 A | 8/2001 | | |

OTHER PUBLICATIONS

Will Knight; 10-4, Good Computer: Automated System Lets Trucks Convoy as One; A recent demonstration involving two trucks tethered by computer control shows how automation and vehicle-to-vehicle communication are creeping onto the roads; http://www.technologyreview.com/news/527476/10-4-good-computer-automated-system-lets-trucks-convoy-as-one/.

US Non-Final OA issued in connection with related U.S. Appl. No. 11/183,369 on Oct. 14, 2008.

US Final OA issued in connection with related U.S. Appl. No. 11/183,369 on Oct. 15, 2009.

US Non-Final OA issued in connection with related U.S. Appl. No. 11/183,369 on Jun. 25, 2012.

PCT Search Report and Written Opinion issued in connection with related PCT Application No. PCT/US2012/043579 on Nov. 26, 2012.

US Final OA issued in connection with related U.S. Appl. No. 11/183,369 on Jan. 22, 2013.

US Non-Final OA issued in connection with related U.S. Appl. No. 14/679,462 on Dec. 4, 2015.

US Non-Final OA issued in connection with related U.S. Appl. No. 13/900,307 on Feb. 3, 2016.

US Final OA issued in connection with related U.S. Appl. No. 14/679,462 on Jun. 1, 2016.

McCartney et al., "Redundancy in measurement systems", World Pipelines, pp. 27-30, Feb. 2003.

Agenjos et al., "Energy Efficiency in Railways: Energy Storage and Electric Generation in Diesel Electric Locomotives", 20th International Conference on Electricity Distribution, Prague, pp. 1-7, Jun. 8-11, 2009.

Chang et al., "Forward Error Correction for 100 G Transport Networks", IEEE Communications Magazine, pp. 1-8, Mar. 2010.

Unofficial English Translation of Chinese Office Action issued in connection with related CN Application No. 201080059233.9 on Apr. 3, 2014.

PCT Search Report and Written Opinion issued in connection with related PCT Application No. PCT/US2013/037951 on May 2, 2014.

US Non-Final OA issued in connection with related U.S. Appl. No. 13/960,053 on Aug. 12, 2014.

US Final OA issued in connection with related U.S. Appl. No. 13/960,053 on Jan. 6, 2015.

KZ Office Action issued in connection with related KZ Application No. 2014/1501.1 on Mar. 5, 2015.

EA Office Action issued in connection with related EA Application No. 201290166 on Mar. 21, 2015.

Chinese Office Action issued in connection with related CN Application No. 2013800266526.6 on Jul. 24, 2015.

KZ Office Action issued in connection with related KZ Application No. 2014/1623.1 on Oct. 29, 2015.

* cited by examiner

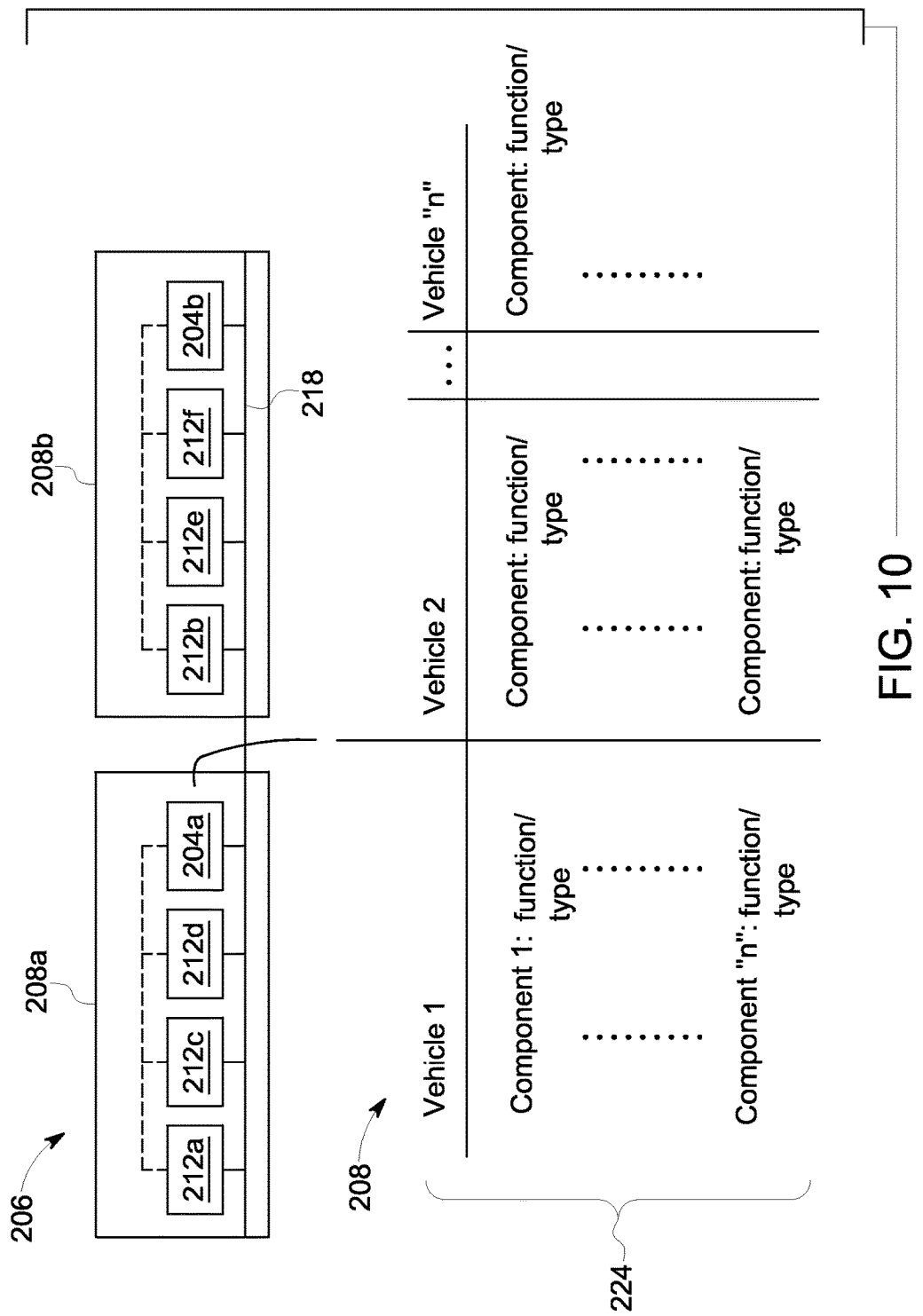

SYSTEM AND METHOD FOR VEHICLE COMMUNICATION, VEHICLE CONTROL, AND/OR ROUTE INSPECTION

CROSS-REFERENCE TO RELATED APPLICATIONS

This application is a continuation of U.S. patent application Ser. No. 14/152,517, which was filed on 10 Jan. 2014, and is titled "System And Method For Vehicle Communication, Vehicle Control, And/Or Route Inspection (the '517 Application").

The '517 Application is a continuation-in-part of U.S. patent application Ser. No. 12/908,214, which was filed on 20 Oct. 2010, and is titled "System And Method For Locomotive Inter-Consist Equipment Sparing And Redundancy" (the "'214 Application"), now U.S. Pat. No. 8,645,010 issued 4 Feb. 2014, and is a continuation-in-part of U.S. patent application Ser. No. 13/339,008, which was filed on 28 Dec. 2011, and is titled "System And Method For Rail Vehicle Control" (the "'008 Application"), now abandoned, and is a continuation-in-part of U.S. patent application Ser. No. 13/478,388, which was filed on 23 May 2012, and is titled "System And Method For Inspecting A Route During Movement Of A Vehicle System Over The Route" (the "'388 Application"), now abandoned.

The '214 Application claims priority to U.S. Provisional Application Ser. No. 61/253,877, which was filed on 22 Oct. 2009 (the "'877 Application").

The entire disclosures of the '517 Application, the '214 Application, the '877 Application, the '008 Application, and the '388 Application are incorporated by reference.

FIELD

The subject matter described herein relates to data communications, including but not limited to data communications in a locomotive consist or other vehicle consist.

BACKGROUND

A locomotive "consist" is a group of two or more locomotives that are mechanically coupled or linked together to travel along a route. Trains may have one or more locomotive consists. Locomotives in a consist include a lead locomotive and one or more trail locomotives. A train will have at least one lead consist, and may also have one or more remote consists positioned further back in the train. More generally, a "vehicle consist" is a group of locomotives or other vehicles that are mechanically coupled or linked together to travel along a route, e.g., the route may be defined by a set of one or more rails, with each vehicle in the consist being adjacent to one or more other vehicles in the consist.

A locomotive will typically include a number of different electro-mechanical and electrical systems. These systems include a plurality of different electronic components, which process or otherwise utilize data/information for locomotive operational purposes. Examples of electronic components in a locomotive include data and voice radios and other communication equipment, positioning equipment (e.g., GPS components), data and video recorders, engine control systems, navigation equipment, and on-board computer and other computer systems.

Certain electrical components may be part of a critical or vital system in a locomotive. In a critical or vital system, one or more functions of the system must be performed with a very low likelihood of failure, and/or with a very long projected mean time between system failures, for safety purposes or otherwise. To achieve this, for those electronic components that carry out a vital function, a locomotive must be outfitted with redundant electronic components. This can greatly increase the costs associated with implementing vital systems in a locomotive. Additionally, even with redundant components in a locomotive, a vital system is still subject to failure if both the primary and redundant components fail.

Some vehicles in a consist may be outfitted with various functional components, such as throttling, steering and braking systems, as well as traction control systems and air compressor systems that facilitate operation of the components and systems of the consist. In connection with these systems, one or more rail vehicles in a rail vehicle consist may contain non-propulsion consumable resources that are utilized by one or more of these systems. For example, certain vehicles in the consist may carry sand or other tractive material in sand reservoirs or hoppers that is dispensed during travel to increase tractive effort. In particular, at various times throughout travel of the consist, sand may be dispensed from one or more of the rail vehicles onto the rail of the track to increase adhesion between the wheels of the rail vehicle and the track. Additionally, certain locomotives or other vehicles may include an air compressor for pressurizing air to be used for use with one or more operational systems, such as braking systems and tractive effort systems, as is known in the art.

Throughout travel, however, one or more vehicles may be exhausted of their consumable resources before other vehicles in the consist as a result of various operational demands. Moreover, throughout many cycles of use over an extended period of time, such tractive effort systems and air compressor systems may begin to exhibit signs of wear, requiring service or replacement. As will be appreciated, however, a system on one rail vehicle may exhibit wear at a different time, e.g., sooner or later, than the same type of system on another vehicle based upon differing frequencies of use. Accordingly, there is a need for a system and method for vehicle control that are different from systems and methods currently available.

Additionally, some known inspection systems are used to examine routes traveled by vehicles for damage. For example, a variety of handheld, trackside, and vehicle mounted systems are used to examine railroad tracks for damage, such as cracks, pitting, or breaks. These systems are used to identify damage to the tracks prior to the damage becoming severe enough to cause accidents by vehicles on the tracks. Once the systems identify the damage, maintenance can be scheduled to repair or replace the damaged portion of the tracks.

Some known handheld inspection systems are carried by a human operator as the operator walks alongside the route. Such systems are relatively slow and are not useful for inspecting the route over relatively long distances. Some known trackside inspection systems use electronic currents transmitted through the rails of a track to inspect for broken rails. But, these systems are fixed in location and may be unable to inspect for a variety of other types of damage to the track other than broken rails.

Some known vehicle mounted inspection systems use sensors coupled to a vehicle that travels along the route. The sensors obtain ultrasound or optic data related to the route. The data is later inspected to determine damage to the route. But, some of these systems involve specially designed vehicles in order to obtain the data from the route. These vehicles are dedicated to inspecting the route and are not used for transferring large amounts of cargo or passengers long distances. Consequently, these types of vehicles add to the cost and maintenance of a fleet of vehicles without contributing to the capacity of the fleet to convey cargo or passengers.

Others of these types of vehicle mounted systems may be limited by using only a single type of sensor. Still others of these vehicle mounted inspection systems are limited in the types of sensors that can be used due to the relatively fast travel of the vehicles. For example, some sensors may require relatively slow traveling vehicles, which may be appropriate for specially designed vehicles but not for other vehicles, such as cargo or passenger trains having the sensors mounted thereto. The specially designed vehicles can be relatively expensive and add to the cost and maintenance of a fleet of vehicles.

BRIEF DESCRIPTION

In an embodiment, a system comprises a first radio communication unit configured to be disposed onboard a first vehicle, and a second radio communication unit configured to be disposed onboard a second vehicle. The first radio communication unit and the second radio communication unit are configured to wirelessly communicate command data between the first vehicle and the second vehicle, the command data including information used to remotely control movement operations of the second vehicle from the first vehicle as the first vehicle and the second vehicle travel together as a group.

In another embodiment, a method comprises generating command data onboard a first vehicle that travels along a road with a second vehicle in a group; wirelessly communicating the command data from the first vehicle to the second vehicle via a first radio communication unit onboard the first vehicle and a second radio communication unit onboard the second vehicle; and remotely controlling movement operations of the second vehicle from the first vehicle as the first vehicle and the second vehicle travel together as the group.

In another embodiment, a system comprises a first radio communication unit configured to be disposed onboard a first vehicle traveling along a road, and a first electronic component configured to be disposed onboard the first vehicle and to process one or more of operational data, voice data, or command data according to a first function to control operations of the first vehicle. The system further comprises a second radio communication unit configured to be disposed onboard a second vehicle traveling along the road, the first vehicle and the second vehicle traveling along the road together in a group formed by a wireless communication link between the first radio communication unit and the second radio communication unit, and a second electronic component configured to be disposed onboard the second vehicle and to process the one or more of the operational data, voice data, or command data according to the first function to control operations of the second vehicle. Responsive to the first electronic component entering a failure state, the second electronic component is configured to receive the one or more of operational data, voice data, or command data from the first radio communication unit, to process the one or more of operational data, voice data, or command data according to the first function, and to direct the second radio communication unit to communicate the one or more of operational data, voice data, or command data that is processed onboard the second vehicle to the first vehicle.

In another embodiment, a system comprises a first radio communication unit configured to be disposed onboard a first vehicle, the first radio communication unit configured to wirelessly communicate command data with a second radio communication unit disposed onboard a second vehicle, the command data including information used to remotely control movement operations of the second vehicle from the first vehicle as the first vehicle and the second vehicle travel together as a group.

BRIEF DESCRIPTION OF THE DRAWINGS

The inventive subject matter described herein will be better understood from reading the following description of non-limiting embodiments, with reference to the attached drawings, wherein below:

FIG. 10 is a schematic diagram of an additional embodiment of the system shown in FIG. 8A;

DETAILED DESCRIPTION

Figure 1:
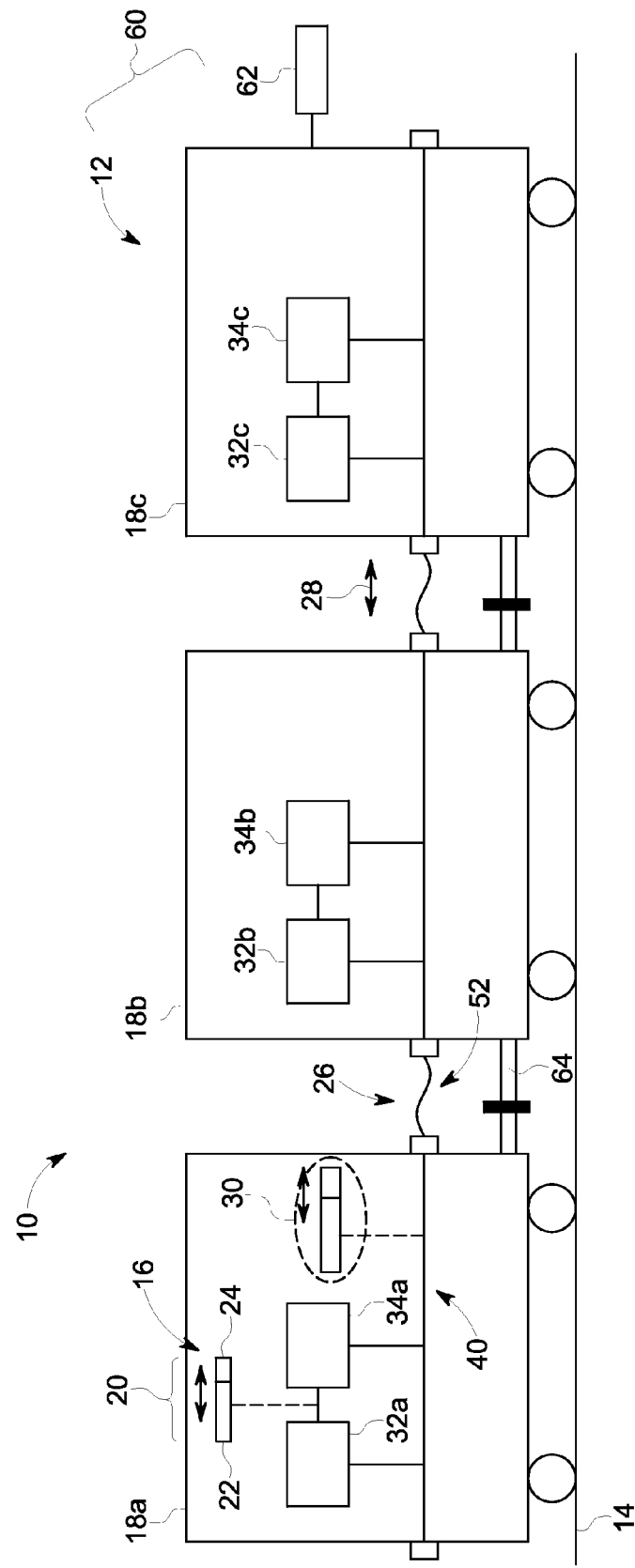
FIG. 1 is a schematic diagram of a communication system for communicating data in a vehicle consist, according to an embodiment of the inventive subject matter.

Reference will be made below in detail to exemplary embodiments of the inventive subject matter, examples of which are illustrated in the accompanying drawings. Wherever possible, the same reference numerals used throughout the drawings refer to the same or like parts. Although exemplary embodiments of the inventive subject matter are described with respect to trains, locomotives, and other rail vehicles, embodiments of the inventive subject matter are also applicable for use with vehicles generally, such as off-highway vehicles (e.g., vehicles that are not designed or permitted to travel on public roadways), agricultural vehicles, and/or transportation vehicles, each of which may include a vehicle consist. As noted above, a vehicle consist is a group of locomotives or other vehicles that are mechanically coupled or linked together to travel along a route, with each vehicle in the consist being adjacent to one or more other vehicles in the consist.

Embodiments of the inventive subject matter relate to systems (e.g., system 200, 270) and methods for communicating data in a locomotive consist or other vehicle consist, for inter-consist equipment sparing and redundancy. With initial reference to FIGS. 8A and 9A-9C in overview, an embodiment of the method comprises, at step 210a, receiving, at a second vehicle 208b in a vehicle consist 206, first data 216 related to a first vehicle 208a in the vehicle consist. (Data "related" to a vehicle means data originating from the vehicle, and/or data addressed to other otherwise intended for the vehicle, and/or data about the vehicle, and/or data used as a basis, indirect or direct, for controlling the vehicle.) The vehicle consist 206 comprises at least the first vehicle 208a and the second vehicle 208b, with each vehicle 208a, 208b, 208c in the consist being adjacent to and mechanically coupled with one or more other vehicles in the consist. The first vehicle and the second vehicle are linked by a communication channel (e.g., wireless or wired). As indicated at step 210b, the method further comprises, in a second electronic component 212b on board the second vehicle 208b, processing the first data 216 according to a function unavailable to the first vehicle 208a. (An "unavailable" function is one which the first vehicle is unable to perform, due to the first vehicle not being equipped to perform the function or due to a failure, e.g., of an electronic component, on board the first vehicle.)

Figure 9A:
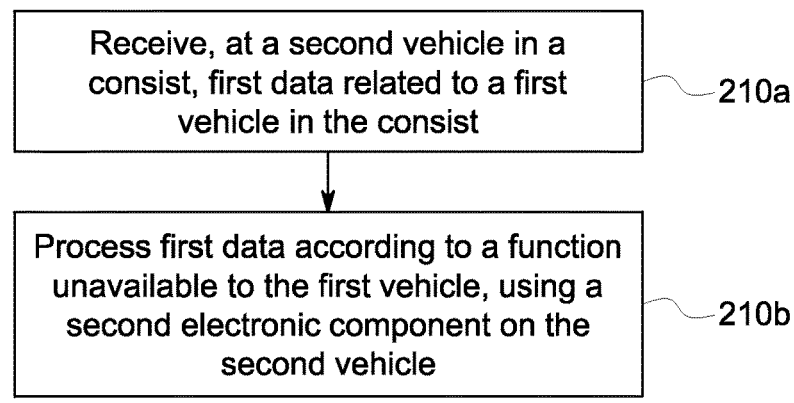
Figure 9B:
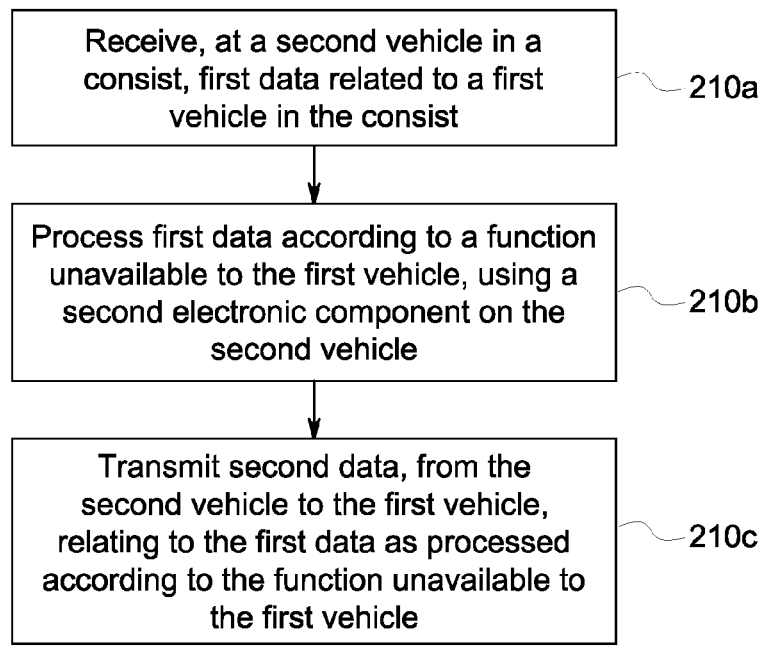

In another embodiment, with reference to FIG. 9B, the method further comprises a step 210c of transmitting second data 222 from the second vehicle 208b to the first vehicle 208a over the communication channel. Alternatively, the second data 222 may be transmitted from the second vehicle to a destination other than the first vehicle, such as an off-consist location. The second data 222 relates to the first data as processed according to the function unavailable to the first vehicle.

Figure 9C:
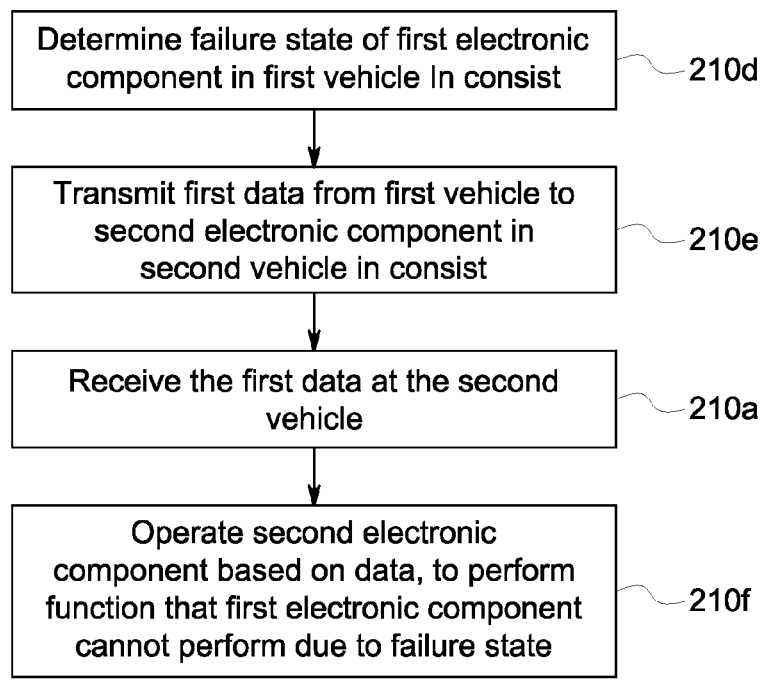

In another embodiment, with reference to FIG. 9C, a method comprises a step 210d of determining that a first electronic component 212a in the first vehicle 208a of the vehicle consist 206 is in a failure state. "Failure state," or characterizing an electronic component as "having failed" or "has failed," refers to a state or condition of the first electronic component 212a where the first electronic component 212a is unable to perform a designated function, including being unable to perform the function at all, or being unable to perform the function in a manner that meets designated performance requirements. Upon determining the failure state, at step 210e, first data 216 is transmitted from the first vehicle 208a to a second electronic component 212b on the second vehicle 208b, over a cable bus 218 or other communication channel (e.g., wireless) linking the first vehicle and the second vehicle. The first data 216 may be data related to the first vehicle 208a, such as data that was intended or designated for receipt and/or processing by the first electronic component 212a and/or control data (e.g., control instructions) originating from the first vehicle and used for controlling the second electronic component 212b, and/or other data. At step 210f, the second electronic component 212b is operated based on the first data 216 (e.g., it performs some function on or according to the data), for performing the designated function that the first electronic component 212a is unable to perform.

In this manner, the sparing and redundancy system 200 is able to remote "spare" or "swap" equipment between locomotives or other vehicles in a consist. If an electronic component connected to the cable bus or other communication channel (which in one embodiment is configured as part of a network, as described above) fails in one vehicle, a similar electronic component in another vehicle is used instead, through coordination of control functions and transfer of data over the cable bus or other communication channel (e.g., network) as facilitated by the control coordination systems. Advantageously, this provides a higher degree of dispatch reliability and lower costs to equip a locomotive or other vehicle, since each vehicle will not require redundant equipment. The redundancy is automatically provided by having multiple vehicles in the consist. (An electronic component is "similar" to another electronic component if it can perform one or more functions of the other electronic component, such as the designated function the failed component is unable to perform, within designated tolerance/performance levels.)

In the system(s) and method(s) for inter-consist equipment sparing and redundancy, data is transmitted between locomotives or other vehicles in a consist, over a communication channel linking the vehicles in the consist. The communication channel may be implemented using wireless technology (e.g., each vehicle is outfitted with a radio transceiver), a communication system such as described below in regards to FIGS. 1-6, or another type of electrical cable system (e.g., electrical conductors that extend between and interconnect the vehicles for communication purposes).

The communication system of FIGS. 1-6 will now be described in detail, as one example. The system and method for inter-consist equipment sparing and redundancy is further described below.

FIG. 1 shows a communication system 10 and method for communicating data in a locomotive consist 12. The consist comprises a group of vehicles 18a-18c (e.g., locomotives) that are mechanically coupled or linked together to travel along a railway 14. In the system 10, network or other data 16 is transmitted from one locomotive 18a in the consist 12 (e.g., a lead locomotive 18a) to another locomotive 18b in the consist (e.g., a trail locomotive 18b). As used herein, the term "leading" is meant to indicate that the vehicle, sensor, or other component travels over a location along the route ahead of (e.g., before) another vehicle, sensor, or other component (e.g., a "trailing" sensor, vehicle, or component) for a direction of travel. Each locomotive 18a-18c is adjacent to and mechanically coupled with another locomotive in the consist 12 such that all locomotives in the consist are connected. "Network data" 16 refers to data that is packaged in packet form, meaning a data packet that comprises a set of associated data bits 20. (Each data packet may include a data field 22 and a network address or other address 24 uniquely associated with a computer unit or other electronic component in the consist 12.) The network data 16 is transmitted over a locomotive multiple unit (MU) cable bus 26. The MU cable bus 26 is an existing electrical bus interconnecting the lead locomotive 18a and the trail locomotives 18b, 18c in the consist. The MU cable bus 26 is used in the locomotive consist 12 for transferring non-network control information 28 between locomotives in the consist. "Non-network" control information 28 refers to data or other information, used in the locomotive consist for control purposes, which is not packet data. In another aspect, non-network control information 28 is not packet data, and does not include recipient network addresses. In another aspect, non-network control information is low bandwidth or very low bandwidth data.

In another embodiment, as discussed in more detail below, the network data 16 is converted into modulated network data 30 for transmission over the MU cable bus 26. The modulated network data 30 is orthogonal to the non-network control information 28 transferred between locomotives over the MU cable bus 26, to avoid interference. At recipient/subsequent locomotives, the modulated network data 30 is received over the MU cable bus 26 and de-modulated for use by a locomotive electronic component 32a, 32b, 32c. For these functions, the communication system 10 may comprise respective router transceiver units 34a, 34b, 34c positioned in the lead locomotive 18a and each of the trail or remote locomotives 18b, 18c in the locomotive consist 12.

Figure 2:
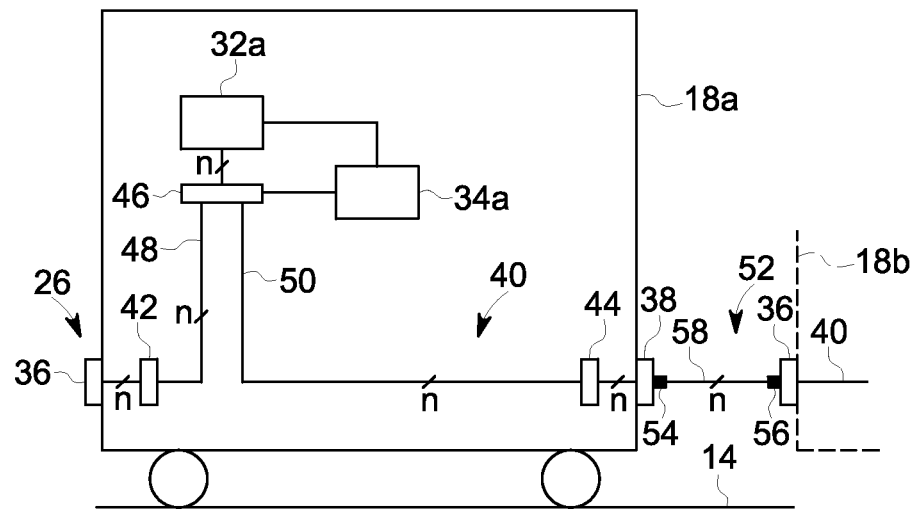
FIG. 2 is a schematic diagram of a multiple unit (MU) cable bus in a vehicle, shown in the context of the communication system of FIG. 1.

One example of an MU cable bus 26 is shown in more detail in FIG. 2. Other configurations are possible, depending on the type of locomotive involved. As noted above, the MU cable bus 26 is an existing electrical bus interconnecting the lead locomotive 18a and the trail locomotives 18b, 18c in the consist. In each locomotive, e.g., the lead locomotive 18a as shown in FIG. 2, the MU cable bus 26 comprises a front MU port 36, a rear MU port 38, and an internal MU electrical system 40 that connects the front port 36 and the rear port 38 to one or more electronic components 32a of the locomotive 18a. In the illustrated example, the internal MU electrical system 40 comprises a front terminal board 42 electrically connected to the front MU port 36, a rear terminal board 44 electrically connected to the rear MU port 38, a central terminal board 46, and first and second electrical conduit portions 48, 50 electrically connecting the central terminal board 46 to the front terminal board 42 and the rear terminal board 44, respectively. The one or more electronic components 32a of the locomotive 18a may be electrically connected to the central terminal board 46, and thereby to the MU cable bus 26 generally. Although the front MU port 36 and rear MU port 38 may be located generally at the front and rear of the locomotive 18a, this is not always the case, and designations such as "front," "rear," "central," etc. are not meant to be limiting but are instead provided for identification purposes.

Figure 3:
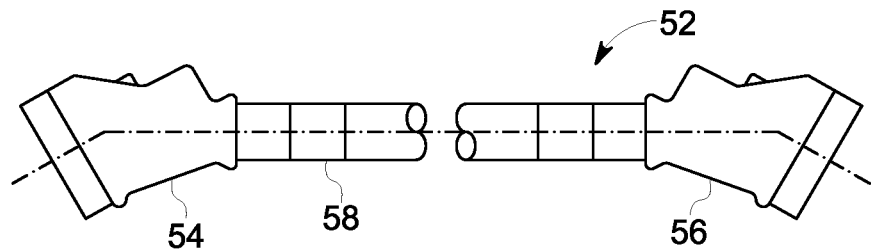
FIGS. 3 and 7 are schematic diagram of MU cable jumpers.

As shown in FIGS. 2 and 3, the MU cable bus 26 further comprises an MU cable jumper 52. The jumper 52 comprises first and second plug ends 54, 56 and a flexible cable portion 58 electrically and mechanically connecting the plug ends together. The plug ends 54, 56 fit into the MU ports 36, 38. The MU cable jumper 52 may be electrically symmetrical, meaning either plug end can be attached to either port. The MU cable jumper 52 is used to electrically interconnect the internal MU electrical systems 40 of adjacent locomotives 18a, 18b. As such, for each adjacent pair of locomotives 18a, 18b, one plug end 54 of an MU cable jumper 52 is attached to the rear MU port 28 of the front locomotive 18a, and the other plug end 56 of the MU cable jumper 52 is attached to the front MU port 36 of the rear locomotive 18b. The flexible cable portion 58 of the MU cable jumper 52 extends between the two plug ends, providing a flexible but secure electrical connection between the two locomotives 18a, 18b.

Depending on the particular type and configuration of locomotive, the electrical conduit portions 48, 50 and MU cable jumpers 52 may be configured in different manners, in terms of the number "n" ("n" is a real whole number equal to or greater than 1) and type of discrete electrical pathways included in the conduit or jumper. In one example, each conduit portion 48, 50 and the jumper cable portion 58 comprises a plurality of discrete electrical wires, such as 12-14 gauge copper wires. In another example, the cable portion 58 (of the MU cable jumper 52) comprises a plurality of discrete electrical wires, while the conduit portions 48, 50 each include one or more discrete electrical wires and/or non-wire electrical pathways, such as conductive structural components of the locomotive, pathways through or including electrical or electronic components, circuit board traces, or the like. Although certain elements in FIG. 2 are shown as including "n" discrete electrical pathways, it should be appreciated that the number of discrete pathways in each element may be different, i.e., "n" may be the same or different for each element.

As noted, the plug ends 54, 56 of the MU cable jumper 52 fit into the MU ports 36, 38. For this purpose, the plug ends and MU ports are complementary in shape to one another, both for mechanical and electrical attachment. The plug end 54, 56 may include a plurality of electrical pins, each of which fits into a corresponding electrical socket in an MU port. The number of pins and sockets may depend on the number of discrete electrical pathways extant in the internal electrical conduits 40, MU cable jumpers 52, etc. In one example, each plug end 54, 56 is a twenty seven-pin plug.

The central terminal board 46, front terminal board 42, and rear terminal board 44 each comprise an insulating base (attached to the locomotive) on which terminals for wires or cables have been mounted. This provides flexibility in terms of connecting different electronic components to the MU cable bus.

The MU cable bus 26 is used in the locomotive consist 12 for transferring non-network control information 28 between locomotives 18a, 18b, 18c in the consist. As noted above, "non-network" control information 28 is data or other information, used in the locomotive consist for control purposes, which is not packet data. In another aspect, non-network control information 28 is not packet data, and does not include recipient network addresses. In another aspect, non-network control information is low bandwidth or very low bandwidth. The non-network control information 28 is transmitted over the MU cable bus 26 according to a designated voltage carrier signal (e.g., a 74 volt on/off signal, wherein 0V represents a digital "0" value and +74 volts a digital "1" value or an analog signal 0 to 74 volts, wherein the 0 to 74 volt voltage level may represent a specific level or percentage of functionality). The non-network control information is transmitted and received using one or more electronic components 32a-32c in each locomotive that are configured for this purpose.

The term "MU cable bus" refers to the entire MU cable bus or any portion(s) thereof, e.g., terminal boards, ports, jumper cable, conduit portions, and the like. As should be appreciated, when two locomotives are connected via an MU cable jumper 52, both the MU cable jumper 52 and the internal MU electrical systems 40 of the two locomotives together form the MU cable bus. As subsequent locomotives are attached using additional MU cable jumpers 52, those cable jumpers and the internal MU electrical systems 40 of the subsequent locomotives also become part of the MU cable bus.

As indicated in FIG. 1, the locomotive consist 12 may be part of a train 60 that includes the locomotive consist 12, a plurality of railcars 62, and possibly additional locomotives or locomotive consists (not shown). Each locomotive 18a-18c in the consist 12 is mechanically coupled to at least one other, adjacent locomotive in the consist 12, through a coupler 64. The railcars 62 are similarly mechanically coupled together and to the locomotive consist to form a series of linked vehicles. The non-network control information may be used for locomotive control purposes or for other control purposes in the train 60.

As discussed above, the communication system 10 may comprise respective router transceiver units 34a, 34b, 34c positioned in the lead locomotive 18a and each of the trail locomotives 18b, 18c in the locomotive consist 12. The router transceiver units 34a, 34b, 34c are each electrically coupled to the MU cable bus 26. The router transceiver units 34a, 34b, 34c are configured to transmit and/or receive network data 16 over the MU cable bus 26. In one embodiment, each router transceiver unit receives network data 16 from a computer unit or other electronic component 32a, 32b, 32c in the locomotive consist 12, and modulates the received network data 16 into modulated network data 30 for transmission over the MU cable bus 26. Similarly, each router transceiver unit 34a, 34b, 34c receives modulated network data 30 over the MU cable bus 26 and de-modulates the received modulated network data 30 into network data 16. "Modulated" means converted from one form to a second, different form suitable for transmission over the MU cable bus 26. "De-modulated" means converted from the second form back into the first form. The modulated network data 30 is orthogonal to the non-network control information 28 transferred between locomotives over the MU cable bus 26. "Orthogonal" means that the modulated network data does not interfere with the non-network control information, and that the non-network control information does not interfere with the modulated network data (at least not to the extent that would corrupt the data). At recipient/subsequent locomotives, the modulated network data 30 is received over the MU cable bus 26 and de-modulated back into the network data 16 for use by a locomotive electronic component 32a, 32b, 32c.

The network data 16 is data that is packaged in packet form, meaning a data packet that comprises a set of associated data bits 20. Each data packet 20 may include a data field 22 and a network address or other address 24 uniquely associated with a computer unit or other electronic component 32a-32c in the consist 12. The network data 16 may be TCP/IP-formatted or SIP-formatted data, however, the electronic components and/or router transceiver units may use other communications protocols for communicating network data. As should be appreciated, the MU cable bus 26, electronic component 32a-32c, and router transceiver units 34a-34c together form a local area network. In one embodiment, these components are configured to form an Ethernet network.

Figure 4:
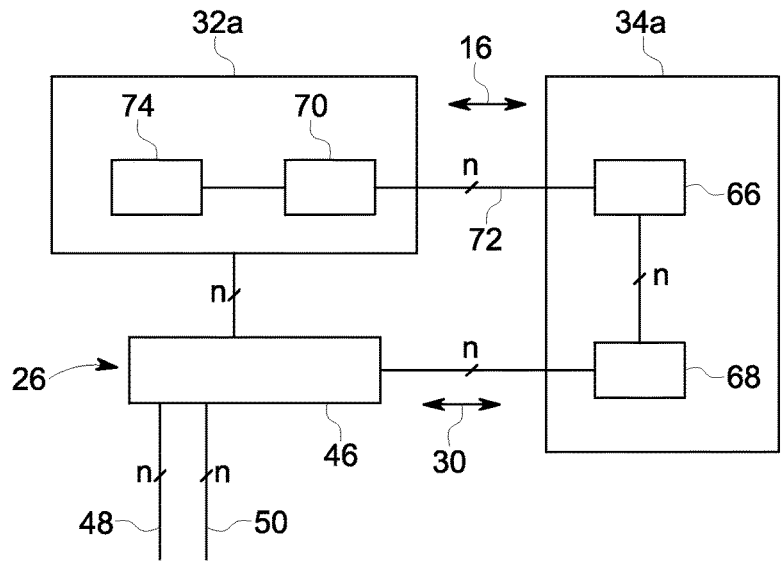
FIG. 4 is a schematic diagram of a router transceiver unit according to an embodiment of the inventive subject matter.

FIG. 4 shows one embodiment of a router transceiver unit 34a in more detail. The router transceiver unit 34a comprises a network adapter module 66 and a signal modulator module 68. The signal modulator module 68 is electrically connected to the network adapter module 66 and to the MU cable bus 26. In the example shown in FIG. 4, the signal modulator module 68 is electrically connected to the MU cable bus 26 by way of the central terminal board 46, near a locomotive electronic component 32a. The network adapter module 66 is electrically connected to a network interface unit 70 that is part of and/or operably connected to the electronic component 32a. (The electronic component 32a may be, for example, a computer unit for controlling a locomotive.) The network adapter module 66 and network interface unit 70 are electrically interconnected by a network cable 72. For example, if the network adapter module 66 and network interface unit 70 are configured as an Ethernet local area network, the network cable 72 may be a CAT-5E cable. The network interface unit 70 is functionally connected to one or more software or hardware applications 74 in the electronic component 32a that are configured for network communications. In one embodiment, the network interface unit 70, network cable 72, and software or hardware applications 74 include standard Ethernet-ready (or other network) components. For example, if the electronic component 32a is a computer unit, the network interface unit 70 may be an Ethernet adapter connected to computer unit for carrying out network communications.

The network adapter module 66 is configured to receive network data 16 from the network interface unit 70 over the network cable 72. The network adapter module 66 conveys the network data 16 to the signal modulator module 68, which modulates the network data 16 into modulated network data 30 and transmits the modulated network data 30 over the MU cable bus 26. The signal modulator module 68 also receives modulated network data 30 from over the MU cable bus 26 and de-modulates the modulated network data 30 into network data 16, which it then conveys to the network adapter module 66 for transmission to the network interface unit 70. One or both of the network adapter module 66 and the signal modulator module 68 may perform various processing steps on the network data 16 and/or the modulated network data 30 for transmission and reception both over the MU cable bus 26 and/or over the network cable 72 (to the network interface unit 70). Additionally, one both of the network adapter module 66 and the signal modulator module 68 may perform network data routing functions.

The signal modulator module 68 includes an electrical output (e.g., port, wires) for electrical connection to the MU cable bus 26, and internal circuitry (e.g., electrical and isolation components, microcontroller, software/firmware) for receiving network data 16 from the network adapter module 66, modulating the network data 16 into modulated network data 30, transmitting the modulated network data 30 over the MU cable bus 26, receiving modulated network data 30 over the MU cable bus 26, de-modulating the modulated network data 30 into network data 16, and communicating the network data 16 to the network adapter module 66. The internal circuitry may be configured to modulate and de-modulate data using schemes such as those utilized in VDSL or VHDSL (very high bit rate digital subscriber line) applications, or in power line digital subscriber line (PDSL) applications. One example of a suitable modulation scheme is orthogonal frequency-division multiplexing (OFDM). OFDM is a frequency-division multiplexing scheme wherein a large number of closely-spaced orthogonal sub-carriers are used to carry data. The data is divided into several parallel data streams or channels, one for each sub-carrier. Each sub-carrier is modulated with a conventional modulation scheme (such as quadrature amplitude modulation or phase shift keying) at a low symbol rate, maintaining total data rates similar to conventional single-carrier modulation schemes in the same bandwidth. The modulation or communication scheme may involve applying a carrier wave (at a particular frequency orthogonal to frequencies used for non-network data in the MU cable bus) and modulating the carrier wave using digital signals corresponding to the network data 16.

Figure 5:
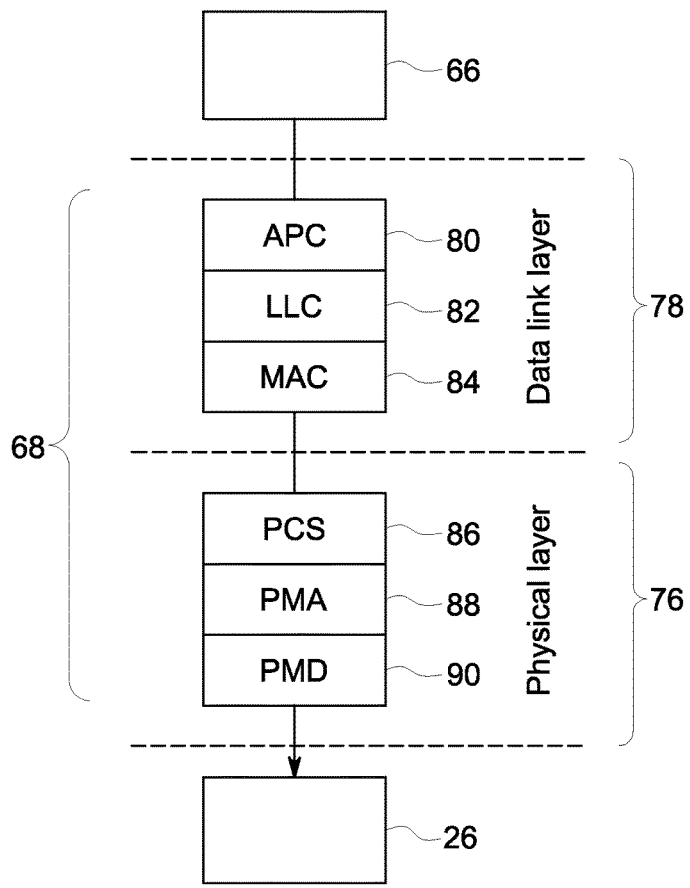
FIG. 5 is a schematic diagram illustrating the functionality of a signal modulator module portion of a router transceiver unit, according to an embodiment of the inventive subject matter.

FIG. 5 shows one possible example of how the signal modulator module 68 could function, cast in terms of the OSI network model, according to one embodiment of the inventive subject matter. In this example, the signal modulator module 68 includes a physical layer 76 and a data link layer 78. The data link layer 78 is divided into three sub-layers. The first sub-layer is an application protocol convergence (APC) layer 80. The APC layer accepts Ethernet (or other network) frames 16 from an upper application layer (e.g., the network adapter module 66) and encapsulates them into MAC (medium access control) service data units, which are transferred to a logical link control (LLC) layer 82. The LLC layer 82 is responsible for potential encryption, aggregation, segmentation, automatic repeat-request, and similar functions. The third sub-layer of the data link layer 78 is a MAC layer 84, which schedules channel access. The physical layer 76 is divided into three sub-layers. The first sub-layer is a physical coding sub-layer (PCS) 86, which is responsible for generating PHY (physical layer) headers. The second sub-layer is a physical medium attachment (PMA) layer 88, which is responsible for scrambling and FEC (forward error correction) coding/decoding. The third sub-layer is a physical medium dependent (PMD) layer 90, which is responsible for bit-loading and OFDM modulation. The PMD layer 90 is configured for interfacing with the MU cable bus 26, according to the particular configuration (electrical or otherwise) of the MU cable bus. The other sub-layers are medium independent, i.e., do not depend on the configuration of the MU cable bus.

Figure 6:
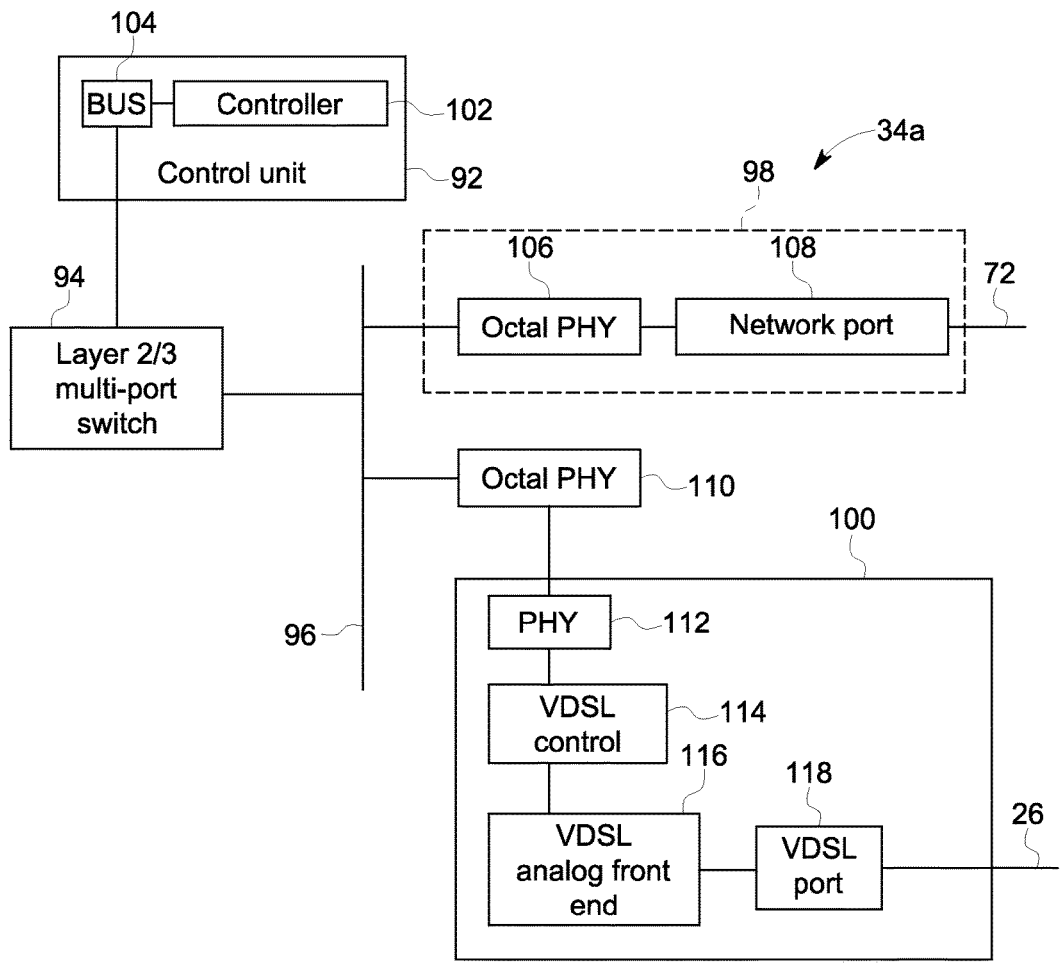
FIG. 6 is a circuit diagram of another embodiment of a router transceiver unit.

FIG. 6 is a circuit diagram of another embodiment of a router transceiver unit 34a. In this embodiment, the router transceiver unit 34a comprises a control unit 92, a switch 94, a main bus 96, a network interface portion 98, and a VDSL module 100. The control unit 92 comprises a controller 102 and a control unit bus 104. The controller 102 is electrically connected to the control unit bus 104 for communicating data over the bus 104. The controller 102 may be a microcontroller or other processor-based unit, including support circuitry for the microcontroller. The switch 94 is a network switching/router module configured to process and route packet data and other data. The switch 94 interfaces the control unit 92 with the main bus 96. The switch 94 may be, for example, a layer 2/3 multi-port switch. The network interface portion 98 is electrically connected to the main bus 96, and comprises an octal PHY (physical layer) portion 106 and a network port portion 108. The network port portion 108 is electrically connected to the octal PHY portion 106. The octal PHY portion 106 may comprise a 10/100/1000 Base T 8-port Ethernet (or other network) transceiver circuit. The network port portion 108 may comprise an Ethernet (or other network) transformer and associated CAT-5E receptacle (or other cable type receptacle) for receiving a network cable 72.

The VDSL module 100 is also connected to the main bus 96 by way of an octal PHY unit 110, which may be the same unit as the octal PHY portion 106 or a different octal PHY unit. The VDSL module 100 comprises a physical interface portion (PHY) 112 electrically connected to the octal PHY unit 110, a VDSL control 114 electrically connected to the physical interface portion 112, a VDSL analog front end unit 116 electrically connected to the VDSL control 114, and a VDSL port unit 118 electrically connected to the VDSL analog front end unit 116. The physical interface portion 112 acts as a physical and electrical interface with the octal PHY unit 110, e.g., the physical interface portion 112 may comprise a port and related support circuitry. The VDSL analog front end unit 116 is configured for transceiving modulated network data 30 (e.g., sending and receiving modulated data) over the MU cable bus 26, and may include one or more of the following: analog filters, line drivers, analog-to-digital and digital-to-analog converters, and related support circuitry (e.g., capacitors). The VDSL control 114 is configured for converting and/or processing network data 16 for modulation and de-modulation, and may include a microprocessor unit, ATM (asynchronous transfer mode) and IP (Internet Protocol) interfaces, and digital signal processing circuitry/functionality. The VDSL port unit 118 provides a physical and electrical connection to the MU cable bus 26, and may include transformer circuitry, circuit protection functionality, and a port or other attachment or connection mechanism for connecting the VDSL module 100 to the MU cable bus 26. Overall operation of the router transceiver unit 34a shown in FIG. 6 is similar to what is described in relation to FIGS. 1, 2, and 4.

Another embodiment of the inventive subject matter relates to a method for communicating data in a locomotive consist 12. The method comprises transmitting network data 16, 30 between locomotives 18a-18c within a locomotive consist 12. (Each locomotive 18a-18c is adjacent to and mechanically coupled with one or more other locomotives in the consist.) The network data 16, 30 is transmitted over a locomotive multiple unit (MU) cable bus 26 interconnecting at least adjacent locomotives 18a, 18b in the consist 12. The MU cable bus 12 is an existing cable bus used in the locomotive consist 12 for transferring non-network control information 28 between locomotives 18a-18c in the consist 12.

In another embodiment, the method further comprises, at one or more of the locomotives 18a-18c in the locomotive consist 12, converting the network data 16 into modulated network data 30 for transmission over the MU cable bus 26. The modulated network data 30 is orthogonal to the non-network control information 28 transferred over the MU cable bus. The method further comprises de-modulating the modulated network data 30 received over the MU cable bus 26 for use by on-board electronic components 32a-32c of the locomotives. As should be appreciated, it may be the case that certain locomotives in a consist are network equipped according to the system and method of the inventive subject matter, e.g., outfitted with a router transceiver unit, and that other locomotives in the consist are not. For example, there may be first and third network-equipped locomotives physically separated by a second locomotive that is not network equipped. In this case, the first and third locomotives are still able to communicate and exchange data even though there is a non-network equipped locomotive between them. This is possible because all the locomotives are still electrically connected via the MU cable bus. In one case, for example, a locomotive consist comprises first, second, and third locomotives, with the second locomotive being disposed between the first and third locomotives. A first router transceiver unit is positioned in the first locomotive, and a second router transceiver unit is positioned in the third locomotive. The second locomotive, however, does not have a router transceiver unit or other functionality for transmitting and/or receiving network data over the MU cable bus. Nevertheless, network data is transmitted between the first and third locomotives through the second locomotive, with the network data passing through a portion of the MU cable bus in the second locomotive but not being transmitted or received by the second locomotive. In another embodiment, the method further comprises controlling at least one of the locomotives 18a-18c in the consist based at least in part on the network data 16.

The locomotive consist 12 may be part of a train 60 that comprises the locomotive consist 12 and a plurality of railcars 62. Here, the non-network control information 28 may be train control information that is transmitted over the MU cable bus according to a designated voltage carrier signal (e.g., +74V).

Figure 7:
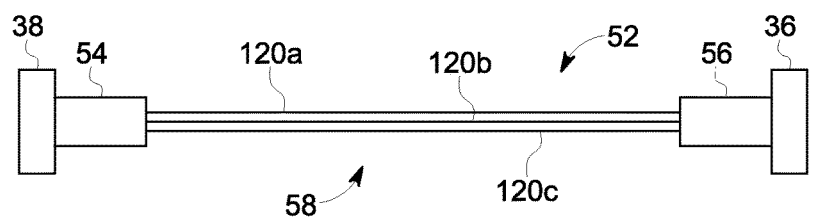

With reference to FIG. 7, if the MU cable jumper 52 and/or internal electrical system 40 includes plural discrete electrical wires or other electrical pathways, e.g., three discrete electrical wires 120a-120c as shown in FIG. 7, it may be the case that network data 30 is transmitted over only one of the plural discrete electrical wires or other electrical pathways. This may depend on what each pathway is used for in the locomotive consist and what type of information it carries. For example, it may be undesirable to transmit network data over a wire 120a that carries analog non-network data, whereas a wire 120b that carries a digital signal (on +V, off 0 V) is more desirable for transmitting network data.

Another embodiment of the inventive subject matter relates to a communication system 10 for communicating data in a locomotive consist 12. The system 10 comprises a respective router transceiver unit 34a-34c positioned in each locomotive 18a-18c of a locomotive consist 12. Each router transceiver unit 34a-34c is coupled to a locomotive multiple unit (MU) cable bus 26 in the locomotive consist 12 that interconnects adjacent locomotives 18a, 18b. The MU cable bus 16 is an existing cable bus used in the locomotive consist for transferring non-network control information 28 between locomotives within the locomotive consist. Each router transceiver unit 34a-34c is configured to transmit and/or receive network data 16, 30 over the MU cable bus 26.

In another embodiment of the system 10, each router transceiver unit 34a-34c is configured to convert the network data 16 into modulated network data 30 for transmission over the MU cable bus 26. The modulated network data being orthogonal to the non-network control information transferred between locomotives over the MU cable bus. Each router transceiver unit is further configured to de-modulate the modulated network data received over the MU cable bus for use by electronic components in the locomotives of the consist.

Another embodiment relates to a communication system for communicating data in a locomotive consist 12. In this embodiment, the system comprise a respective router transceiver unit 34a-34c positioned in each of a plurality of locomotives 18a-18c in the consist 12. The system further comprises, in each of the plurality of locomotives, a respective electronic component 32a-32c (e.g., computer unit) positioned in the locomotive and operably coupled to the router transceiver unit in the locomotive. The router transceiver units 34a-34c are electrically coupled to a locomotive multiple unit (MU) cable bus 26, which is an existing cable bus used in the consist for transferring non-network control information 28 between the plurality of locomotives. The router transceiver units 34a-34c are configured to transmit and/or receive network data 16, 30 over the MU cable bus 16, the network data originating at one of electronic components 32a-32c and being addressed to another of the electronic components 32a-32c. Each router transceiver unit may be configured to convert the network data into modulated network data for transmission over the MU cable bus (the modulated network data being orthogonal to the non-network control information transferred between locomotives over the MU cable bus), and to de-modulate the modulated network data received over the MU cable bus for use in one of the electronic components.

Another embodiment relates to a communication system for communicating data in a locomotive consist 12. The system comprises a computer network in the consist. The computer network comprises a respective electronic component 32a-32c positioned in each of a plurality of locomotives 18a-18c in the consist 12 and a locomotive multiple unit (MU) cable bus 26. The MU cable bus 26 interconnects the electronics components and is an existing cable bus used in the consist for transferring non-network control information 28 between the locomotives. The electronic components are configured to communicate by transmitting network data 16, 30 over the MU cable bus 26, the network data 16 originating at one of the electronic components and being addressed to another of the electronic components. As should be appreciated, in this embodiment the electronic components are configured to carry out the functionality of the router transceiver units 34a-34c as described above, and/or the router transceiver units 34a-34c are part of (or comprise) the electronic components. The computer network may be an Ethernet network.

Another embodiment relates to a method for retrofitting a locomotive for network data communications. The method comprises outfitting a locomotive with a router transceiver unit, interfacing the router transceiver unit with an electronic component of the locomotive, and interfacing the router transceiver unit with a multiple unit (MU) cable bus of the locomotive. The MU cable bus is an existing cable bus used for transferring non-network control information between locomotives in a consist. The router transceiver unit is configured to transmit and/or receive network data over the MU cable bus.

Another embodiment relates to a method for retrofitting a locomotive consist for network data communications. The method comprises, at each of a plurality of locomotives 18a-18c in a consist 12, outfitting the locomotive with a respective router transceiver unit 34a-34c, interfacing the router transceiver unit 34a-34c with an electronic component 32a-32c of the locomotive, and interfacing the router transceiver unit 34a-34c with a multiple unit (MU) cable bus 26 of the locomotive. The MU cable bus is an existing cable bus used for transferring non-network control information between locomotives in the consist. Each router transceiver unit is configured to transmit and/or receive network data 16, 30 over the MU cable bus 26.

Any of the aforementioned embodiments are also applicable for communicating data in vehicle consists generally. "Vehicle consist" refers to a group of vehicles that are mechanically coupled or linked together to travel along a route.

For example, one embodiment of the inventive subject matter relates to a system and method for communicating data in a vehicle consist 12. In this embodiment, network data 16, 30 is transmitted from a first vehicle 18a in the vehicle consist 12 to a second vehicle 18b in the vehicle consist. The network data 16, 30 is transmitted over an existing electrical cable bus 26 that interconnects the first vehicle 18a and the second vehicle 18b. The existing electrical cable bus 26 is used in the vehicle consist 12 for transferring non-network control information 28 between the first vehicle and the second vehicle. As should be appreciated, this method and system is applicable to communicating data between any of the linked vehicles 18a-18c, and thereby the terms "first" and "second" vehicle are used to identify respective vehicles in the vehicle consist and are not meant to characterize an order or position of the vehicles unless otherwise specified. That being said, it may be the case that the first and second vehicles are adjacent to and mechanically coupled with one another.

In any of the embodiments herein, the network data may be TCP/IP-formatted or SIP-formatted data. Additionally, each vehicle may include a computer unit, with the computer units 32a-32c communicating with one another by transmitting the network data, formatted as TCP/IP data or SIP data or otherwise, over the existing electrical cable bus 26, and the computer units thereby forming a computer network, e.g., an Ethernet-type network.

In any of the embodiments herein, the data transmitted over the MU cable bus may be "high bandwidth" data, meaning data transmitted at average rates of 10 Mbit/sec or greater. ("High bandwidth network data" is data that is packaged in packet form as data packets and transmitted over the MU cable bus at average rates of 10 Mbit/sec or greater.) This reflects that the communication system (and associated method) are applicable for realizing a high information density communication environment in a locomotive consist, i.e., it is possible to exchange relatively large amounts of data between locomotives in a timely manner. "Low bandwidth" data is data transmitted at average rages of less than 10 Mbit/sec. "Very low bandwidth" data is data transmitted at average rates of 1200 bits/sec or less.

Turning back to FIGS. 8A-8C and 9A-9C, the systems and methods for communicating data in a locomotive consist or other vehicle consist, for inter-consist equipment sparing and redundancy, will now be described in more detail. The systems and methods may be implemented using the system architecture of any of the embodiments described above, or they may be implemented using wireless communication technology or another type of wire-based communication system.

Figure 8A:
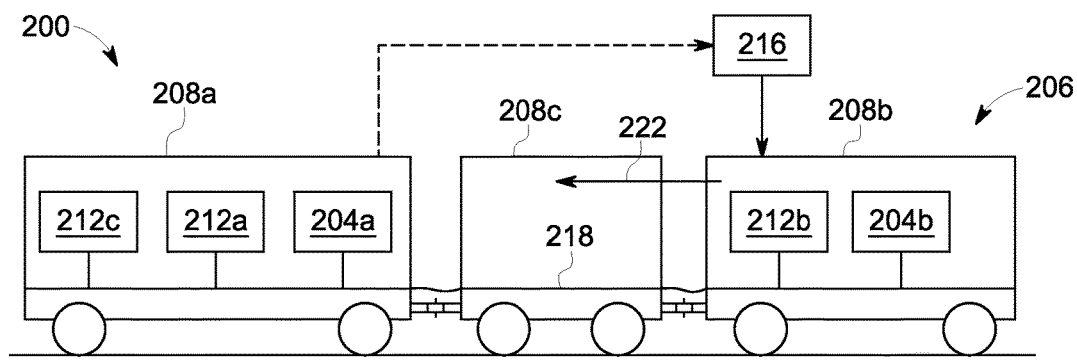
FIGS. 8A-8C and 9A-9C are schematic diagrams and flowcharts of various systems and methods, respectively, for communicating data in a vehicle consist for inter-consist equipment sparing and redundancy, according to additional embodiments of the inventive subject matter.

FIG. 8A is illustrative of several embodiments of a system 200 for locomotive inter-consist equipment sparing and redundancy. FIGS. 9A-9C illustrate several embodiments of associated methods for communicating data in a vehicle consist. The system 200 comprises a respective control coordination system 204a, 204b, 204c on each of at least two vehicles in a vehicle consist 206, e.g., a first vehicle 208a and a second vehicle 208b. (As above, the vehicle consist 206 comprises at least the first vehicle 208a and a second vehicle 208b, and possibly other vehicles 208c, with each vehicle 208a-208c in the consist being adjacent to and mechanically coupled with one or more other vehicles in the consist. In one embodiment, the vehicles 208a, 208b are locomotives in a locomotive consist that is part of a train.) The control coordination systems 204a, 204b may be separate and distinct controller units (e.g., computer units), or they may be centralized or distributed functional elements (e.g., implemented using control logic, control circuitry, or otherwise) incorporated into other components of the vehicles, such as, but not limited to, the router transceiver units discussed above, or they may be a combination thereof (e.g., some coordination units are separate/distinct control units, and others are integrated functional components in another electronic or other component in a vehicle). In any case, the control coordination systems 204a, 204b are configured to coordinate carrying out one or more of the methods for communicating data within the system 200.

In an embodiment, the method comprises receiving, at step 210a, at a second vehicle 208b in a vehicle consist 206, first data 216 related to a first vehicle 208a in the vehicle consist. (As noted above, data "related" to a vehicle means data originating from the vehicle, and/or data addressed to other otherwise intended for the vehicle, and/or data about the vehicle, and/or data used as a basis, indirect or direct, for controlling the vehicle.) The first vehicle and the second vehicle are linked by a communication channel (e.g., wireless or wired). As indicated at step 210b, the method further comprises, in a second electronic component 212b on board the second vehicle 208b, processing the first data 216 according to a function unavailable to the first vehicle 208a. (As also noted above, an "unavailable" function is one which the first vehicle is unable to perform, due to the first vehicle not being equipped to perform the function or due to a failure, e.g., of an electronic component, on board the first vehicle.) The method can be used for sparing failed components, as described herein; however, in a broader sense, the method relates to processing data for a first vehicle using equipment on a second vehicle, for avoiding the need to outfit the first vehicle with the equipment (for example).

In another embodiment, with reference to FIG. 9C, a method comprises a step 210d of determining that a first electronic component 212a in the first vehicle 208a of the vehicle consist 206 is in a failure state. (As also noted above, "failure state," or characterizing an electronic component as "having failed" or "has failed," refers to a state or condition of the first electronic component 212a where the first electronic component 212a is unable to perform a designated function, including being unable to perform the function at all, or being unable to perform the function in a manner that meets designated performance requirements.) Upon determining the failure state, at step 210e, first data 216 is transmitted from the first vehicle 208a to a second electronic component 212b on the second vehicle 208b, over a cable bus 218 or other communication channel (e.g., wireless) linking the first vehicle and the second vehicle. The first data 216 may be data related to the first vehicle 208a, such as data that was intended or designated for receipt and/or processing by the first electronic component 212a and/or control data (e.g., control instructions) originating from the first vehicle and used for controlling the second electronic component 212b, and/or other data. At step 210f, the second electronic component 212b is operated based on the first data 216 (e.g., it performs some function on or according to the data), for performing the designated function that the first electronic component 212a is unable to perform.

In this manner, the sparing and redundancy system 200 is able to remote "spare" or "swap" equipment between locomotives or other vehicles in a consist. If an electronic component connected to the cable bus or other communication channel (which in one embodiment is configured as part of a network, as described above) fails in one vehicle, a similar electronic component in another vehicle is used instead, through coordination of control functions and transfer of data over the cable bus or other communication channel (e.g., network) as facilitated by the control coordination systems. Advantageously, this provides a higher degree of dispatch reliability and lower costs to equip a locomotive or other vehicle, since each vehicle will not require redundant equipment. The redundancy is automatically provided by having multiple vehicles in the consist.

In one embodiment, for example, the electronic component 212a is a data radio located on a lead locomotive 208a, which communicates data from an on-board computer or other electronic component to a wayside or office device. If this radio device were to fail, a similar radio device 212b on a trail locomotive 208b is used in its place, under coordination and control of the control coordination systems, and by transferring data over the network implemented over the MU cable bus, for example. (As noted, an electronic component is "similar" to another electronic component if it can perform one or more functions of the other electronic component, within designated tolerance/performance levels.) In another embodiment, a camera system records data from the front end of the lead locomotive 208a and stores the data in a long-term storage device 212a also on the lead locomotive. Should the long-term storage device 212a become inoperative or damaged in a collision or otherwise, the data is stored either redundantly or alternatively on a similar storage device 212b on a trail locomotive 208b. In another embodiment, if an on-board operator control computer in a first vehicle enters a failure state, then a similar on-board computer on a second vehicle in the consist is used instead, in part by "remoting" the display output and keyboard input to the lead locomotive. That is, the keyboard input or other control input would be transmitted from the first vehicle to the on-board computer on the second vehicle, and the display output of the on-board computer on the second vehicle would be routed back to the operator display on the first vehicle.

In another embodiment, with reference to FIG. 9B, a method further comprises a step 210c of transmitting second data 222 from the second vehicle 208b to the first vehicle 208a over the communication channel. Alternatively, the second data 222 may be transmitted from the second vehicle to a destination other than the first vehicle, such as an off-consist location. The second data 222 relates to the first data as processed according to the function unavailable to the first vehicle. As described in more detail below, step 210c is also applicable to the method of FIG. 9C, such as subsequent step 210f.

For example, a method may additionally comprise transmitting second, return data 222 (data sent in response to receiving other data) from the second electronic component 212b to the first vehicle 208a over the cable bus 218 or other communication channel, where the return data corresponds to a data format of the first electronic component, and where the return data is used by one or more "third" electronic components 212c on the first vehicle. This means that the return data 222 is formatted in a manner that allows it to be used/processed by the third electronic components 212c in the first vehicle, as if it had instead originated at the first electronic component (the electronic component on the first vehicle that is in a failure state), for example.

Figure 8B:
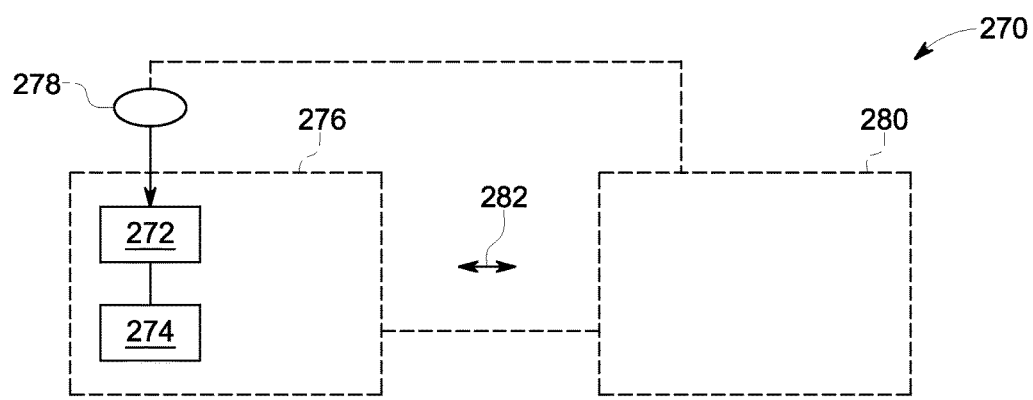

FIG. 8B is a schematic diagram of another embodiment of a system 270 for communicating data in a vehicle consist. The system 270 comprises a data receiver module 272 and a data processor module 274 operably connected to the data receiver module. The data receiver module 272 is configured for deployment in a second vehicle 276 in a vehicle consist and further configured to receive first data 278 related to a first vehicle 280 in the vehicle consist. (In operation, the first vehicle is linked with the second vehicle by a communication channel 282.) The data processor module 274 is configured for processing the first data according to a function unavailable to the first vehicle 280.

Figure 8C:
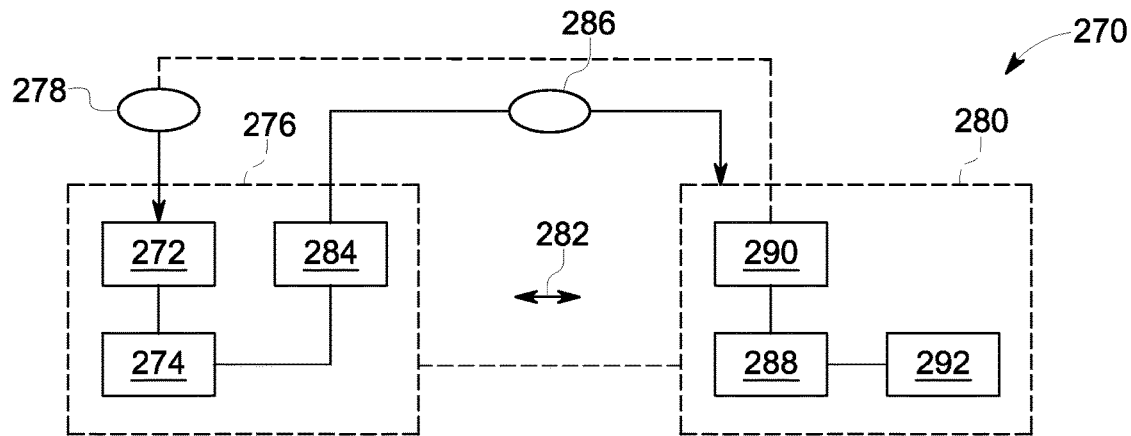

In another embodiment of the system, with reference to FIG. 8C, the system further comprises a second data transmitter module 284. The data processor module 274 is configured to generate second data 286 relating to the first data 278 as processed according to the function unavailable to the first vehicle. The second data transmitter module 284 is configured to transmit the second data 286 to the first vehicle.

In another embodiment of the system, still with reference to FIG. 8C, the system further comprises a fault determination module 288 and a first data transmitter module 290. (The first data transmitter module 290 may be operably connected to the fault determination module 288.) The fault determination module 288 is configured for deployment in the first vehicle 280, and is further configured to determine that a first electronic component 292 in the first vehicle is in a failure state. (In the failure state, the first electronic component is unable to perform the function unavailable to the first vehicle, the function being a designated function of the first electronic component.) The first data transmitter module 290 is configured to transmit the first data 278 from the first vehicle to the second vehicle in response to the fault determination module determining that the first electronic component is in the failure state.

In another embodiment, the system includes: (i) the fault determination module 288 and the first data transmitter module 290; (ii) the fault determination module 288 is configured for deployment in the first vehicle 280, and is further configured to determine that a first electronic component 292 in the first vehicle is in a failure state; (iii) the first data transmitter module 290 is configured to transmit the first data 278 from the first vehicle to the second vehicle in response to the fault determination module determining that the first electronic component is in the failure state; (iv) the second data transmitter module 284; (v) the data processor module 274 is configured to generate second data 286 relating to the first data 278 as processed according to the function unavailable to the first vehicle; and (vi) the second data transmitter module 284 is configured to transmit the second data 286 to the first vehicle.

Each module 272, 274, 284, 288, and/or 290 may be a hardware and/or software module, configured for carrying out the indicated functionality when deployed on a vehicle, e.g., when interfaced with an electronic component or other system of the vehicle. The indicated functionality may be carried out by the module itself, or in conjunction with other vehicle system elements under the control of, or as reconfigured by, the module. For example, a data transmitter module may be software-based for controlling a radio frequency transceiver unit for transmitted particular data.

Figure 11:
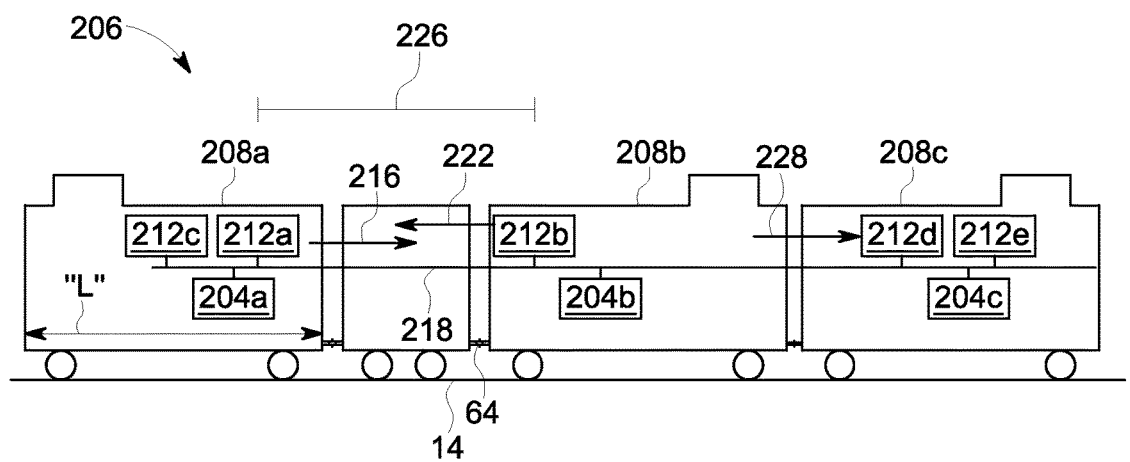
FIG. 11 is a schematic diagram of an additional embodiment of the systems/methods shown in FIGS. 8A-10.

In another embodiment, with reference to FIG. 11, the method further comprises determining a physical relationship between the first vehicle 208a and the second vehicle 208b in the vehicle consist 206. The return data 222 is used by the one or more third electronic components 212c in consideration of the physical relationship, e.g., the return data 222 may be adjusted or otherwise processed based at least in part on the physical relationship. In one embodiment, the physical relationship is a distance 226 between the first vehicle and the second vehicle, including a distance between closest ends of the two vehicles or a distance between designated points on the vehicles. Taking distance or another physical relationship into account may be beneficial depending on the nature of the data 216, the return data 222, and the operation performed by the second, similar component 212b on the second vehicle 208b. For example, the return data 222 could comprise location data (e.g., GPS data) relating to a location of vehicle consist (and/or a vehicle in the consist), with the return data being processed by adjusting the location data based on the distance. This would prevent error from being introduced into data processing/calculations if the system/component using the location data expects the data to originate at the first vehicle 208a but the data instead comes from the second vehicle 208b.

In the case of a train, as an illustrative example, suppose a GPS unit 212a in a first locomotive 208a of the train enters a failure state, and is unable to provide location data of the first locomotive 208a. The system 200 sends data 216 to a similar GPS unit 212b on a second locomotive 208b in the train, e.g., the data 216 might be control data requesting that the GPS unit 212b provide location data relating to the location of the second locomotive 208b. (As should be appreciated, the GPS unit 212b would typically be a component normally found on the second locomotive, so is not necessarily provided specially for the purpose of redundant equipment; rather, existing equipment is used for redundancy.) The GPS unit 212b on the second locomotive 208b transmits location data as return data 222 to a third electronic component 212c on the first locomotive 208a. The third electronic component 212c would typically be whatever component on the first locomotive 208a was requesting or would have otherwise used or received GPS/location data generated by the failed GPS unit 212a. When the third electronic component 212c receives the return location data, it is "expecting" that the location data will be the location of the first, failed GPS unit 212a. However, since the second GPS unit 212b may be many meters away, the third electronic component processes the return location data based on the distance 226 and/or other physical relationship between the locomotives 208a, 208b.

For adjusting or otherwise processing return data based on a physical relationship between vehicles, other factors may also be taken into account, such as vehicle heading. In particular, in order to adjust GPS coordinates based on a distance between vehicles, it would be necessary to not only account for the distance between vehicles, but also for their cardinal direction/orientation. Additionally, the physical relationship may include information relating to an orientation of the second vehicle with respect to the first vehicle and/or a respective length of the first vehicle and/or the second vehicle. For example, in the case of two locomotives 208a, 208b, as indicated in FIG. 11, one locomotive 208a may be oriented short hood forward, and the other 208b oriented long hood forward, with each locomotive having a length "L" based on the locomotive design/specification. This information (orientation, length, etc.), along with information on the placement of particular electronic components within a locomotive or other vehicle, may be used to calculate the distance between an electronic component 212a on one vehicle 208a and a similar electronic component 212b on another vehicle 208b.

In one embodiment, a physical relationship between vehicles in a consist is determined at least in part based on a respective identifier of each of one or more of the vehicles in the consist. For example, a physical relationship between a first vehicle 208a and a second vehicle 208b in a vehicle consist 206 could be determined at least in part based on an identifier of the second vehicle. "Identifier" refers to information uniquely associated with the vehicle (e.g., VIN number, road number, serial number), or identifying information that is not necessarily uniquely associated with the vehicle but that provides or can be used to determine information about one or more characteristics of the vehicle (e.g., a vehicle model type may be used to determine a length of the vehicle and the positioning of components located on the vehicle).

In another embodiment, when a first electronic component on a first vehicle enters a failure state where it is unable to perform a designated function, instead of using another component to perform the same function, a second electronic component on a second vehicle is operated to perform a substitute function that is deemed a suitable equivalent (by the operators of the vehicle consist) in certain conditions, e.g., an emergency condition stemming from component failure or otherwise. This may be useful if none of the other components in a vehicle consist are able to perform a designated function of a failed component, but one is able to perform a suitable equivalent.

The system 200 may be implemented using network communications over an MU cable bus, as described in regards to FIGS. 1-7. In one embodiment, for example, the system carries out a method for communicating data in a locomotive consist. The method comprises determining that a first electronic component in a first locomotive of a locomotive consist is in a failure state. (The locomotive consist comprises at least the first locomotive and a second locomotive, with each locomotive in the consist being adjacent to and mechanically coupled with one or more other locomotives in the consist.) In the failure state, the first electronic component is unable to perform a designated function of the first electronic component. As above, unless otherwise specified, this encompasses the first electronic component being unable to perform the function at all, or being unable to perform the function in a manner that meets designated performance requirements. Upon determining the failure state, network data is transmitted from the first locomotive to a second electronic component on the second locomotive. The network data is transmitted over a locomotive MU cable bus interconnecting at least the first and second locomotives in the consist. The MU cable bus is an existing cable bus used in the locomotive consist for transferring non-network control information between locomotives in the consist. The method further comprises operating the second electronic component based on the transmitted data, wherein the second electronic component performs the designated function that the first electronic component is unable to perform.

Alternatively or in addition, the system 200 may be implemented using communications channels other than an MU cable bus, such as a dedicated cable interconnecting the locomotives or other vehicles, or one or more wireless/RF communication channels.

From a control perspective, the functionality of the system 200 for locomotive/vehicle inter-consist equipment sparing and redundancy may be implemented in different manners, depending on the vehicles and electronic components in question, the communication channel(s) used, etc. FIG. 10 is illustrative of one embodiment, in the context of first and second vehicles 208a, 208b in a vehicle consist 206, and interconnected/linked via a cable bus or other communication channel 218, implemented as a network or otherwise. Each vehicle includes a plurality of electronic components 212a-212f, which perform various functions in the vehicles (for example, one vehicle 208a includes electronic components 212a, 212c, 212d, and the other vehicle 208b includes electronic components 212b, 212e, 212f). The vehicles and electronic components may be the same models, or they may be different. Each vehicle 208a, 208b is outfitted with a respective control coordination system 204a, 204b, as described above. In each vehicle, the control coordination system 204a, 204b on the vehicle is directly or indirectly interfaced with one or more designated ones of the electronic components in the vehicle; meaning that the control coordination system receives information relating to the electronic components or is able to determine or generate such information.

As discussed above, the control coordination systems 204a, 204b facilitate remote "swapping" of electronic components in different vehicles in a consist, so that when one component enters a failure state, a redundant component in another vehicle is used instead. For this process, the control coordination system in a vehicle monitors the health or status of each electronic component with which it is interfaced. This may be done in any of several different ways, such as, for example, the control coordination system periodically communicating with the electronic components, the control coordination system monitoring each electronic component's function or output (through sensing or otherwise), the electronic components being configured to send a failure message/signal to the control coordination system upon entering a failure state, the control coordination system receiving notification from other components, or the like. As noted above, the control coordination systems may be implemented in a distributed functional manner, wherein different functional aspects are deployed at different components within the system 200; thus, the electronic components may be configured or reconfigured, as part of a control coordination system, to provide status information indicating when they have entered a failure state. If needed, each control coordination system may process information about the electronic components with which it is interfaced to determine if any of the electronic components have entered a failure state.

If a control coordination system 204a in a first vehicle 208a determines that an associated electronic component 212a, 212c, and/or 212d has entered a failure state, data is transmitted from the first vehicle 208a to an electronic component 212b, 212e, and/or 212f in another vehicle 208b for performing the function of the failed electronic component. In one embodiment, upon determining a failure state of an electronic component, the control coordination system determines the type and/or function of the failed component. This may be done by polling (communicating with) the failed component, by communicating with other components in the system (e.g., what the other component was attempting to use the failed component for), by referencing stored data about the failed component (e.g., model number, component type, function type, or the like), or otherwise. The control coordination system, possibly through coordination with another control coordination system, then identifies a similar/redundant electronic component in another vehicle in the consist, and manages the transfer of data to and from the similar electronic component, if needed. The similar electronic component may be identified by correlating the information about the failed component (e.g., model, type of component, and/or function of component) to information about the other components in the vehicle consist. For example, if the failed component is a data radio, then the control coordination system would identify another data radio, capable of performing the function of the failed data radio, in another vehicle in the consist. Data flow management may involve actively processing and/or rerouting data originally intended for the failed component, e.g., for receipt by a similar/redundant component, or it may involve informing other components in the vehicle, which were attempting to communicate with or otherwise utilize the failed component, how to communicate with the similar/redundant component. For example, a network address of the similar/redundant component may be provided, to which subsequent data (information and/or control commands) is addressed.

For identifying suitable similar/redundant electronic components in case an electronic component enters a failure state, each control coordination system may include memory or other functionality for storing information 224 about the electronic components with which it is interfaced and information about other components in the vehicle consist. FIG. 10 shows one example, where information is organized in tabular form (for illustration purposes). In this example, the table includes information, in the left hand column, about the electronic components ("component 1"—"component n") in a first vehicle, which in this example is the vehicle 208a associated with the control coordination system 204a. For each component, there is associated information about the component, such as model, category/type, function, or the like. Each subsequent column is for an additional vehicle in the vehicle consist, with each column containing information about the electronic components in that vehicle. When the control coordination system 204a determines that an electronic component in its associated vehicle has entered a failure state, the control coordination system accesses information about the failed component in the stored information 224, and uses the accessed information to determine a suitable similar/redundant component in another vehicle, e.g., by correlating or cross-referencing the information about the failed component from the table to other information in the table. Alternatively, each electronic component in the table can be pre-linked to another electronic component in the table. The information in the table (or other data structure) may be pre-generated when vehicles are linked, through communication of the control coordination systems 204a, 204b, or it may be generated when needed. The stored information 224 may include data for facilitating communications with the various electronic components, for example, network addresses of each electronic component. In another embodiment, each control coordination system includes stored information about the electronic components on the vehicle with which it is associated, and determines a similar/redundant component on another vehicle by communicating information of the failed component to the control coordination systems on the other vehicles. For example, a control coordination system may query the other control coordination systems based on information of a failed component, which respond if they are associated with a suitable similar/redundant component on their respective vehicles.

To reiterate, in one embodiment where the various electronic components are configured as a network, with communications over the cable bus or other communication channel 218, the system 200 functions by: (i) when a component enters a failure state, a suitable similar/redundant component is identified, as above; and (ii) instead of addressing data to the failed component, data is addressed to the similar/redundant component in another vehicle. This may be done by each electronic component being informed of the substitution (e.g., that they should address data according to the address of the similar/redundant component), by using a data forwarding or translation function in the router transceiver units or otherwise (e.g., if data for a failed component is received at a router transceiver, the data is re-addressed or otherwise modified for transmission instead to the similar/redundant component), or the like.

The method and system 200 for locomotive inter-consist equipment sparing and redundancy may be extended across plural electronic components in the vehicles of a vehicle consist, so that if a component enters a failure state, or if a "spare" or similar component (one performing a function of another, failed component) fails, a similar component in another vehicle is used in its place. For example, the system may be configured so that if two electronic components fail in a vehicle, the respective functions of the two components are carried out on similar electronic components on two other, different vehicles in the consist.

In one embodiment involving "swapping out" of plural failed components, as above, and with reference to FIG. 11, a first electronic component 212a in a first vehicle 208a of a vehicle consist 206 is determined to be in a failure state, and data 216 is transmitted from the first vehicle 208a to a second electronic component 212b on the second vehicle 208b over a communication channel linking the vehicles in the consist. The second electronic component 212b is operated based on the transmitted data 216, for performing the designated function that the first electronic component 212a is unable to perform, and possibly including the transmission of return data 222 to a third electronic component 212c in the first vehicle 208a. Additionally, other electronic components in the vehicles are monitored for determining if any of the electronic components have failed. For example, it may be determined that the third electronic component 212c in the first vehicle 208a has failed. If so, third data 228 is transmitted from the first vehicle 208a (or possibly from the second or other vehicle) to a fourth electronic component 212d located on a third vehicle 208c of the vehicle consist. (The fourth electronic component 212d could instead be located on the second vehicle.) The fourth electronic component 212d is similar to the third, failed electronic component 212c and is operated based on the third data 228, e.g., for performing a function of the third electronic component 212c that the third electronic component 212c is unable to perform and/or for transmitting return data to another component in one of the other vehicles.

If one of the "swapped to" components subsequently fails, the system may be configured to "re-swap" to another, similar electronic component in the same or another vehicle. For example, if it is determined that the third electronic component 212c in the first vehicle 208a has failed, the system identifies a fourth electronic component 212d in a third vehicle 208c in the consist (or in the second vehicle 208b) that is similar to the third electronic component 212c. If it is then determined that the fourth electronic component 212d has failed, third data 228 is transmitted from the first vehicle and/or the second vehicle to a fifth electronic component 212e that is located on the second vehicle or the third vehicle of the vehicle consist. The second data may be data designated for processing by the third, failed electronic component 212c, and with the fifth electronic component 212e being similar to the third electronic component and operated based on the second data.

In another embodiment involving "re-swapping," a first electronic component 212a in a first vehicle 208a of a vehicle consist 206 is determined to be in a failure state, and first data 216 is transmitted from the first vehicle 208a to a second electronic component 212b on the second vehicle 208b over a communication channel linking the vehicles in the consist. The second electronic component 212b is operated based on the transmitted first data 216, for performing the designated function that the first electronic component 212a is unable to perform, and possibly including the transmission of second, return data 222 to a third electronic component 212c in the first vehicle 208a. Additionally, if it is determined that the second electronic component 212b has failed, the first data 216 is transmitted from the first vehicle and/or the second vehicle to a third electronic component 212d on a third vehicle 208c of the vehicle consist. The third electronic component 212d is similar to the first electronic component 212a and is operated based on the first data 216, for performing a designated function that the first electronic component is unable to perform.

In another embodiment involving monitoring multiple electronic components, a first electronic component 212a in a first vehicle 208a of a vehicle consist 206 is determined to be in a failure state, and first data 216 is transmitted from the first vehicle 208a to a second electronic component 212b on the second vehicle 208b over a communication channel linking the vehicles in the consist. The second electronic component 212b is operated based on the transmitted first data 216, for performing the designated function that the first electronic component 212a is unable to perform. Additionally, the second electronic component 212b and at least one third electronic component 212c in the vehicle consist are monitored for determining if any of the second electronic component and at least one third electronic component has failed. For each of the second electronic component and at least one third electronic component that is determined as having failed, data, designated for the component that is determined as having failed, is transmitted to a fourth, similar electronic component 212d. The fourth electronic component 212d is located on a vehicle 208c of the vehicle consist that is different than the vehicle 208a or 208a on which the component that is determined as having failed is located.

The method(s) and system(s) 200 for locomotive inter-consist equipment sparing and redundancy may be implemented on a per-vehicle basis, on each of one or more of a plurality of vehicles in a vehicle consist (e.g., locomotives in a locomotive consist). Here, for each vehicle of a plurality of vehicles 208a, 208b, 208c in the vehicle consist 206, at least one electronic component 212a, 212b, 212c in the vehicle is monitored to determine if the at least one electronic component has failed. For each of the at least one electronic component determined to have failed, say, for example, component 212a, first data 216 is transmitted from the vehicle 208a or a second vehicle in the consist 208b or 208c to a similar electronic component (e.g., component 212e) in a third or other vehicle 208c in the consist. The first data 216 is designated for the electronic component 208a determined to have failed, and is transmitted over a communication channel 218 linking vehicles in the vehicle consist. Additionally, second, return data 222 is transmitted from the similar electronic component 212e to one of the vehicles in the consist. The return data is generated by the similar electronic component 212e based on the first data 216. The first data 216 may be transmitted based on a network address of the similar component 212e, which is identified by the system when it is determined that a component has failed and a need exists for utilizing the similar component to perform a designated function of the failed component.

Figure 12:
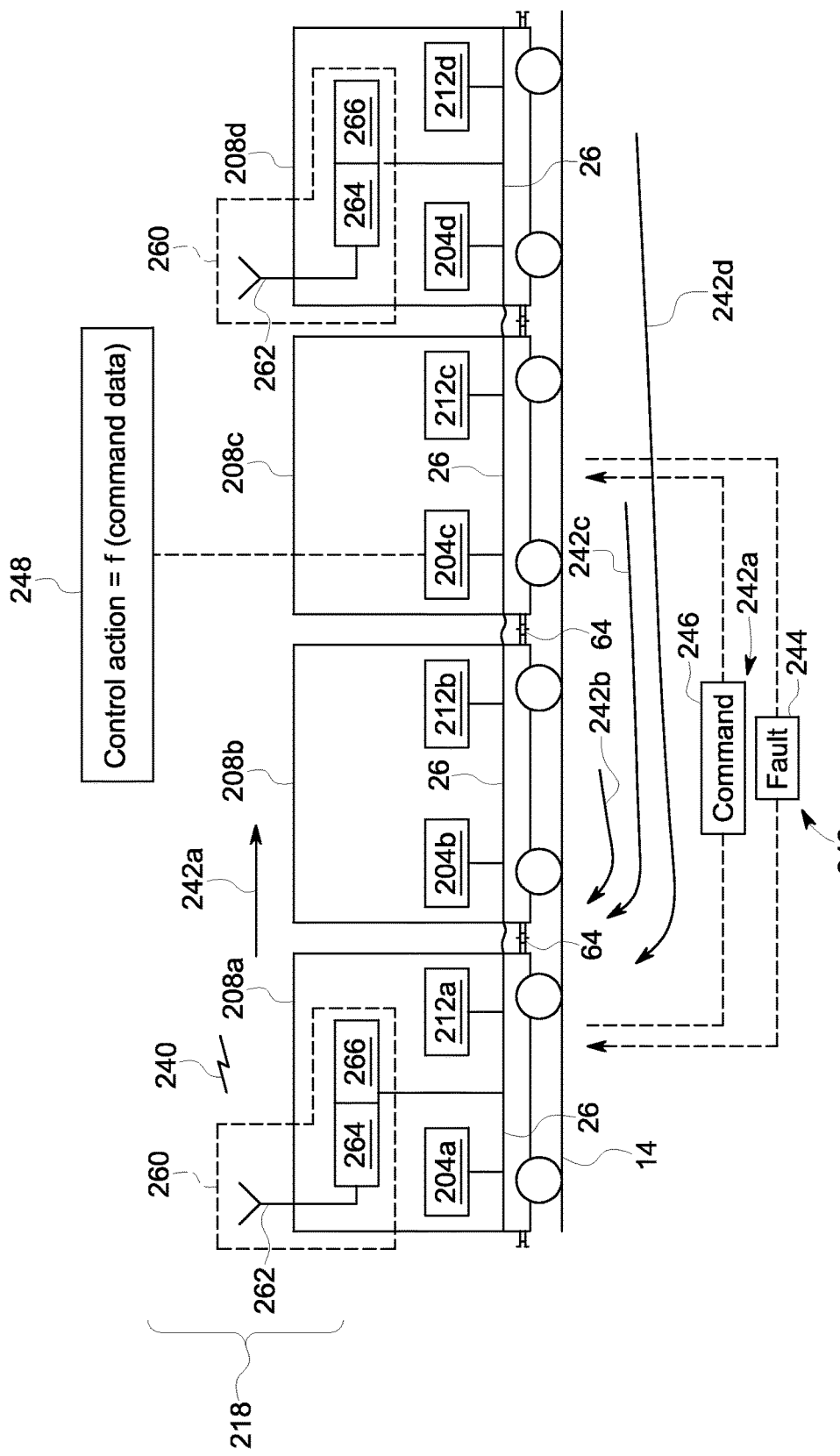
FIGS. 12-14 are schematic diagrams of a vehicle consist, in each figure configured according to an embodiment of the inventive subject matter.

In another embodiment of the system 200, with reference to FIG. 12, the communication channel 218 (e.g., MU cable bus 26 or other cable bus, wireless channel 240, or other communication channel) is used to communicate operations data, voice data, and/or command data (collectively, data 242) from one or more of the vehicles in the consist to another vehicle in the consist. For example, in the case of a train, data 242b, 242c, 242d may be transmitted from each of a plurality of remote locomotives 208b, 208c, 208d, respectively, to a lead locomotive 208a. Additionally, data 242a may be transmitted from the lead locomotive 208a to one or more of the remote locomotives 208b, 208c, 208d. (Data 242 may also be transmitted from one remote locomotive to one or more other remote locomotives.) The operations data is data relating to how a particular vehicle is operating/running, including data relating to one or more of vehicle speed, vehicle braking status, tractive effort including slippage, motor condition/performance, vehicle engine and power system output and status, emissions, and the like. Voice data is data comprising analog- or digital-encoded human or similar speech or other sound. Command data is data used to control one or more components or systems in a vehicle consist. (Unless otherwise specified, the terms "command data" and "control data" as used herein as synonymous.) The data 242 may be transmitted over the communication channel 218 as network data and/or high bandwidth data, e.g., high bandwidth network data about operations of the second vehicle (operations data) is transmitted from a second vehicle in a consist to a first vehicle in the consist over the communication channel. In another embodiment, the system is additionally configured to transmit respective operations data about operations of each of a plurality of third vehicles 208c in the vehicle consist to the first vehicle 208a in the consist. The respective data is transmitted from the third vehicles to the first vehicle over the communication channel 218. In another embodiment, the operations data about operations of a vehicle (a second vehicle or any third or other vehicles) is periodically regularly automatically transmitted, meaning transmitted without human initiation, on a periodic basis, at regular intervals. The operations, voice, and/or command data may be used by systems aboard the first vehicle (e.g., a train control computer or system), and/or it may be displayed to operators aboard the first vehicle using a display device (e.g., computer monitor/screen).

In another embodiment, the system 200 is configured (or additionally configured in combination with one or more features of the embodiments set forth herein) for remote system control of vehicles 208b-208d in a consist based at least in part on data 242a-242d exchanged between vehicles 208a-208d. (The first vehicle 208a may be a lead locomotive in a locomotive consist, and the other vehicles 208b-208d may be remote/trail locomotives in the consist; the data 242a-242d may be high bandwidth data and/or network data.) The first vehicle 208a receives operational or other data 242b-242d from the other vehicles 208b-208d. Based on the operational or other data, the first vehicle 208a transmits command data or other data 242a to the other vehicles 208b-208d. The vehicles 208b-208d respond to the command or other data by controlling one or more components or systems on the vehicles based on the data received from the first vehicle. In one embodiment, the data 242a is network data, which is respectively addressed to particular electronic components in the vehicle consist; the electronic components are configured to respond or act upon the received network data (i.e., network data addressed to them), based on the content of the data. In another embodiment, the data 242a is additionally or alternatively high bandwidth data.

As an example, in the context of a train, remote locomotives 208b-208d in the train may be configured to transmit operations data 242b-242d to the lead locomotive 208a. The lead locomotive 208a receives the operations data 242b-242d and reviews or otherwise processes the data, either automatically and/or in conjunction with operator review. Based on the processed data, the lead locomotive 208a generates command data 242a for transmitting to one or more of the remote locomotives in the consist. The command data 242a may be network data (and/or high bandwidth data) addressed to particular electronic components in the remote locomotives, or it may be otherwise configured for reception at a particular electronic component. The command data is received at the electronic component for which it is designated, and is processed by the electronic component. The electronic component is then controlled based on the command content of the command data. For example, if a remote locomotive 208c experiences a fault in an electronic component 212c, information 244 relating to the fault may be transmitted as operations data 242c from the remote locomotive 208c to the lead locomotive 208a. The lead locomotive processes the data 242c, and recognizes that the remote locomotive has reported a fault in component 212c. Based on the nature of the fault, the lead locomotive 208a may take corrective or other control action by transmitting command data 242a to the remote locomotive 208c. The command data 242a may include data 246 instructing the remote locomotive to reset the fault. If so, when the command data 242a is received and processed by the remote locomotive 208c, it acts upon the command data by resetting the fault, as at 248, e.g., a control action=f (command data). The command data 242a may be addressed to the particular electronic component 212c, if the electronic component is able to reset the fault, or it may be sent to another electronic component in the remote locomotive 208c for resetting the fault. As should be appreciated, "electronic component" includes both a single component and a system of components; thus, references to resetting a fault of an electronic component by transmitting command data to the electronic component includes the situation where one component is non-functional and command data is transmitted to and acted upon by another, second component. In a locomotive or other vehicle, command data may be processed and acted upon by a particular electronic component, or by a control coordination system in the vehicle, or by another control system/unit.

Figure 13:
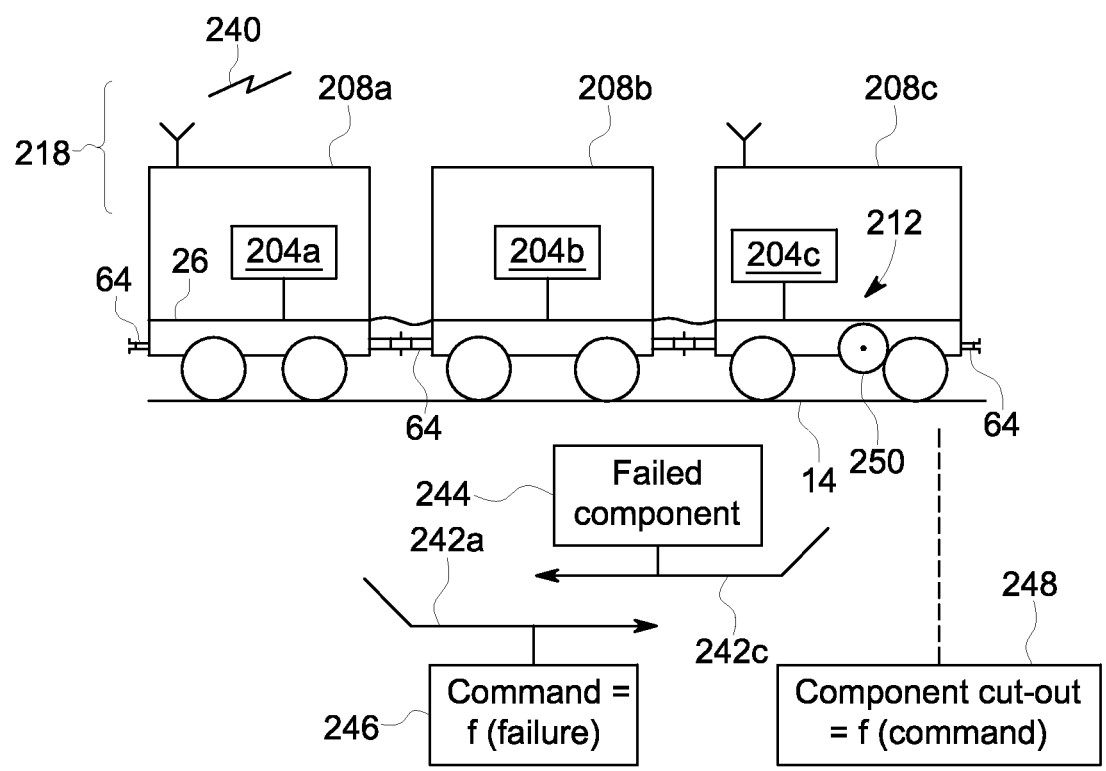

As another example, a locomotive typically includes a number of power electronic components (e.g., alternators, energy storage units), tractive electronic components (e.g., inverters, motors, dynamic braking resistive grids), and other electronic components (e.g., control systems, communication equipment). If one of these components fails, the locomotive may not be able to take self-corrective action. In any event, other locomotives in the train or consist may be unaware of the failed component and will be unable to act accordingly, for corrective compensation action or otherwise. This may lead to damage, or at least to lowered performance levels in a locomotive, consist, or train. In one embodiment, therefore, with reference to FIG. 13, the system 200 is configured for the remote cutout of failed components in a locomotive in a consist. Here, if an electronic component 212 (e.g., a traction motor 250) in a remote locomotive 208c fails, fault data 244 (or data otherwise relating to the failure) is generated by the locomotive 208c (e.g., by a control coordination system, or control system/unit, or otherwise) and transmitted as operations data 242c to a lead or other designated locomotive 208a in the consist. The lead or other designated locomotive 208a processes the received operations data, determines if it is possible to initiate a corrective or compensatory action, generates appropriate command data 242c (e.g., command data=f (reported failure)) that contains data 246 for initiating the corrective or compensatory action, such as cutting out the failed component, and transmits the command data 242c to the remote locomotive 208c. The remote locomotive 208c receives the command data 242c, processes the command data 242c, and carries out a control action 248 based on the data content 246 of the command data 242c. For example, for a failed traction motor 250, the command data 242c may specify that the traction motor 250 should be cut out, e.g., shut down and electrically and/or mechanically bypassed. The remote locomotive receives the command data and cuts out the failed motor 250, by shutting down the motor and electrically and/or mechanically bypassing the motor. Other failed electronic components may be cut out in a similar manner, by deactivating/bypassing the component. Where applicable, the functions of failed components may be carried out using inter-consist equipment sparing, as described herein.

A consist may include a plurality of locomotives that are able to communicate network and/or high bandwidth data with one another and with a designated locomotive (e.g., lead locomotive), wherein the designated/lead locomotive is able to command individual locomotive operations via the network and/or high bandwidth communication channel. In an embodiment, the lead loco runs performance algorithms to determine the most efficient mode of operation for the locomotives in the consist, and adjusts individual locomotives accordingly. For example, if the consist is operating at a certain throttle notch level, it may be more advantageous and/or efficient to set one locomotive in the consist to idle and adjust the throttle notches of the other locomotives to maintain the same level of tractive effort in the consist while operating all locos in the consist in the most efficient mode of operation.

The remote locomotive 208c may transmit operations data 242c to the lead locomotive confirming that the remote cutout command or other command 246 specified in the command data 242a was executed. Additionally, the lead locomotive 208a may modify its current operational mode based on the knowledge that the failed component in question has been cut out. For example, if the cutout failed component is a traction motor, and the remote locomotive 208c is only operable using its remaining traction motors, then the lead locomotive 208a may increase its own traction output to compensate for the failed motor 250. Information about the failed, cutout component 250 may be provided to the other locomotives in the consist for acting accordingly, and/or the lead locomotive may generate and transmit command data 242a to the other locomotives, where the command data is generated based at least in part on knowledge of the failed, cutout component 250. That is, the remote locomotives are not provided with explicit knowledge of the cutout component in the other locomotive 208c, but are commanded to act in a manner for compensating for the cutout component. For example, for a cutout motor in one locomotive 208c, the lead locomotive 208a may command the other locomotive(s) 208b in the consist to adjust their dynamic braking and/or other tractive efforts accordingly.

In any of the embodiments described herein, the system may be configured to account for legacy equipment in a consist, and, more specifically, to account for and accommodate legacy locomotives or other vehicles that are not equipped to receive and process high bandwidth data and/or network data. To explain further, in train and similar fleet vehicle systems, new technology may only be implemented, at least initially, on a relatively small number of the total vehicles in the fleet. This is typically for cost control purposes, for evaluation purposes, and/or because it may not be deemed necessary to outfit all vehicles in a fleet with particular new technology (e.g., based on how and where the vehicles are used). As such, it will oftentimes be the case that "updated" vehicles may be operated along with legacy vehicles, such as in a train, where the train may include both newer/updated locomotives and older locomotives.

Figure 14:
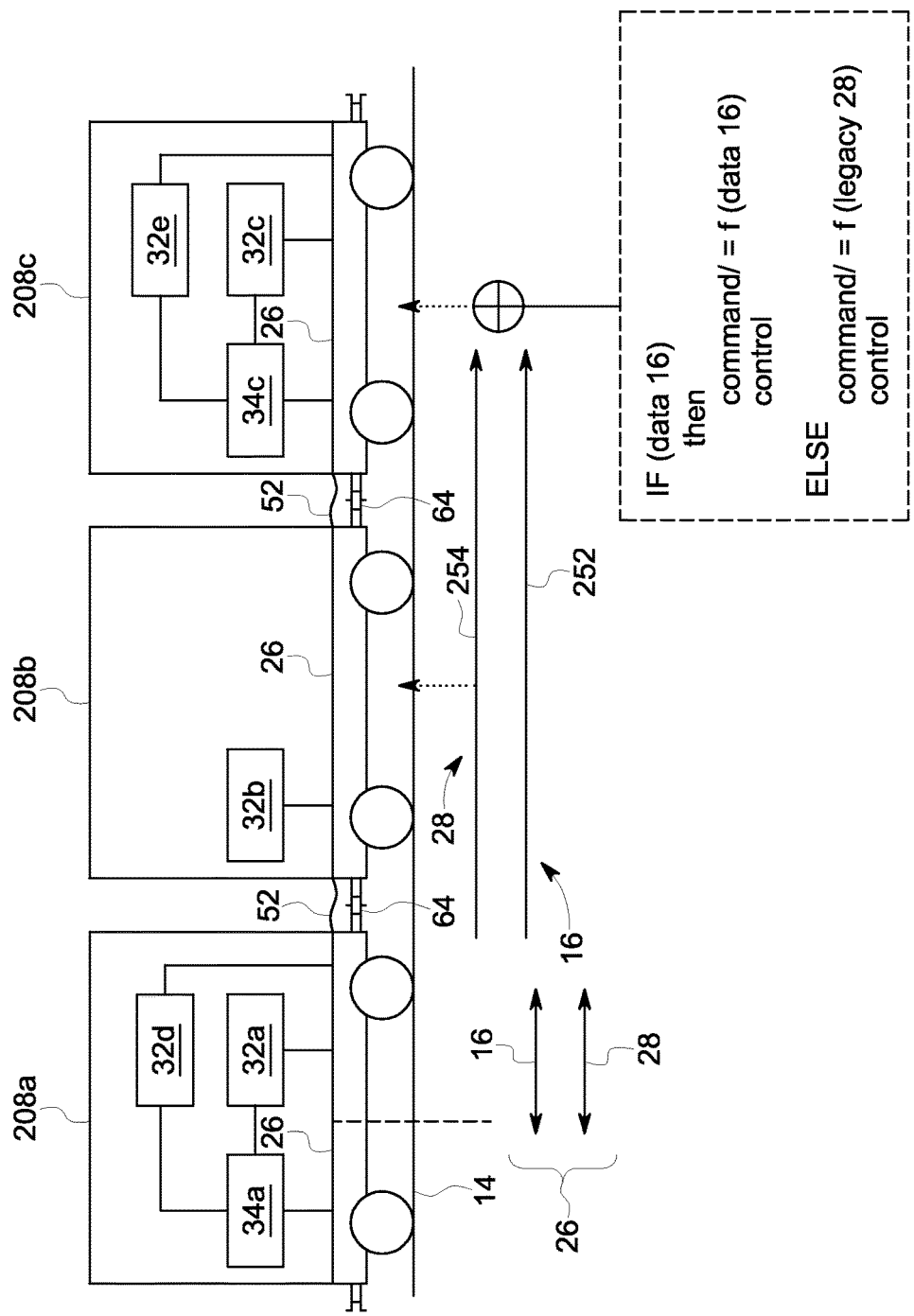

FIG. 14 shows an embodiment of the system 200 configured to accommodate legacy vehicles in a vehicle consist. Here, as an illustrative example, the vehicle consist 206 is a locomotive consist having a lead locomotive 208a, a first remote locomotive 208b, and a second remote locomotive 208c. The lead and second remote locomotives 208a, 208c are "updated" locomotives, meaning each is equipped with functionality, e.g., router transceiver units 34a, 34c, for transceiving network data and/or high bandwidth data 16. The first remote locomotive 208b, on the other hand, is a "legacy" locomotive, meaning that it is not equipped with functionality for transceiving network data and/or high bandwidth data. However, as discussed above, each of the locomotives 208a-208c, including the updated locomotives, is still equipped with legacy communication equipment, such as an MU cable bus or other existing electrical cable bus 26 that interconnects the locomotives in the consist. In operation, non-network control information 28 ("legacy information") is generated and transmitted over the cable bus 26 in a standard manner, as low bandwidth analog signals. Additionally, network data and/or high bandwidth data 16 is also transmitted over the cable bus 26. The data 16 is formatted and/or transmitted in a manner where it does not interfere with the legacy information 28. This may be done by converting the data 16 into modulated data that is orthogonal to the non-network control information 28, using frequency multiplexing, time multiplexing, or the like, as discussed above.

The legacy locomotive 208b is unable to receive or process the network data and/or high bandwidth data 16. However, since the data 16 is orthogonal to the legacy information 28, it does not interfere with the legacy information; in effect, the data 16 is "transparent" to the legacy locomotive 208b. The legacy information 28 is transmitted over the cable bus and is received and processed by electronic equipment 32b (e.g., an MU cable bus modem) in the legacy locomotive 208b, in a standard manner. The cable bus 26 extending through the legacy locomotive 208b acts as a communication conduit for the network data and/or high bandwidth data 16, as transmitted between the two updated locomotives 208a, 208b.

In one embodiment, each "updated" locomotive 208a, 208c retains legacy equipment 32d, 32e (e.g., MU cable bus modem functionality), respectively, for transceiving legacy information 28. Legacy information 28 may be used supplemental to or in addition to data 16, but in a more typical situation the data 16 and information 28 overlap in terms of functional content. For example, both may include throttle command information. Here, each updated locomotive 208a, 208c may be configured to act upon network data and/or high bandwidth data 16 when it is available and supersedes legacy information 28, but to otherwise use and act upon the legacy information 28. For example, in the case of a train throttle command, the updated locomotives 208a, 208c may be outfitted with a train control system that provides for an "infinite" throttle. That is, between a minimum throttle position of "0" (idle) and a maximum of "8" (for example), instead of having grossly discrete throttle/notch levels of 0, 1, 2, 3, 4, and so on, as in conventional/legacy train traction systems, throttle positions are allowed at a more granular level, such as in 0.1 or 0.01 increments. For commanding throttle operations, the lead locomotive 208a transmits an "infinite" throttle command 252 (e.g., notch level 4.25) as high bandwidth and/or network data 16 over the cable bus 26. The lead locomotive 208a also transmits a legacy notch command 254 over the cable bus 26 as legacy information 28, based on the established legacy throttle control format. The legacy notch command may be the legacy notch command closest to the infinite throttle command, or it may be another designated notch command that is utilized for particular train control purposes. For example, in the case where certain locomotives are controlled to operate at an infinite throttle command of 4.25, the legacy notch setting may be 4.

As indicated in FIG. 14, the legacy notch command 254 is transmitted over the cable bus 26 from the lead locomotive 208a and is received at both the remote locomotives 208b, 208c. Additionally, an infinite throttle command 252 is transmitted over the cable bus as data 16. Although the data 16 passes through the legacy remote locomotive 208b, the remote locomotive 208b cannot process or use the data 16. Instead, the locomotive 208b receives, processes, and acts upon the legacy notch command 254. The updated locomotive 208c receives both the legacy notch command 254 and the infinite notch command 252. The updated locomotive 208c determines that both commands 252, 254 relate to notch settings. Since the infinite notch command 252 arrives as part of the network data and/or high bandwidth data 16, the updated locomotive 208c acts upon the command 252 and not the legacy command 254. That is, in one embodiment the system is configured so that if an updated locomotive receives command data over both a high-bandwidth/network channel and a legacy channel, the network data and/or high bandwidth data 16 received over the high-bandwidth/network channel is considered to supersede the data received over the legacy channel. In another embodiment, updated locomotives may be configured to disregard all data present on a legacy channel when a high-bandwidth/network channel is present and operating within designated parameters. In another embodiment, updated locomotives are configured to select between legacy data and high-bandwidth data and/or network data based on the nature of the data and the internal control algorithms of the locomotive.

In another embodiment, updated locomotives 208a, 208c are configured to utilize network data and/or high bandwidth data 16 when data 16 is present and usable (e.g., the data is not only present but able to be processed and "understood" by the locomotive), but to otherwise use legacy information 28. This is illustrated in FIG. 14 with respect to the updated locomotive 208c. The locomotive 208c may receive both data 16 and legacy information 28, or only legacy information 28. If the network data and/or high bandwidth data 16 is present and usable, then command/control of the locomotive 208c is carried out as a function of the data 16. Otherwise, command and control of the locomotive 208c is carried out as a function of the legacy information 28. Such a configuration is beneficial for instances where network data and/or high bandwidth data 16 is not received or usable by the locomotive 208c, such as due to router transceiver unit failure, a failure in the lead locomotive, a communication channel disruption, or the like. In other words, if the high-bandwidth and/or network system goes down, but the existing cable bus system is still operational, the system automatically reverts to using the legacy equipment for communications and control within the locomotive consist, as a fallback means.

As an example, suppose a locomotive consist as in FIG. 14 is operating in a traction mode where the lead locomotive 208a has transmitted an infinite throttle command 252 of "5.5" and a legacy notch command 254 of "5" over the cable bus 26. All communication systems are operating normally. The legacy locomotive 208b receives the legacy notch command 254 of "5" and adjusts its tractive effort accordingly. The updated remote locomotive 208c receives both the legacy notch command and the infinite throttle setting, and adjusts its tractive effort to level "5.5." However, further suppose that at a later point in time, the network/high-bandwidth communication channel between the two updated locomotives 208a, 208c fails. The updated remote locomotive 208c simply adjusts its tractive effort to "5," based on the legacy notch command 254 received over the legacy channel.

Although illustrated in regards to the case where both the legacy information and network/high-bandwidth data 16 is transmitted over a cable bus 26 (e.g., MU cable bus), the embodiments described above are also applicable to cases where legacy information 28 is transmitted over a cable bus and network and/or high-bandwidth data 16 is transmitted over a different medium, such as wireless. Here, for example, an updated remote locomotive 208c could be configured to base control operations on data 16 when it is received over a wireless channel and usable by the locomotive 208c, but, if the wireless channel fails or the data 16 is otherwise not usable, to instead use legacy information 28 received over the cable bus 26.

As should be appreciated, the aforementioned embodiments enable the interoperability of legacy and updated locomotives. Network and/or high bandwidth data is transmitted over an MU cable bus or other cable bus interconnecting the locomotives, as is legacy information (e.g., conventional MU signals). If a locomotive control system is equipped and able to read the network and/or high bandwidth data, it uses the network and/or high bandwidth data (and makes use of any information available in such data that is not available in legacy information). If not equipped in this manner, a locomotive continues to use the legacy information. Over time, legacy communication equipment will be replaced (or legacy locomotives will be replaced with updated locomotives), and in the meantime locomotives already updated with equipment for transceiving and processing network and/or high bandwidth data can take advantage of the network and/or high bandwidth data. This makes for a backward compatible communication method that allows equipped locomotives to take advantage of additional data, while still controlling older unequipped locomotives.

For wireless communications, a locomotive or other vehicle may be outfitted with a radio communication unit 260 (see FIG. 12). In an embodiment, the radio communication unit 260 comprises an antenna unit 262, a transceiver unit 264 connected to the antenna unit 262, and an interface unit 266 for interfacing the transceiver unit 264 with other electronic equipment in the vehicle. The interface unit 266 receives data/information from elsewhere in the vehicle (e.g., high bandwidth data and/or network data) and converts the data/information to a forma usable by the transceiver unit 264. The transceiver unit 264 processes the data/information it receives from the interface unit 266 for transmission over the antenna unit 262. For example, the received data/information may be converted, modulated, and amplified to an RF signal or microwave signal. The antenna unit 262 is configured to transmit (as wireless RF radiation) electrical signals received from the transceiver unit 264. The antenna unit, transceiver unit, and interface module are also configured to receive data. For example, the antenna unit receives wireless RF signals, the transceiver unit demodulates and de-converts the received RF signals, and the interface unit communicates the received signals to other components in the vehicle.

In an embodiment, if all locomotives in a consist have been updated to operate via wireless (e.g., as a wireless network), all the locomotives in the consist may be operated solely over the wireless link/network, thus eliminating the need for use of the MU cable or other cable bus.

In any of the embodiments described herein, the existing electrical cable bus 26, 218 may be an ECP (electronically controlled pneumatic brake) train line. ECP brakes on a train are defined by the Association of American Railroads' 4200 series specifications. This standard describes a 230V DC power line that runs the length of the train (for providing DC power to remote units), a transceiver at 132 kHz that operates on top of the 230V power line, and a communication link (realized over the power line using the transceiver) that adheres to the ANSI/EIA 709.1 and 709.2 protocols. According to the 4200 series specifications, the communication link is used to communicate brake data between railcars for braking control purposes.

Figure 15:
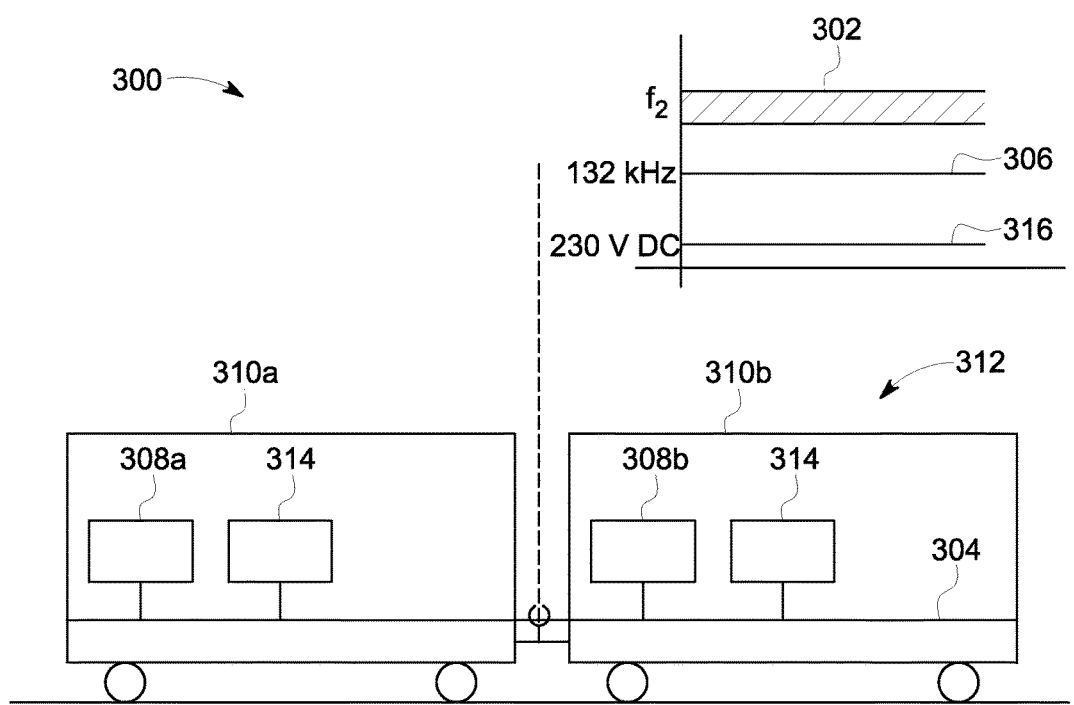
FIG. 15 is a schematic diagram of an embodiment of the communication system implemented in conjunction with an electronically controlled pneumatic (ECP) train line.

In an embodiment, with reference to FIG. 15, a system 300 for communicating data in a locomotive consist or other vehicle consist is configured to transmit network and/or high bandwidth data 302 over an ECP train line 304, in a manner orthogonal to ECP brake data 306 transmitted over the ECP train line 304. The system 300 comprises a router transceiver unit 308a, 308b on each of a plurality of vehicles 310a, 310b in a consist 312. On each vehicle, the router transceiver unit 308a, 308b is in addition to an ECP transceiver 314 on the vehicle. (Alternatively, an ECP transceiver may be reconfigured to include the functionality of the router transceivers 308a, 308b.) Each router transceiver unit 308a, 308b is electrically connected to the ECP train line 304, and is configured to transmit network and/or high bandwidth data 302 over the ECP train line 304 at one or more frequencies $f_2$ (i) that are different than the 132 kHz frequency of the ECP brake data 306, (ii) that do not interfere with (or receive significant interference from) the ECP brake data 306, and (iii) that do not interfere with (or receive significant interference from) the 230V DC signal 316 present on the ECP train line 304. (That is, the data 302 is orthogonal to the data 306 and DC signal 316.) For example, the network and/or high bandwidth data may be modulated into a carrier wave/RF signal transmitted over the ECP train line at a frequency in the megahertz (MHz) range. The router transceiver units 308a, 308b may be similar to the router transceiver units 34 described above. The embodiment of FIG. 15 may be implemented in conjunction with any of the other embodiments described herein.

As should be appreciated, the system 300 establishes a high bandwidth data network that operates superimposed on, and separate from, the 132 kHz communication link that is specified in the 4200 series specifications for ECP brake traffic between the locomotive and the rail cars. This data network may be used to communicate non-brake data (e.g., in the form of network and/or high bandwidth data) between vehicles in a consist. Examples of the data that may be transferred include vehicle sensor data indicative of vehicle health, commodity condition data, temperature data, weight data, security data, data as otherwise specified herein, and/or other data.

Figure 16:
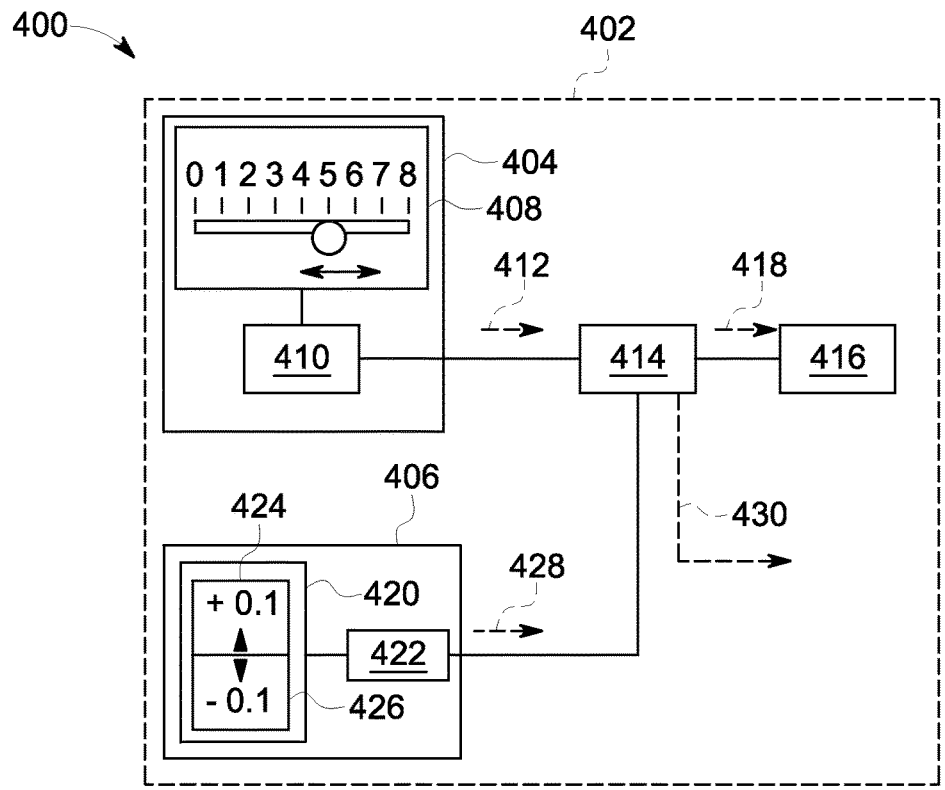
FIG. 16 is a schematic diagram of an incremental notch secondary throttle control system, according to another embodiment of the inventive subject matter.

FIG. 16 is a schematic diagram of an incremental notch secondary throttle control system 400 for a vehicle 402, according to another embodiment of the inventive subject matter, which may be used in conjunction with a system or method for communicating data in a locomotive consist or other vehicle consist as described herein. The secondary throttle control system 400 includes a primary throttle control 404 and an incremental notch secondary throttle control 406. The primary throttle control 404 includes a first manually adjustable control member 408 and a primary control output unit 410, which is operably connected to the control member 408. The manually adjustable control member 408 is moveable (by a human operator) to and between discrete notch/throttle settings, from a zero or minimum throttle setting to a maximum throttle setting. In the example shown in FIG. 16, the minimum is indicated by "0" and the maximum by "8"; thus, in this example, the control member 408 can be moved to the discrete throttle settings 0, 1, 2, 3, 4, 5, 6, 7, and 8. The primary control output unit 410 senses (or is provided with information about) the position of the control member 408, and outputs a primary control output signal 412 indicative of the position, at a particular one of the discrete throttle settings. The primary control output signal ranges in informational value/content in correspondence with the discrete throttle settings, e.g., the primary control output signal indicates the discrete throttle setting currently selected according to the position of the control member 408. To the extent the control member 408 may be positioned between the discrete throttle settings, this "in between" positioning is not captured by the primary control output unit and is not included in the primary control output signal. (For example, starting with the control member at a particular discrete throttle setting, it could be the case that the primary control output signal indicates that throttle setting until the control member is moved to and arrives at the next discreet throttle setting.)

The primary control output signal 412 is communicated to an engine or other motive control unit 414 of the vehicle 402 (e.g., a control unit that controls one or more traction motors). The motive control unit 414 is operably connected to a traction unit 416, which may be an engine, one or more traction motors, a hybrid system, etc. The motive control unit 414 generates a motive control signal 418 as a function of the primary control output signal 412 received from the primary throttle control 404, for controlling an output level of the traction unit 416. For example, when the primary control output signal 412 is indicative of the control member 408 being positioned at the minimum throttle setting, the motive control unit 414 generates a motive control signal 418 for controlling the traction unit to a minimum output level or other first designated level. When the primary control output signal 412 indicates another, higher throttle level, the motive control unit 414 generates a motive control signal 418 for controlling the traction unit to a higher level than the minimum output level or other first designated level. As should be appreciated, the relationship between the primary throttle control 404 and the motive control unit, across the entire accessible range of output levels of the traction unit 416, is a step-wise function, differentiating the system from other systems where throttle level is selected continuously across a range, where the relationship between throttle selection and traction unit output is a ramp or curve-based function.

The primary throttle control 404, and underlying functionality of the motive control unit 414, may be an existing throttle control of the vehicle 402. For example, such systems are found on some types of locomotives or other rail vehicles.

The incremental notch secondary throttle control 406 includes a second manually adjustable control member 420 and a secondary control output unit 422, which is operably connected to the second control member 420. The second manually adjustable control member 420 includes two (first and second) switches, buttons, or other selectable control inputs 424, 426. The secondary control output unit 422 senses when one of the control inputs 424, 426 is actuated, or is provided with an indication of when and which of the control inputs 424, 426 is actuated (i.e., pressing a control input may generate a designated electrical signal which is supplied to the secondary control output unit 422). In response, the secondary control output unit 422 outputs a secondary control output signal 428 as a function of which control input 424, 426 was actuated, which is communicated to the motive control unit 414.

How the motive control unit 414 uses the secondary control output signal 428 can vary depending on a desired operational configuration, but in an embodiment, the secondary control output signal 428 is used as a basis for a more granular or incremental step-wise throttle selection in between the discrete throttle settings of the primary throttle control 404. Thus, in the example shown in FIG. 16, the first control input 424 is designated for adjusting a discrete throttle setting up by a positive adjustment factor or one-tenth (0.1) of the range separating adjacent discrete throttle settings in the primary throttle control 404, and the second control input 426 is designated for adjusting a discrete throttle setting down by a negative adjustment factor of one-tenth (0.1) of the range separating adjacent discrete throttle settings in the primary throttle control 404. In operation, when one of the control inputs 424, 426 is actuated, information indicative of the control input having been actuated is supplied to the motive control unit 414, by way of the secondary control output unit 422 generating a secondary control output signal 428 to that effect. In response, the motive control unit 414 adjusts the motive control signal 418 accordingly; that is, the motive control signal 418 is a function of both the primary control output signal 412 and the secondary control output signal 428, with the gross output level of the traction unit 416 being based, in effect, on the primary control output signal 412, but adjusted up or down based on the secondary control output signal 428. For the adjustment, in a linear system, if the output level range of the traction unit is "X" (designated/minimum traction output to maximum available traction output), and the number of discrete throttle settings of the primary throttle control is "n", and the adjustment factor (assumed the same for both positive and negative in this example) is "y", then the percentage of total available traction output by which to adjust the output of the traction unit each time the second manually adjustable control member 420 is actuated is $=(X/n) \cdot y$. For example, if X is simply 100 (0 is minimum output and 100 maximum), and n=8 and y=0.1, as in the example of FIG. 16, then each time a control input 424, 426 is actuated, then traction unit output is reduced or increased, as applicable, by 1.25%.

For a locomotive vehicle with "n" discrete notch settings of the primary throttle control 404, the secondary throttle control 406 allows an operator to selectively adjust a currently selected notch level up or down by an adjustment factor of "y" (for symmetric positive and negative adjustments), or by adjustment factors of "y1" and "y2" in the case where the positive and negative adjustment factors, respectively, are not the same. Thus, for example, for a 0.1 adjustment factor available through the secondary throttle control 406, each time a control input of the secondary throttle control 406 is selected, the current notch setting is raised or lowered by 0.1; for a current notch setting of 7, for example, an operator actuating the first control input 424 (corresponding to a 0.1 positive adjustment factor) would increase the notch level to 7.1, and actuating the second control input 426 (corresponding to a 0.1 negative adjustment factor) would decrease the notch level to 6.9.

In an embodiment of the system 400, actuation of the first manually adjustable control member 408 to arrive at a next adjacent discrete throttle setting overrides the current output of the secondary throttle control 406, such that the motive control signal 418 is based solely on the primary control output signal 412. For example, if the motive control signal 418 currently reflects a throttle setting of 5.7, with the first manually adjustable control member 408 being currently positioned at throttle setting 6 (meaning a downward/negative adjustment factor of 0.1 was applied three times), moving the first manually adjustable control member 408 to throttle setting 7 would reset the motive control signal 418 to reflect a 7 throttle setting, and moving the first manually adjustable control member 408 to throttle setting 5 would reset the motive control signal 418 to reflect a 5 throttle setting.

In another embodiment, the motive control signal 418 cannot be set outside (above or below) its operational range, and actuating the secondary throttle control 406 for a positive or negative adjustment, when the primary throttle control 404 is at its maximum and designated/minimum levels, respectively, has no effect. For example, if the primary throttle control 404 is set at a maximum notch or other throttle setting of 8, and the first control input 424 (corresponding to a 0.1 positive adjustment factor) is actuated, this has no effect on the motive control signal 418.

In an embodiment of the system 400, information 430 about the motive control signal 418 (in effect, information about the primary control output signal 412 as adjusted by the secondary control output signal 428) is communicated over a communication channel from the vehicle 402 to another vehicle in a consist that is not equipped with a secondary throttle control 406. The other vehicle is controlled based on the information 430, e.g., the information 430 may be fed to a motive control unit 414 of the other vehicle for outputting a motive control signal 418 to control traction unit 416 based on the information 430.

As should be appreciated, embodiments of the system 400 implement a secondary throttle control technique that confers more granular control of the throttle in a step-wise throttle system. Where "in between" traction output is desired, i.e., traction output that would be between existing discrete throttle settings, it eliminates the need to oscillate between the notches. The system will work by allowing an operator of a locomotive or other vehicle to increase a notch or other throttle setting by a measured increment.

In one aspect, the second manually adjustable control member 420 of the secondary throttle control 406 is implemented as, or as part of, a smart display (e.g., control touchscreen). Thus, "manually adjustable control member" means any functionality that allows an operator to select a control input, thereby including not only a button, switch, or other moveable control, but also software-based control selections. In another aspect, the secondary throttle control 406 is implemented as a stand-alone box that allows an operator to increase a vehicle throttle setting by a designated increment between primary discrete throttle settings, with the stand-alone box being configured for use in retrofitting an existing vehicle throttle control system. Thus, in an embodiment, the system 400 is implemented as a retrofit kit that includes: (i) the secondary throttle control 406 housed in a small housing that can be attached to a vehicle dashboard or other support surface in a control cabin; (ii) a software and/or hardware module (e.g., set of computer instructions contained on a tangible medium) for replacing or augmenting the existing motive control unit 414 of the vehicle to accept and function with secondary control output signals 428; and (iii) optionally, cables, wires, or other functional conduits (including wireless conduits) for connecting the secondary throttle control 406 to electrical power and to the motive control unit 414, or at least the secondary throttle control 406 is configured for accepting cables, wires, or other conduits for this purpose.

Although an adjustment factor of 0.1 is shown as an example in the drawings, other adjustment factors may be used instead. Additionally, the second manually adjustable control member 420 may be configured to allow an operator to select different levels of positive and/or negative adjustment factors, such as 0.1 and 0.5 positive adjustment factors and 0.1 and 0.5 negative adjustment factors. Also, as noted, the positive and negative adjustment factors do not have to be the same.

An embodiment of the inventive subject matter relates to a vehicle control method. The vehicle control method comprises generating a primary control output signal based on a current operator selection of a first one of a plurality of designated discrete throttle settings of a primary throttle control. (An output level of a traction unit of the vehicle is step-wise controlled based at least in part on the primary control output signal.) The method further comprises generating a secondary control output signal based on operator actuation of a secondary throttle control. The secondary control output signal is indicative of (contains information indicating) a positive or negative adjustment of the first one of the plurality of designated discrete throttle settings by a designated amount that is less than an amount of throttle variance between adjacent ones of the plurality of designated discrete throttle settings. The method further comprises generating a motive control signal based on the primary control output signal and the secondary control output signal, and controlling the output level of the traction unit based on the motive control signal.

Figure 17:
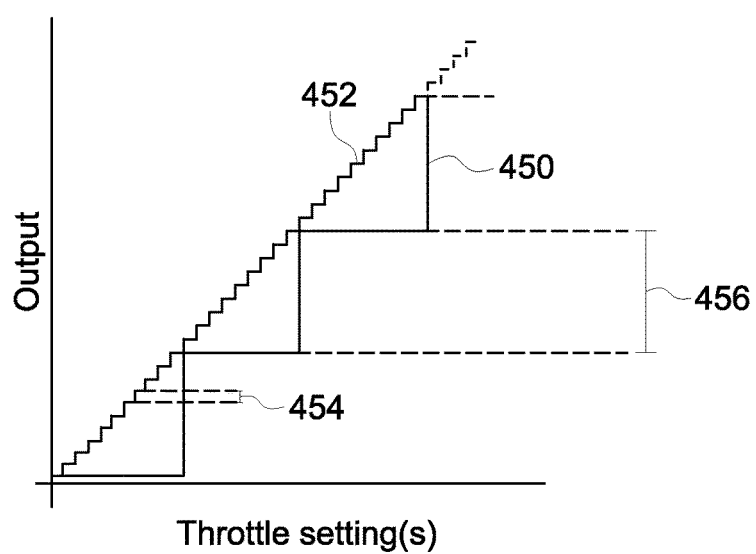
FIG. 17 is a graph of step-wise throttle settings, according to another embodiment.

With reference to FIGS. 16 and 17, another embodiment relates to a vehicle control method comprising controlling a traction unit of a vehicle as a first step-wise function 450 based on operator selection of any of a plurality of designated discrete throttle settings of a primary throttle control. The method further comprises controlling the traction unit as a second step-wise function 452 based on operator actuation of a secondary throttle control. The second step-wise function is indicative of a positive or negative adjustment of the designated discrete throttle settings by a designated amount 454 that is less than an amount 456 of throttle variance between adjacent ones of the plurality of designated discrete throttle settings.

Another embodiment relates to a method for communicating data in a vehicle consist. The method comprises determining that a first electronic component in a first vehicle of a vehicle consist is in a failure state. (The vehicle consist comprises at least the first vehicle and a second vehicle, with each vehicle in the consist being adjacent to and mechanically coupled with one or more other vehicles in the consist.) In the failure state, the first electronic component is unable to perform a designated function of the first electronic component. Upon determining the failure state, first data is transmitted from the first vehicle to a second electronic component on the second vehicle, the first data being transmitted over a communication channel linking the first vehicle and the second vehicle. The method further comprises operating the second electronic component based on the first data, wherein the second electronic component performs the designated function that the first electronic component is unable to perform.

In another embodiment of the method, the method comprises determining that a first electronic component in a first vehicle of the vehicle consist is in a failure state. First data is transmitted from the first vehicle to a second electronic component on a second vehicle of the vehicle consist; the first data is designated for the first electronic component, and is transmitted over a communication channel linking the first vehicle and the second vehicle. The method further comprises operating the second electronic component based on the first data, wherein the second electronic component is similar to the first electronic component. In another embodiment, the method further comprises transmitting return data from the second electronic component to the first vehicle over the communication channel, wherein the return data corresponds to a data format of the first electronic component, and wherein the return data is used by one or more third electronic components on the first vehicle.

Another embodiment relates to a method for communicating data in a vehicle consist. The method comprises, for each vehicle of a plurality of vehicles in the vehicle consist: monitoring at least one electronic component in the vehicle to determine if the at least one electronic component has failed; and for each of the at least one electronic component determined to have failed: transmitting first data from the vehicle or a second vehicle in the consist to a similar electronic component in a third vehicle in the consist, the first data being designated for the electronic component determined to have failed, and the first data being transmitted over a communication channel linking vehicles in the vehicle consist; and transmitting return data from the similar electronic component to one of the vehicles in the consist, the return data being generated by the similar electronic component based on the first data. Each of the first data and the return data may be high bandwidth network data. Additionally, the method may further comprise identifying a network address of the similar electronic component, wherein the first data is transmitted based on the network address.

In another embodiment, the method further comprises periodically regularly automatically transmitting high bandwidth information about respective operations of each of at least one of the plurality of vehicles in the vehicle consist over the communication channel to a designated one of the plurality of vehicles.

Another embodiment relates to a method for communicating data in a vehicle consist. The method comprises transmitting first data from a first vehicle in the consist to each of a second vehicle and a third vehicle in the consist, wherein the first data comprises non-network control information. The method further comprises initiating transmission of second data from the first vehicle to at least the third vehicle, wherein the second data comprises high bandwidth data and/or network data that at least partially overlaps the first data. (By "overlaps," it is meant relating to the same command function in a vehicle or vehicle consist, e.g., the first and second data may each contain throttle commands.) If the second data is available to the third vehicle, the third vehicle is controlled based on the second data; otherwise, the third vehicle is controlled based on the first data. The method further comprises controlling the second vehicle based on the first data, wherein the second vehicle is a legacy vehicle incompatible with the second data. According to another aspect, the first data and the second data may be transmitted over a cable bus interconnecting the first, second, and third vehicles, with the first data being orthogonal to the second data.

Figure 18:
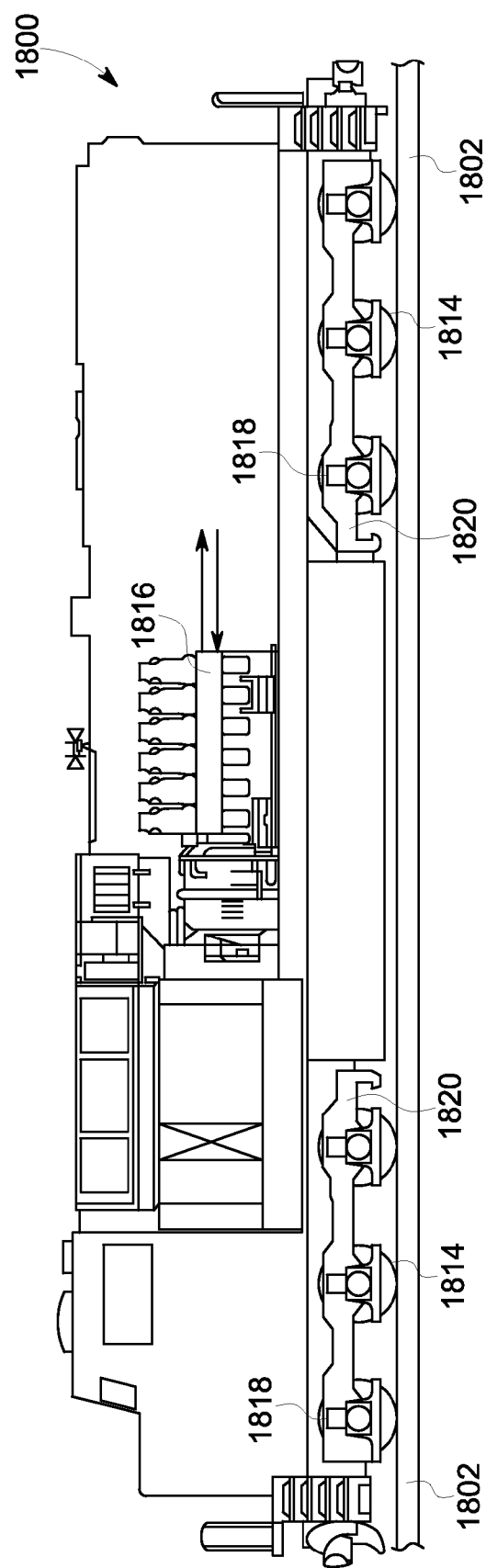
FIG. 18 is a schematic drawing of an exemplary vehicle.

Additional embodiments of the inventive subject matter relate to a system and method for vehicle control and, more particularly to system and method for vehicle control based on shared information of non-propulsion consumable resources. In some embodiments, the system and method for vehicle control may be configured for use in connection with a rail vehicle, such as a locomotive. FIG. 18 shows a schematic diagram of a vehicle 1800, herein depicted as a locomotive, configured to run on a route 1802 (e.g., a rail) via a plurality of wheels 1814. The vehicle 1800 may represent the same or a different vehicle as one or more of the other vehicles described herein, such as the vehicles 18a-c. As depicted, the rail vehicle 1800 includes an engine 1816, such as an internal combustion engine. A plurality of traction motors 1818 are mounted on a truck frame 1820, and are each connected to one or more of the plurality of wheels 1814 to provide tractive power to selectively propel and retard the motion of the rail vehicle 1800.

As used herein, "non-propulsion consumable resources" are resources which are constrained as to on-board available supply, at least with respect to a specific time period, but that are not related to vehicle propulsion (e.g., fuel or stored energy). Examples of non-propulsion consumable resources include sand or other tractive material in sand reservoirs/hoppers, and pressurized air in an air compressor system or reservoir contained on one or more rail vehicles. As will be readily appreciated, compressed air may technically be classified as an unlimited resource as long as there is energy to compress the air, but air availability is limited by compressor cycle time (e.g., if the compressed air reservoir is depleted there is a delay in re-charging/re-pressurizing the reservoir). In this respect, pressurized air may be considered a non-propulsion consumable resource, as its availability at any given time is limited at least in terms of compressor cycle time.

Figure 19:
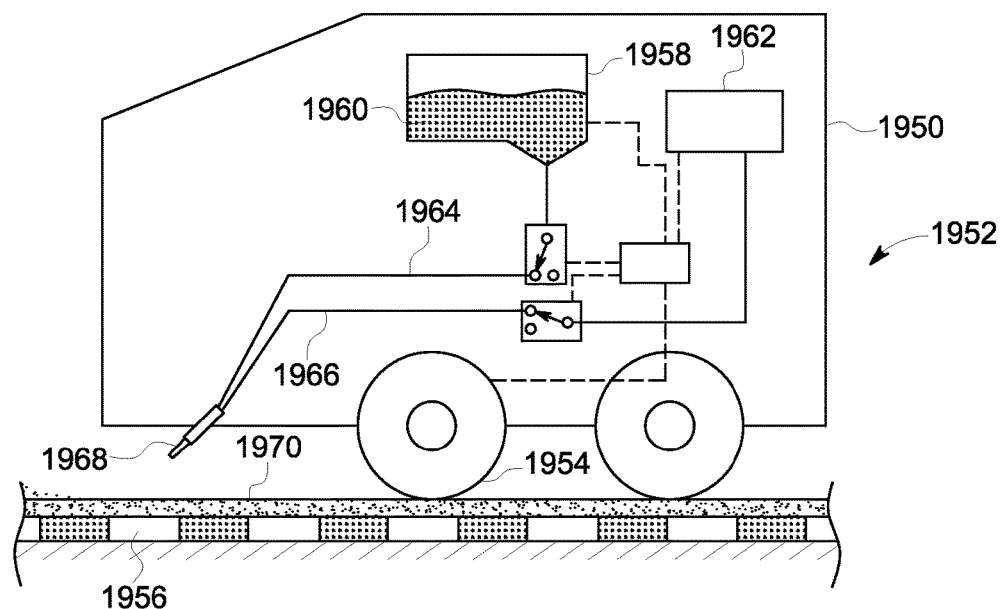
FIG. 19 is a schematic drawing of an exemplary vehicle having a tractive effort system that utilizes non-propulsion consumable resources.

FIG. 19 is a schematic view of a locomotive or other rail vehicle 1950 with on-board non-propulsion consumable resources that are utilized, in this case, by a tractive effort system 1952, as discussed in detail below. As shown therein, the rail vehicle 1950 has at least one wheel 1954 for traveling over a rail 1956. The tractive effort system 1952 includes a sand/tractive material reservoir 1958, in the form of a tank, capable of holding a volume of tractive material 1960. The system 1952 also includes an air reservoir 1962 containing a supply of pressurized air. The air reservoir 1962 may be a main reservoir equalization tank that enables the function of numerous operational components of the rail vehicle 1950, such as air brakes and the tractive effort system 1952, or it may be a dedicated air reservoir connected to an air compressor for use by tractive effort system 1952, alone. A tractive material conduit 1964 and an air supply conduit 1966 carry the tractive material 1960 from the tractive material reservoir 1958 and pressurized air from the air reservoir 1962, respectively, to a nozzle 1968, at which the tractive material 1960 is entrained in the pressurized air stream to accelerate the tractive material 1960 onto a contact surface 1970 of the rail 1956.

As will be readily appreciated, during use of the tractive effort system 1952, the available supply of tractive material 1960 in the reservoir 1958 is depleted. In addition, the pressure in the air reservoir 1962 similarly drops, at least until the air compressor cycles on and is able to restore the pressure level in the reservoir 1962. Prior to the pressure in the air reservoir being restored, however, there may not be enough pressure in the reservoir 1962 to operate other systems that utilize pressurized air from the reservoir 1962. In this manner, both the tractive material and the pressurized air are non-propulsion consumable resources. The system of the present invention, as discussed below, is intended to manage and control the use of such non-propulsion consumable resources to optimize performance and provide other advantages, as hereinafter discussed.

Figure 20:
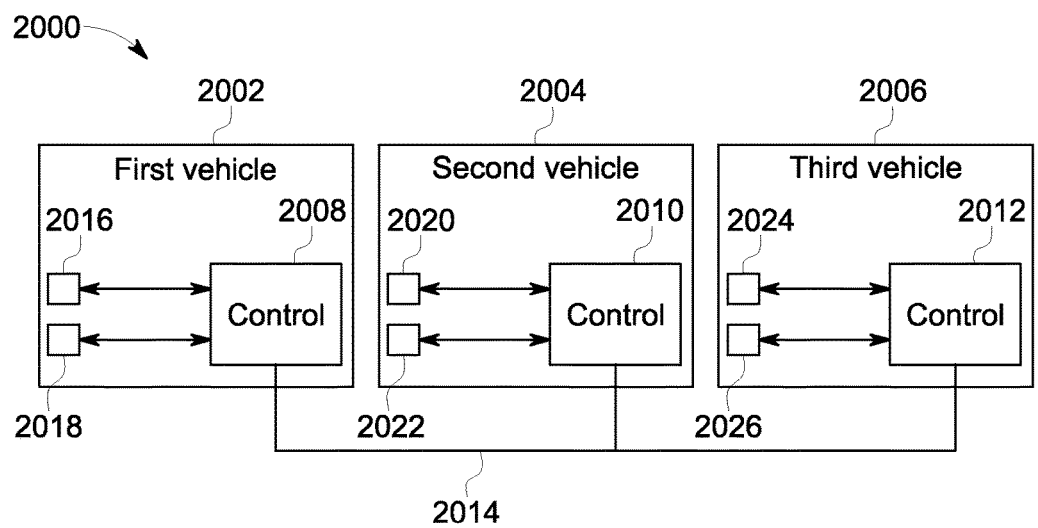
FIG. 20 is a block diagram of a system for vehicle control based on shared information of non-propulsion consumable resources, according to an embodiment of the inventive subject matter.

Referring to FIG. 20, a system 2000 for rail vehicle control according to an embodiment of the present invention is illustrated in the context of three vehicles 2002, 2004, 2006, shown in block form. The vehicles 2002, 2004, 2006 can represent locomotives, other rail vehicles, or other types of vehicles. Although the system is illustrated in a context of a three-locomotive consist, it is understood that the system and method of the present invention may also be implemented in a two-locomotive consist or in the consist having more than three locomotives. In addition, it is intended that the present invention not be limited to locomotives or train consists specifically, but that the system for rail vehicle control may be utilized in connection with rail vehicles and vehicle consists, generally.

As shown in FIG. 20, the first locomotive 2002 has a first locomotive control unit 2008 electrically coupled thereto that controls the operation of the locomotive and the systems contained thereon. Similarly, the second locomotive 2004 has a second locomotive control unit 2010 and the third rail vehicle has a third locomotive control unit 2012. Each of the control units 2008, 2010, 2012 may include a processor. As further shown in FIG. 20, the locomotive control units are interconnected by an intra-consist communications link 2014. It is contemplated that the link 2014 may be any wired or wireless link between the locomotive control units such as wired or wireless distributed power (i.e., remote and/or radio communications), the MU cable which often provides a hard wire communication link among locomotives in the consist (low bandwidth), or a high bandwidth/network communications link, e.g., Ethernet over an MU cable, as disclosed in the '214 Application. In an embodiment, the locomotive control units 2008, 2010 and 2012 constitute an operator control for use by the operator to control one or more systems contained on the locomotives of the consist. (Although three locomotives are shown schematically in FIG. 20, embodiments of the invention are applicable to: locomotive consists, or other consists of powered rail vehicles, "powered" rail vehicles referring to rail vehicles capable of self-propulsion; locomotives or other powered rail vehicles that are part of a larger consist and spaced apart from one another by one or more freight cars or other rail cars that are not capable of self-propulsion; or combinations thereof.

"Consist" generally refers to any group of linked rail vehicles, whereas locomotive consist or powered rail vehicle consist refers to a group of powered rail vehicles that are linked and immediately adjacent to one another. Thus, the communications link 2014 may extend between locomotives or other powered rail vehicles or other rail vehicles that are immediately adjacent and/or spaced apart in a larger consist.)

Generally, one of the locomotives 2002, 2004 and 2006 would be designated a lead locomotive in which an operator may ride. The operator would provide input to the control unit of the lead locomotive that would communicate corresponding input information to the other control units. In this respect, the control unit on the lead locomotive may function as a master control unit for the other locomotives in the consist.

Each locomotive 2002, 2004 and 2006 may be outfitted with various systems containing non-propulsion consumable resources that facilitate the operation of the locomotives or the consist as a whole and which may be utilized to perform various functions. For example, one or more of the locomotives 2002, 2004 and 2006 may have an on-board sand reservoir (or reservoir for holding another tractive material) that is part of an on-board tractive effort system, such as that described in PCT Application No. PCT/US2011/042943, which is hereby incorporated by reference herein in its entirety. During travel of the consist, sand or tractive material may be selectively dispensed from the reservoir onto the rail to increase wheel-rail adhesion during starts or when a locomotive is traveling up hill. Sand in the various sand dispensers is a consumable resource in the sense that there is a finite supply on board the consist which cannot immediately be replenished. Moreover, one or more of the locomotives may be outfitted with an on board air compressor system that is utilized to supply pressurized air to various systems and components, such as to the on-board tractive effort systems described above, and/or additional systems that utilize other non-propulsion consumable resources.

With further reference to FIG. 20, the first control unit 2008 may be in communication with a first locomotive sand/tractive material reservoir 2016 and a first air compressor and/or pressurized air reservoir 2018 on board the first locomotive 2002. Likewise, the second control unit 2010 may be in communication with a second sand/tractive material reservoir 2020 and a second air compressor/reservoir 2022 onboard the second locomotive 2004, and the third control unit 2012 may be in communication with a third sand/tractive material reservoir 2024 and a third air compressor/reservoir 2026 on board the third locomotive 2006.

Information regarding a level or other status of the non-propulsion consumable resources, e.g., the level of sand in the sand reservoirs 2016, 2020, 2024 and the pressure of air in the air compressors/reservoirs 2018, 2022, 2026, may be communicated to the respective locomotive control units 2008, 2010, 2012. In particular, the amount of any given non-propulsion consumable resource remaining on-board a given locomotive may be directly monitored in real-time using one or more sensors. In an embodiment, a sensor (not shown) is associated with the first locomotive air compressor/reservoir 2018, which can detect a pressure of the air within the reservoir and relay this value to the first locomotive control unit 2008. Similarly, a sensor or gauge (not shown) is associated with the first locomotive sand reservoir 2016, which can detect a level/volume of sand in the first locomotive sand reservoir and likewise input this value to the first locomotive control unit 2008. Known sensors may be employed. The second and third control units 2010, 2012 can receive information regarding the levels of the non-propulsion consumable resource contained on the second and third locomotives 2004, 2006, respectively, in the same manner.

In an embodiment, alternatively, each control unit 2008, 2010, 2012 may indirectly calculate the amount of any given non-propulsion consumable resource remaining on board the respective locomotives utilizing an algorithm or look-up tables stored in the control units. For example, the amount of sand remaining in the first locomotive sand reservoir 2016 may be determined by calculating the amount of sand dispensed from the reservoir 2016 during a single dispensing event based on the known flow rate of sand (which may be selectively set or varied as described in PCT Application No. PCT/US2011/042943, noted above) and duration of the dispensing event. The total amount of sand dispensed form the reservoir 2016 since the beginning of travel may then be calculated by adding up the calculated amount of sand dispensed over all dispensing events, and subtracting this value from the reservoir capacity or the starting volume of sand in the reservoir 2016. As will be readily appreciated, utilizing this "indirect" method, the amount of a non-propulsion consumable resource on-board a given locomotive is determined based on known parameters, rather than a direct reading from a sensor, gauge, etc.

In operation, throughout travel of the consist, each locomotive control unit 2008, 2010, 2012 collects and stores information regarding a level of the non-propulsion consumable resources remaining on the respective locomotives 2002, 2004, 2006 with which the control units are associated. Indeed, at any point during travel, the first locomotive control unit 2008 stores values representing the amount of sand remaining in the first locomotive sand reservoir 2016, the pressure in the first locomotive air reservoir 2018, etc. The second and third locomotive control units 2010, 2012 similarly store values representing the status of non-propulsion consumable resources remaining on-board the second and third locomotives 2004, 2006.

These stored values of the respective levels of the non-consumable resources of each locomotive are communicated or shared through the communications link 2014 to each of the locomotive control units 2008, 2010, 2012, or to a designated one or more of the control units. In an embodiment, all of the non-propulsion consumable resource level values are communicated to the control unit on-board the locomotive that has been designated as the lead locomotive. In this respect, the control unit on-board the designated lead locomotive functions as a "master" control unit, as discussed hereinafter. In another embodiment, the locomotives 2002, 2004, 2006 may keep track of the non-propulsion consumable resource status across all such locomotives in a coordinated or distributed manner.

In the embodiment where a "master" control unit is designated, the master control unit may then prioritize the use of the non-propulsion consumable resources across the entire consist according to a control algorithm, e.g., in dependence upon one or more pre-set parameters. In particular, the master control unit, or any one or more of the control units 2008, 2010, 2012, may have an algorithm embodied within the processor(s) of the control units having access to the stored resource levels to create a non-propulsion consumable resource priority plan that optimizes or otherwise manages the use of the non-propulsion consumable resources in the consist in accordance with the one or more predetermined parameters. In another embodiment, the control unit may prioritize the use of the non-propulsion consumable resources on the locomotive or rail vehicle in the consist having the most of such resources, or if one locomotive is particularly low on such resources (e.g., below a designated threshold in comparison to levels on other vehicles), prioritize the use of the resources from another locomotive.

In an embodiment, when determining how to prioritize the use of the non-consumable resources on-board the various locomotives in the consist, the system 2000 will take into account whether and to what extent using resources in the various locomotives is fungible. Thus, if the system 2000 would otherwise prioritize using sand from the first locomotive 2002 over the second locomotive 2004, but using sand of the first locomotive 2002 is not equivalent, e.g., in terms of effectiveness or the like, to using sand of the second locomotive 2004 (within established parameters), then the system will not do so. For example, for a consist with three locomotives immediately adjacent one another, applying sand from a second locomotive (e.g., locomotive 2004) instead of the first locomotive (e.g., locomotive 2002) might be sufficiently acceptable, from a sand performance or tractive effort level. If the second locomotive, however, is instead in the rear of the consist, away from the lead/first locomotive, then this might not be the case.

By monitoring the use and level of non-propulsion consumable resources across all the locomotives of a consist, and adjusting/tailoring the use of such resources in dependence upon the monitored level of resources across all locomotives in the consist (and/or in dependence upon other predetermined parameters), a more even distribution of wear and even consumption of resources across the consist can be realized. For example, the various systems utilizing a certain non-propulsion consumable resources may be replaced or serviced simultaneously as they exhibit wear at the same rate, rather than having to take the consist out of service to replace, e.g., a tractive effort system on one locomotive, and six-months later take the consist out of service again to replace the tractive effort system on another locomotive. Accordingly, efficiency of the consist as a whole is improved and cost savings may be realized.

In an embodiment, it is contemplated that the system 2000 of the present invention may be implemented and utilized in conjunction with an on-board energy management system, such as that described in U.S. Patent Application Publication No. 2007/0219680, which is hereby incorporated by reference in its entirety.

Figure 21:
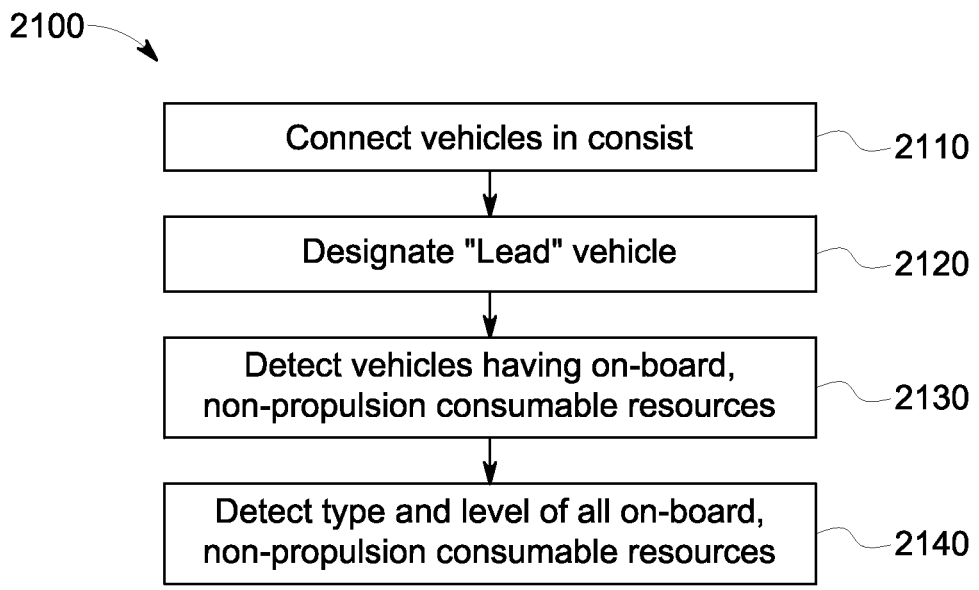
FIG. 21 is a flowchart illustrating a simplified subroutine of a method for vehicle control based on shared information of non-propulsion consumable resources, according to an embodiment of the inventive subject matter.

FIG. 21 illustrates a method 2100 for rail vehicle control based on shared information of non-propulsion consumable resources, according to an embodiment of the present invention. In particular, FIG. 21 illustrates a simplified subroutine of a method 2100 for rail vehicle control as carried out by the system 2000 described above. At 2110, two or more rail vehicles are coupled, either directly adjacent one another or spaced apart, in a rail vehicle consist. This coupling also provides a communication link between the rail vehicles, as discussed above. As shown at 2120, a lead rail vehicle or master rail vehicle and control unit may then be designated. All vehicles carrying on-board, non-propulsion consumable resources are then automatically detected by the master control unit, as shown at 2130. At 2140, after the non-propulsion consumable resource carrying vehicles are detected, the type and level of non-propulsion consumable resource is detected and a system starting set point is determined.

As discussed above, according to the control algorithm, the control unit then adjusts the use of the non-propulsion consumable resources from the respective rail vehicles carrying such resources in dependence upon set (e.g., designated) parameters. For example, the rail vehicle having the lowest available supply of a given resource may be designated "lowest" use priority while the rail vehicle having the greatest available supply may be designated "highest" use priority. In this manner, the control unit may create a usage "schedule" to optimize or otherwise manage the use of the non-propulsion consumable resources by the consist. As another example, the designated parameters may include relative levels of the non-propulsion consumable resources, plus a determination of whether use of the non-propulsion consumable resources in different rail vehicles is functionally fungible. Thus, the control unit may be configured (e.g., according to an algorithm embodied as a set of instructions stored in a non-transient medium and accessible by the control unit) to: receive information about determined levels of the non-propulsion consumable resources in two or more rail vehicles; identify a subset of the two or more rail vehicles where use of the non-propulsion consumable resources is fungible (e.g., using the non-propulsion consumable resources in one vehicle is functionally the same as using the non-propulsion consumable resources in another vehicle, or functionally the same within a designated threshold); and prioritize use of the non-propulsion consumable resources between the vehicles of the identified subset, e.g., between two of the vehicles of the subset, a first one of the vehicles having a greater amount of the non-propulsion consumable resource than a second one of the vehicles, using the non-propulsion consumable resource of the first vehicle before the non-propulsion consumable resource of the second vehicle, at least until the levels are balanced.

In embodiments, a control unit is configured to determine priority of use of a non-propulsion consumable resource based on whether use of the non-propulsion consumable resource is functionally fungible as between two or more rail vehicles. In one embodiment, the control unit is configured to generate control signals such that the non-propulsion consumable resource is firstly used on the rail vehicle having the most of the non-propulsion consumable resource, but only if such use is functionally the same in terms of consist operation (versus using the non-propulsion consumable resource on another vehicle). In another embodiment, the non-propulsion consumable resource is firstly used on the rail vehicle having the most of the non-propulsion consumable resource, but only if such use is functionally the same in terms of consist operation within a designated threshold, such as 5% or 10%. That is, if using the non-propulsion consumable resource on the rail vehicle have the most of the non-propulsion consumable resource will still provide the same functionality within 5% or 10%, for example, then the non-propulsion consumable resource is first used in that rail vehicle. In another embodiment, the control unit is additionally configured to take into account the degree to which there is a disparity between levels of the non-propulsion consumable resource, either generally or in regards to determining if using the resource if functionally fungible. For example, the control unit may be configured to default to using the non-propulsion consumable resource in a first rail vehicle (e.g., a designated lead rail vehicle) unless the level of the non-propulsion consumable resource on the first rail vehicle is less than the level on other, functionally fungible rail vehicles by a designated amount. In another example, the control unit is configured to prioritize use of the non-propulsion consumable resource based on a sliding scale of: (i) relative levels of the resource; and (ii) functional differences within various designated ranges. Thus, as between two rail vehicles in a consist, if the first rail vehicle has more of the non-propulsion consumable resource than the second rail vehicle, then the control unit may be configured to use the non-propulsion consumable resource firstly on the first rail vehicle if, for example: (i) the levels are apart by at least a first designated amount (e.g., 5%) and the functionality (of using the resource on the first rail vehicle versus using the resource on the second rail vehicle) is the same or within a second designated amount (e.g., 5%); or (ii) the levels are apart by at least a third designated amount that is greater than the first designated amount (e.g., 20%) and the functionality is within a fourth designated amount that is greater than the second designated amount (e.g., 10%); or (iii) the levels are apart by at least a fifth designated amount that is greater than the third designated amount (e.g., 90%) and the functionality is within a sixth designated amount that is greater than the fourth designated amount (e.g., 50%). In other words, the greater the disparity between resource levels (such as one vehicle being relatively very low on the resource), the more likely it is that the control unit will use the resource on another rail vehicle with more of the resource, even if doing so is less effective.

In another embodiment, a control unit may be configured to create a usage schedule to manage the use of the non-propulsion consumable resources in at least first and second rail vehicles. The control unit receives first information about the non-propulsion consumable resources, such as the respective currently available level of the non-propulsion consumable resource in each rail vehicle. The control unit receives, and/or has access to, respective second information about how each rail vehicle uses the non-propulsion consumable resource (e.g., rates of use), what effect the use has in relation to the consist as a whole, and/or what capability each rail vehicle has, if any, for re-generating the non-propulsion consumable resource over time (for example, it may be the case that pressurized air can be regenerated over time by an on-board air compressor). Based on the first and second information, the control unit then generates the schedule, which specifies, over a time period, which rail vehicles will use the non-propulsion consumable resources during which portions of the time period. For example, in the case where use of the non-propulsion consumable resource is functionally fungible as between plural rail vehicles in a consist, the schedule may comprise: using the non-propulsion consumable resource of the rail vehicle having the most of the resource, until there is no longer a disparity; and then sequentially switching to using the non-propulsion consumable resource on all the rail vehicles, each for a designated time period, for both load balancing and balancing in-service time.

Figure 22:
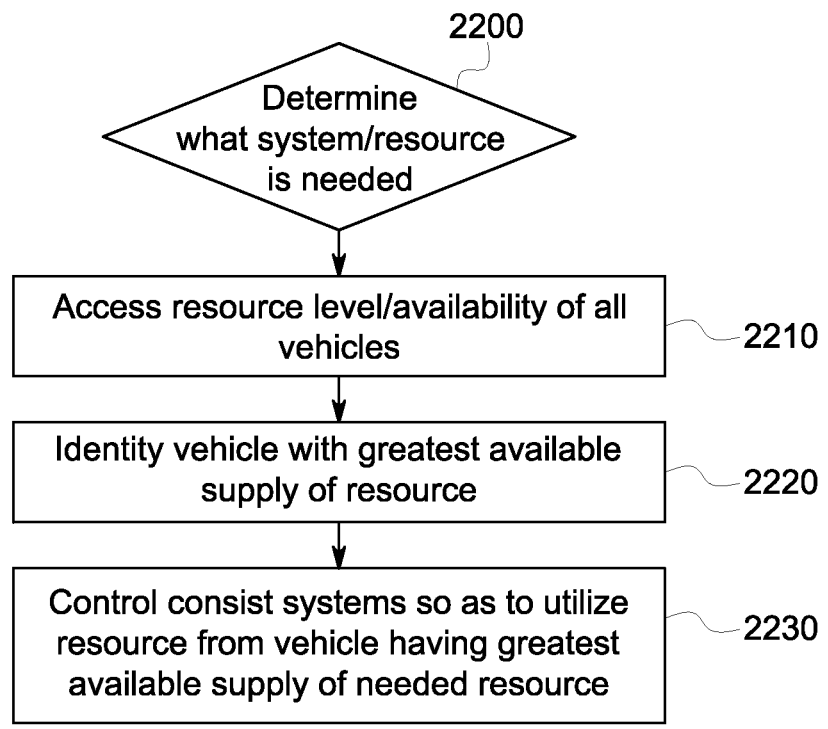
FIG. 22 is a flowchart illustrating a simplified control subroutine of a method for vehicle control based on shared information of non-propulsion consumable resources, according to an embodiment of the inventive subject matter.

A control subroutine (for the control of non-propulsion consumable resources) is depicted in FIG. 22. As shown at 2200, an operator or an on-board computer selects a specific system that utilizes a non-propulsion consumable resource. For example, if traction is need to facilitate the consist moving from a dead stop or on an incline, an operator may call upon a tractive effort system on-board one of the vehicles in the consist to increase wheel-to-route (e.g., wheel-to-rail) adhesion. Upon selection, the designated lead vehicle (and designated/determined master control unit) directly or indirectly assesses the non-propulsion consumable resource level available on one or more of the vehicles, or on each vehicle, as shown at 2210. In the present example of the need to increase tractive effort, the control unit may assess the tractive material and pressurized air level available on each vehicle. The control unit then identifies the vehicle with the greatest available amount of the non-propulsion consumable resource (e.g., at 2220, or identifies a vehicle having more of the consumable resource than one or more other vehicles) and then controls the consist so as to utilize the resource from the vehicle having the greatest available supply (e.g., at 2230, or controls the consist so as to utilize the resource from the vehicle having more of the resource than one or more other vehicles). In the present example, the control unit initiates the tractive effort system on the vehicle having the greatest available supply of tractive material and/or pressurized air. Alternatively, 2220 may involve the use of a control algorithm to determine which vehicle the demanded resource should be drawn from, in dependence upon one or more predetermined parameters, as discussed above (e.g., it may not depend solely on available supply).

As further shown in FIG. 22, if increased wheel-to-route adhesion is still needed, the control unit may again assess the non-propulsion consumable resource level available on each rail vehicle and again proceed with 2220 and 2230, as hereinbefore described, until the consist can travel freely without slippage.

An embodiment of the inventive subject matter relates to a system for controlling a consist of at least first and second rail vehicles (or other vehicles). The system comprises a first control unit electrically coupled to the first rail vehicle, and a second control unit electrically coupled to the second rail vehicle. The first control unit is configured to receive first signals representing a level of a non-propulsion consumable resource on-board the first rail vehicle. The second control unit is configured to receive second signals representing a level of a non-propulsion consumable resource on-board the second rail vehicle. The first control unit and the second control unit are further configured to communicate information of the level of the non-propulsion consumable resource on-board the first rail vehicle and the level of the non-propulsion consumable resource on-board the second rail vehicle, respectively, to one another over a communication link. In another embodiment, at least one of the first control unit and the second control unit is configured to prioritize use of the non-propulsion consumable resources on-board the first and second rail vehicles in dependence upon at least one parameter. For example, at least one of the first control unit and/or the second control unit may include a processor configured for prioritizing the use of the non-propulsion consumable resources on-board the first and second rail vehicles in dependence upon at least one parameter. The parameter(s) may include a position of the first rail vehicle with respect to the position of the second rail vehicle in the consist. An algorithm embodied within the processor having access to the levels of non-propulsion consumable resources available on-board the first and second rail vehicles may be utilized to create a schedule that optimizes the use of the non-propulsion consumable resources on-board the first and second rail vehicles. The non-propulsion consumable resource may be a tractive material for use in an on-board tractive effort system or compressed air. The communication link may be a high-bandwidth communication link and/or a remote or radio communication link.

In one embodiment, a system for rail vehicle control comprises a control unit for a first rail vehicle in a consist. The control unit is configured to be electrically coupled with the first rail vehicle. The control unit comprises a processor, and is further configured to receive signals indicative of amounts of a non-propulsion consumable resource available on-board the first rail vehicle and other rail vehicles in the consist. The control unit further comprises a set of instructions stored in a non-transient medium accessible by the processor. The instructions are configured to control the processor to create a schedule that manages the use of the non-propulsion consumable resource by the consist based on the signals indicative of the amounts of the non-propulsion consumable resource available on-board the first and other rail vehicles in the consist. The non-propulsion consumable resource may a tractive material for use in an on-board tractive effort system or compressed air for use for various purposes. The amount of non-propulsion consumable resources available on-board each rail vehicle in the consist may transmitted to the control unit via a communication link including an Ethernet over MU communication link. Each of the rail vehicles in the consist may include a sensor for determining the amount of non-propulsion consumable resource on-board the rail vehicle, wherein each sensor is in communication with the control unit for transmitting the amount of non-propulsion consumable resource thereto.

According to another embodiment, a method for rail vehicle control comprises a step of receiving information of a determined first amount of a non-propulsion consumable resource available on-board a first rail vehicle in a consist. (The first amount may be determined on the first rail vehicle using sensors, for example, with information of the output of the sensors being subsequently communicated.) The method further comprises receiving information of a determined second amount of the non-propulsion consumable resource available on-board a second rail vehicle in the consist. (The second amount may be determined on the second rail vehicle using sensors, for example, with information of the output of the sensors being subsequently communicated.) The method further comprises prioritizing use of the non-propulsion consumable resource in dependence upon the determined first and second amounts. The step of prioritizing the use of the non-propulsion consumable resource can include the step of determining a position of the first rail vehicle with respect to the second rail vehicle within the consist. The method may also include the step of sharing the determined amounts of the non-propulsion consumable resource between the first and second rail vehicle via a communication link. The communication link may be one of remote or a radio communications, low bandwidth communications and high bandwidth communications. Moreover, the step of prioritizing use of the non-propulsion consumable resource may include the steps of comparing the determined amount of the resource on-board the first rail vehicle with the determined amount of the resource on-board the second rail vehicle and controlling the rail vehicles so as to utilize the resource from the rail vehicle having a greater amount of the resource.

Figure 23:
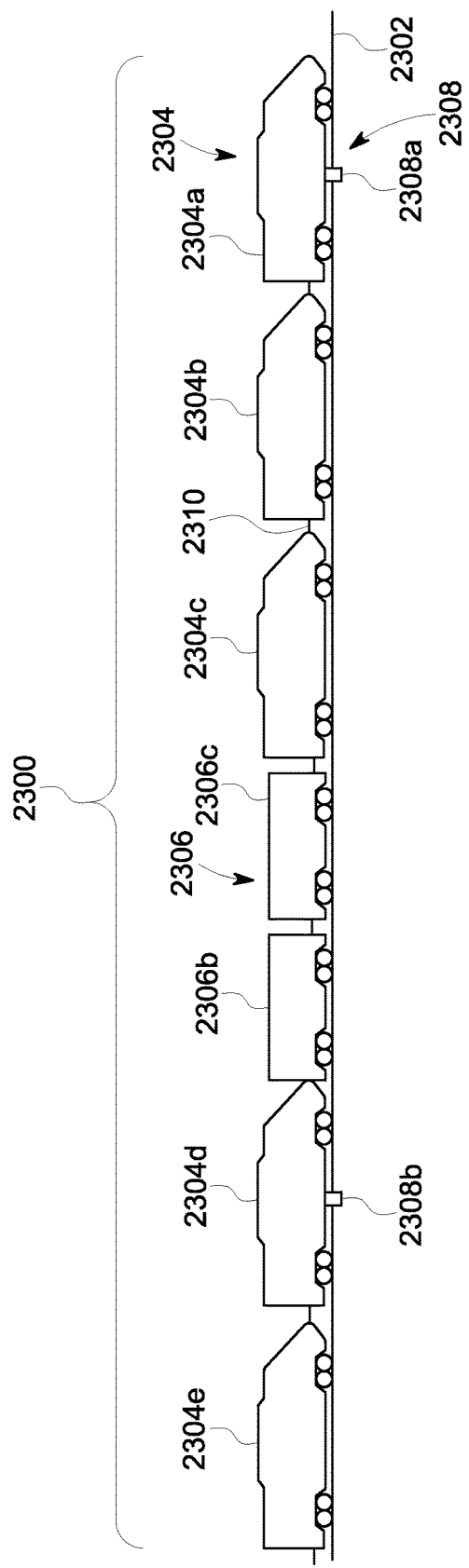
FIG. 23 is a schematic diagram of a vehicle system traveling along a route in accordance with one embodiment of the inventive subject matter.

FIG. 23 is a schematic diagram of a vehicle system 2300 traveling along a route 2302 in accordance with one embodiment of the inventive subject matter. The vehicle system 2300 includes several powered vehicles 2304 (e.g., powered vehicles 2304A-E) and several non-powered vehicles 2306 (e.g., non-powered vehicles 2306A-B) mechanically interconnected with each other such that the vehicles 2304, 2306 travel together as a unit. The vehicles 2304, 2306 may be connected with each other by coupler devices 2310. The terms "powered" and "non-powered" indicate the capability of the different vehicles 2304, 2306 to self-propel. For example, the powered vehicles 2304 represent vehicles that are capable of self-propulsion (e.g., that include motors that generate tractive effort). The non-powered vehicles 2306 represent vehicles that are incapable of self-propulsion (e.g., do not include motors that generate tractive effort), but may otherwise receive or use electric current for one or more purposes other than propulsion. In the illustrated embodiment, the powered vehicles 2304 are locomotives and the non-powered vehicles 2306 are non-locomotive rail cars linked together in a train. (Examples of non-powered rail vehicles include box cars, tanker cars, flatbed cars, and other cargo cars, and certain types of passenger cars.) Alternatively, the vehicle system 2300, powered vehicles 2304, and/or non-powered vehicles 2306 may represent another type of rail vehicle, another type of off-highway vehicle, automobiles, and the like. The route 2302 may represent a track, road, and the like. The vehicles 2304, 2306 may represent one or more of the other vehicles described herein and the vehicle system 2300 may represent one or more of the other systems or consists described herein.

In one embodiment, the vehicle system 2300 operates in a distributed power (DP) arrangement, where at least one powered unit 2304 is designated as a lead unit that controls or dictates operational settings (e.g., brake settings and/or throttle settings) of other powered units (e.g., trailing powered units 2304) in the vehicle system 2300. The powered units 2304 may communicate with each other to coordinate the operational settings according to the commands of the leading powered unit 2304 through one or more communication links, such as a wireless radio communication link, an electronically controlled pneumatic (ECP) brake line, and the like.

The vehicle system 2300 includes plural sensors 2308 (e.g., sensors 2308A, 2308B) that monitor the route 2302 for damage as the vehicle system 2300 moves along the route 2302. While only two sensors 2308 are shown in the illustrated embodiment, the vehicle system 2300 may include additional sensors 2308. Additionally, while the sensors 2308 are shown coupled with the powered vehicles 2304, one or more of the sensors 2308 may be coupled with a non-powered vehicle 2306. The sensors 2308 can examine the route 2302 for damage such as broken sections of a rail, pitted sections of a road or rail, cracks on an exterior surface or interior of a rail or road, and the like. The sensors 2308 may be the same or different types of sensors that examine the route 2302. By "types," it is meant that the sensors 2308 may use different technologies or techniques to examine the route 2302, such as ultrasound, electric current, magnetic fields, optics, acoustics, distance measurement, force displacement, and the like, representing some different technologies or techniques.

For example, with respect to ultrasound, one or more of the sensors 2308 may include an ultrasound transducer that emits ultrasound pulses into the route 2302 and monitors echoes of the pulses to identify potential damage to the route 2302. With respect to electric current, one or more of the sensors 2308 may include probes that measure the transmission of electric current through the route 2302, such as by using a section of the route 2302 to close a circuit, to identify damage to the route 2302. An opening of the circuit can be indicative of a broken portion of the route 2302, such as a broken rail. With respect to magnetic fields, one or more the sensors 2308 may measure eddy currents in the route 2302 when the route 2302 is exposed to a magnetic field. With respect to optics, the sensors 2308 may acquire video and/or static images of the route 2302 to identify damage to the route 2302. Alternatively or additionally, the sensors 2308 may use optics, such as laser light, to measure a profile, positions, or displacement of the route 2302 (e.g., displacement of rails of a track). With respect to acoustics, the sensors 2308 may monitor sounds, such as sounds created when the vehicle system 2300 travels over the route 2302, to identify damage to the route 2302. With respect to distance measurement, the sensors 2308 may include probes that engage the route 2302 to measure distances to or between portions of the route 2302 to identify damage. With respect to force displacement, the sensors 2308 may include probes that engage and attempt to push sections of the route 2302 to identify damage and/or strength of the route 2302.

The sensors 2308 that are in the vehicle system 2300 may be the same or different types of sensors 2308. Additionally or alternatively, one or more of the sensors 2308 may represent a sensor array that includes two or more of the same or different types of sensors 2308. The sensors 2308 acquire data (e.g., ultrasound data, electric circuit data, eddy current data, magnetic data, optic data, displacement data, force data, acoustic data, and the like) that represents a condition of the route 2302. This data is referred to as inspection data.

One of the sensors 2308A is positioned ahead of another one of the sensors 2308B along a direction of travel of the vehicle system 2300. The sensor 2308A that is positioned ahead of the sensor 2308B is referred to as a leading sensor while the sensor 2308B that is positioned behind or downstream from the leading sensor 2308A along the direction of travel of the vehicle system 2300 is referred to as a trailing sensor 2308B. The vehicle 2304, 2306 to which the leading sensor 2308A is coupled can be referred to as the leading vehicle (e.g., the leading powered vehicle 2304A) and the vehicle 2304, 2306 to which the trailing sensor 2308B is coupled is referred to as the trailing vehicle (e.g., the trailing powered vehicle 2304D).

As the vehicle system 2300 moves along the route 2302, the sensors 2308 acquire inspection data of the route 2302 to monitor the condition of the route 2302. The sensors 2308 obtain inspection data that is examined (e.g., by a route examination unit) to identify potential sections of interest in the route 2302 that may include damage to the route 2302, such as breaks in a rail, cracks in the route 2302, pitting in the route 2302, and the like.

Figure 24:
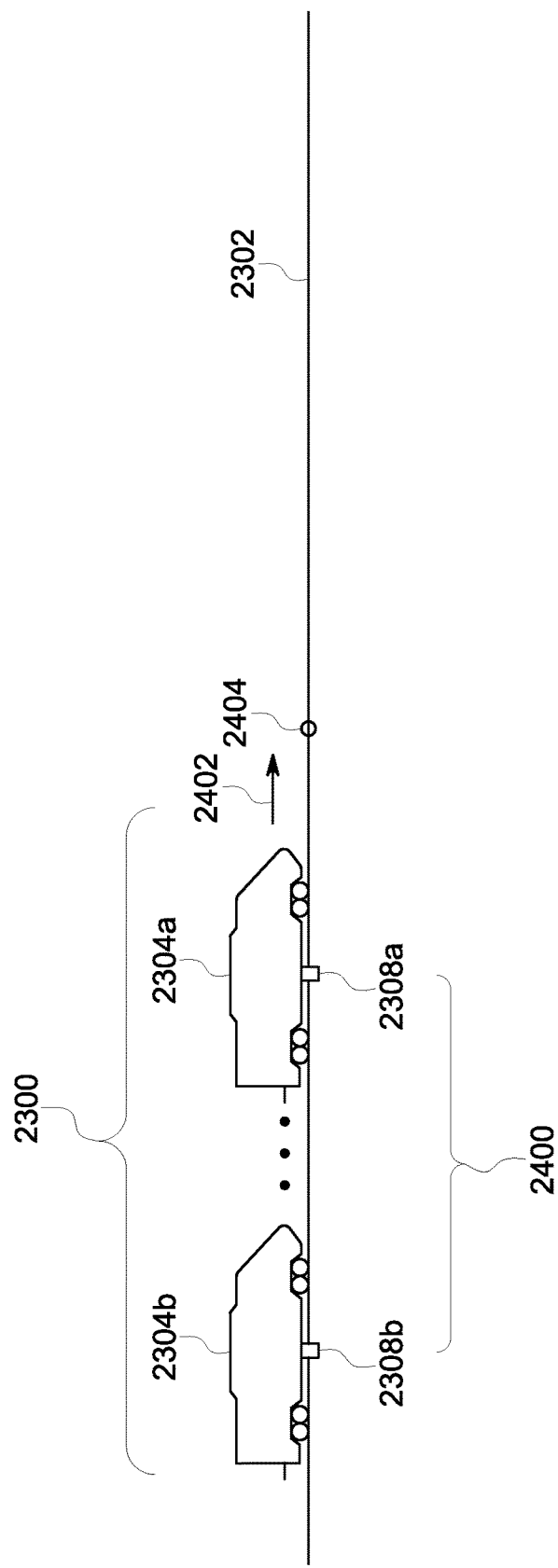
FIG. 24 illustrates one example of the vehicle system shown in FIG. 23 approaching a damaged portion of the route shown in FIG. 23.
Figure 25:
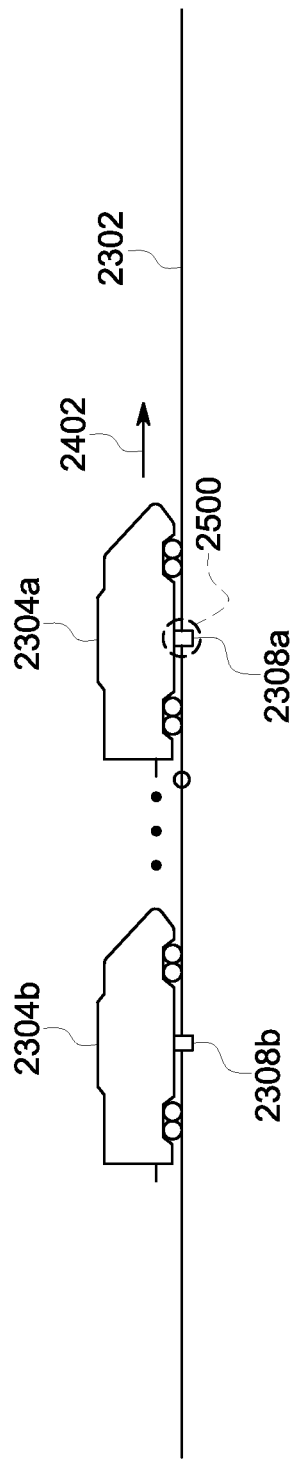
FIG. 25 illustrates one example of a leading sensor shown in FIG. 23 of a sensing system shown in FIG. 24 passing over the damaged portion of the route as shown in FIG. 24.
Figure 26:
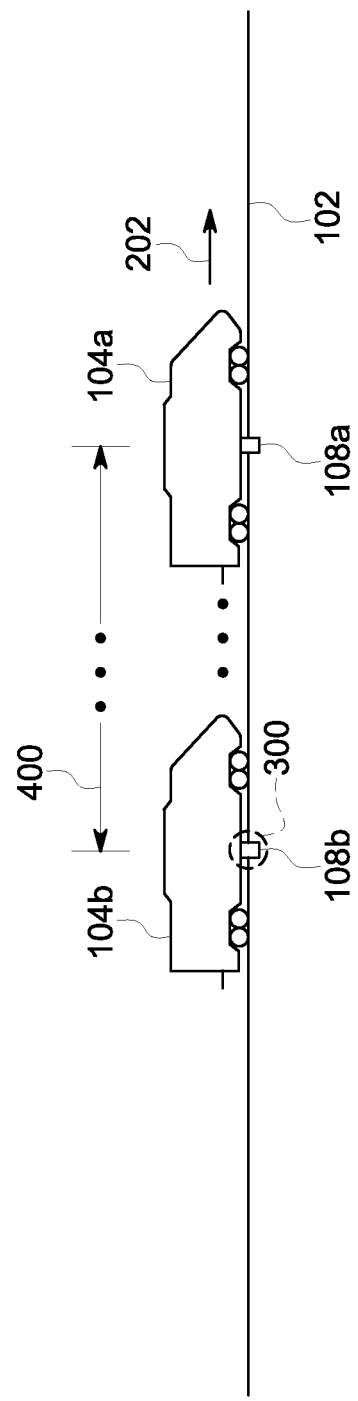
FIG. 26 illustrates a trailing sensor of the sensing system shown in FIG. 24 subsequently passing over the damaged portion of the route as shown in FIG. 24.

FIGS. 24 through 26 illustrate one example of operation of a sensing system 2400 of the vehicle system 2300. The sensing system 2400 includes the sensors 2308 of the vehicle system 2300. Only the leading and trailing vehicles 2304A, 2304B of the vehicle system 2300 are shown in FIG. 23, but, as described above, one or more powered and/or non-powered vehicles 2304, 2306 may be disposed between and interconnected with the leading and trailing vehicles 2304A, 2304B. FIG. 24 shows the vehicle system 2300 approaching a damaged portion 2404 of the route 2302, FIG. 25 shows the leading sensor 2308A of the sensing system 2400 passing over the damaged portion 2404 of the route 2302, and FIG. 26 shows the trailing sensor 2308B of the sensing system 2400 subsequently passing over the damaged portion 2404 of the route 2302. The damaged portions 2404 of the route 2302, such as sections of the route 2302 that include cracks, breaks, pitting, and the like.

In operation, the vehicle system 2300 moves along the route 2302 in a direction of travel 2402. The leading sensor 2308A may acquire inspection data of the route 2302 as the vehicle system 2300 moves along the route 2302. The leading sensor 2308A can acquire the inspection data on a periodic or continual basis, when automatically prompted by a control unit (described below) of the vehicle system 2300, and/or when manually prompted by an operator of the vehicle system 2300 using an input device (described below).

When the leading sensor 2308A passes over the damaged portion 2404 of the route 2302 (as shown in FIG. 23), the leading sensor 2308A may acquire inspection data representative of the damage to the route 2302 in the damaged portion 2404. This inspection data can be examined by the route examining unit (described below) of the vehicle system 2300 to identify potential damage to the route 2302. The sensing system 2400 can designate the section of the route 2302 that includes the identified potential damage as a section of interest 2500 in the route 2302. The section of interest 2500 may be identified as including portions of the route 2302 in addition to the location where the potential damage is identified. For example, the sensing system 2400 can designate the section of interest 2500 as including an additional margin (e.g., section) of the route 2302 ahead of and/or behind (e.g., along the direction of travel 2402) the location where the potential damage is identified. Designating the section of interest 2500 as including more of the route 2302 than just the exact location of where the potential damage is identified can increase the probability that the trailing sensor 2308B can acquire inspection data of the entire damage to the route 2302 in or near the damaged portion 2404.

Alternatively, the section of interest 2500 may represent an examined section of the route 2302, or a section of the route 2302 that is being examined for damage relative to other sections of the route 2302. For example, the leading sensor 2308A may be activated to acquire inspection data only for designated or selected (e.g., autonomously or manually selected) portions of the route 2302. The section of interest 2500 may represent at least one of the designated or selected portions that are associated with potential damage to the route 2302, as determined from the inspection data acquired by the leading sensor 2308A.

In response to identifying the section of interest 2500, the sensing system 2400 may direct the trailing sensor 2308B to acquire additional inspection data of the route 2302 in the section of interest 2500. In one embodiment, the trailing sensor 2308B is inactive (e.g., such as by being deactivated, turned OFF, or otherwise not obtaining inspection data of the route 2302) until activated by the sensing system 2400 in response to the section of interest 2500 being identified from inspection data acquired by the leading sensor 2308A. The sensing system 2400 can determine when the trailing sensor 2308B will pass over the section of interest 2500 (as shown in FIG. 24) based on one or more characteristics of the vehicle system 2300.

For example, the sensing system 2400 can determine when the trailing sensor 2308B will pass over the section of interest 2500 based on the velocity of the vehicle system 2300 along the direction of travel 2402 and a separation distance 2400 between the leading and trailing sensors 2308A, 2308B along the vehicle system 2300. In an embodiment where the vehicle system 2300 includes several vehicles 2304, 2306 following a curved route 2302 and/or undulating route 2302 (e.g., that passes over one or more hills, mounds, dips, and the like), the separation distance 2400 can be measured along the length of the vehicle system 2300 as the vehicle system 2300 curves and/or undulates along the route 2302. The sensing system 2400 can determine when the trailing sensor 2308B will pass over the section of interest 2500 based on the separation distance 2400 and the velocity of the vehicle system 2300 and then direct the trailing sensor 2308B to acquire the additional inspection data of the section of interest 2500 when (or just prior to) the trailing sensor 2308B passing over the section of interest 2500.

Alternatively, the trailing sensor 2308B may be actively acquiring additional inspection data of the route 2302 when the sensing system 2400 identifies the section of interest 2500 based on the inspection data from the leading sensor 2308A. The sensing system 2400 may then flag or otherwise designate the inspection data acquired by the trailing sensor 2308B when the trailing sensor 2308B passes over the section of interest 2500 as being inspection data of interest (e.g., data obtained from the section of interest 2500).

In response to identifying the section of interest 2500, the sensing system 2400 may direct the trailing sensor 2308B to acquire the additional inspection data at a greater (e.g., finer) resolution or resolution level relative to the inspection data acquired by the leading sensor 2308A. For example, the trailing sensor 2308B may be directed to acquire more measurements of the route 2302 per unit time than the leading sensor 2308A. Alternatively or additionally, the trailing sensor 2308B may be directed to acquire measurements having greater detail (e.g., data) of the potential damage to the route 2302 than the leading sensor 2308A. Alternatively or additionally, the trailing sensor 2308B may be directed to acquire a different type of inspection data of the route 2302 than the leading sensor 2308A. Alternatively or additionally, the trailing sensor 2308B may be directed to acquire more measurements (e.g., more inspection data) of the potential damage to the route 2302 than the leading sensor 2308A.

The sensing system 2400 may be in communication with a propulsion system (described below) of the vehicle system 2300 to coordinate movement of the vehicle system 2300 with the locations of the leading sensor 2308A and/or trailing sensor 2308B in response to identification of the section of interest 2700 in the route 2302.

For example, when the section of interest 2500 is identified based on the inspection data from the leading sensor 2308A, the sensing system 2400 may communicate with a controller (described below) of the vehicle system 2300 that autonomously controls the propulsion system of the vehicle system 2300 so that the velocity of the vehicle system 2300 slows down when the trailing sensor 2308B passes over the section of interest 2700. Alternatively or additionally, the controller may generate commands that are output to an operator of the vehicle system 2300 to direct the operator to manually control propulsion system of the vehicle system 2300 so that the velocity of the vehicle system 2300 slows down when the trailing sensor 2308B passes over the section of interest 2700. The vehicle system 2300 can slow down just prior to the trailing sensor 2308B passing over the section of interest 2700, as soon as the section of interest 2700 is identified, and/or when the trailing sensor 2308B reaches the section of interest 2700. The vehicle system 2300 may slow down so that the trailing sensor 2308B can acquire the additional inspection data at a higher resolution than the inspection data from the leading sensor 2308A. For example, if both the leading and trailing sensors 2308A, 2308B acquire inspection data at the same or approximately the same rate, then slowing down the vehicle system 2300 when the trailing sensor 2308B acquires the inspection data can allow for more inspection data (e.g., data at a higher resolution) from the trailing sensor 2308B than the inspection data from the leading sensor 2308A. Even if the leading and trailing sensors 2308A, 2308B acquire inspection data at different rates, slowing down the vehicle system 2300 can allow for the trailing sensor 2308B to acquire the inspection data at a greater resolution.

As another example, when the section of interest 2700 is identified based on the inspection data from the leading sensor 2308A, the sensing system 2400 may communicate with the propulsion system of the vehicle system 2300 in order to change a slack in one or more coupler devices 2310 between the connected vehicles 2304, 2306. For example, the propulsion system may change movement of the vehicle system 2300 so that forces exerted on one or more of the coupler devices 2310 are modified. The slack may be modified by reducing the slack (e.g., increasing the tensile forces on the coupler device 2310) between the trailing vehicle 2304B and one or more of the vehicles 2304, 2306 coupled with the trailing vehicle 2304B. Reducing the slack can allow for reduced movement of the trailing vehicle 2304B and the trailing sensor 2308B relative to the other vehicles 2304, 2306 in the vehicle system 2300. Such reduced movement also can reduce noise in the inspection data and/or erroneous inspection data acquired by the trailing sensor 2308B.

The operation of the vehicle system 2300 described above allows for the sensing system 2400 to acquire inspection data of one or more sections of interest 2700 in the route 2302 by two or more sensors 2308A, 2308B at two or more different locations in the vehicle system 2300 during a single pass of the vehicle system 2300 over the section of interest 2700. The multiple inspections may be performed to acquire different types of inspection data, different amounts of inspection data, inspection data at different resolutions, and the like, during a single pass of the vehicle system 2300 over the section of interest 2700.

Figure 27:
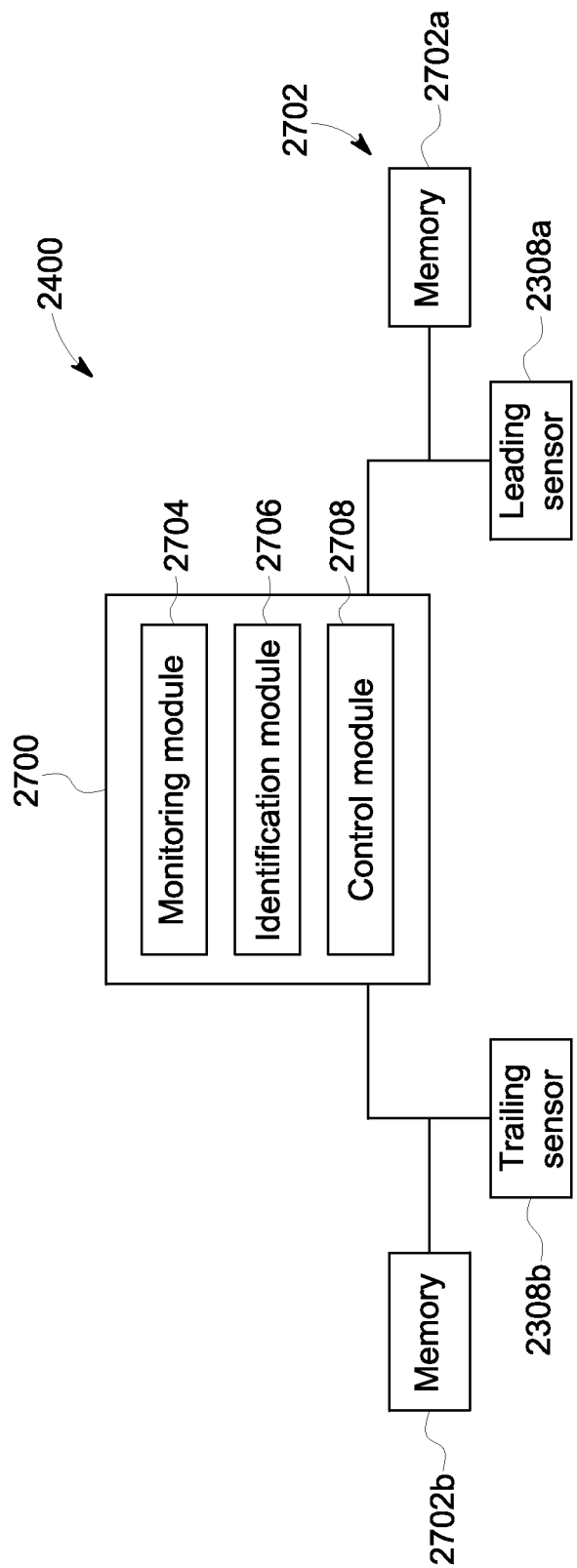
FIG. 27 is a schematic diagram of one embodiment of the sensing system shown in FIG. 24.

FIG. 27 is a schematic diagram of one embodiment of the sensing system 2400. The sensing system 2400 may be distributed among multiple vehicles 2304, 2306 (shown in FIG. 23) of the vehicle system 2300 (shown in FIG. 23). For example, a route examining unit 2700 of the sensing system 2400 may be disposed on the same or different vehicle 2304, 2306 as the leading sensor 2308A and/or the trailing sensor 2308B. The components of the sensing system 2400 may use one or more communication media to communicate data signals with each other. For example, the sensing system 2400 may communicate through the MU cable as described above, through the ECP train line as described above, through another conductive pathway, wirelessly, or a combination thereof. As used herein, the terms "unit" or "module" (such as the route examining unit 2700, communication unit, and the like) include a hardware and/or software system that operates to perform one or more functions. For example, a unit or module may include hardware circuits or circuitry that include and/or are coupled with one or more computer processors, controllers, and/or other logic-based devices that perform operations based on instructions stored on a tangible and non-transitory computer readable storage medium, such as a computer memory. Alternatively, a unit or module may include a hard-wired device that performs operations based on hard-wired logic of a processor, controller, or other device. In one or more embodiments, a unit or module includes or is associated with a tangible and non-transitory (e.g., not an electric signal) computer readable medium, such as a computer memory. The units or modules shown in the attached figures may represent the hardware that operates based on software or hardwired instructions, the computer readable medium used to store and/or provide the instructions, the software that directs hardware to perform the operations, or a combination thereof.

The route examining unit 2700 is communicatively coupled (e.g., by one or more wired and/or wireless communication links) with the leading sensor 2308A and the trailing sensor 2308B. The communication links can be wireless radio communications between powered units 2304 in a DP arrangement or configuration, as described above, communications over an ECP line, communications over the MU cable bus, and the like. The route examining unit 2700 is communicatively coupled with the sensors 2308A, 2308B to receive inspection data from the sensors 2308A, 2308B and to direct operations of the sensors 2308A, 2308B. For example, in response to receiving and examining the inspection data from the leading sensor 2308A, the route examining unit 2700 may direct the trailing sensor 2308B to acquire additional inspection data, as described above. In one embodiment, the inspection data obtained by one or more of the sensors 2308A, 2308B may be stored in a tangible and non-transitory computer readable storage medium, such as a computer memory 2702 (e.g., memories 2702A, 2702B). The memories 2702A, 2702B may be localized memories that are disposed at or near (e.g., on the same vehicle 2304, 2306) as the sensors 2308A, 2308B that store the inspection data on the respective memory 2702A, 2702B.

The route examining unit 2700 includes several modules that perform one or more functions of the route examining unit 2700 described herein. The modules include a monitoring module 2704 that monitors operations of the sensors 2308A, 2308B. The monitoring module 2704 may track which sensors 2308A, 2308B are acquiring inspection data (e.g., which sensors 2308 are active at one or more points in time) and/or monitor the health or condition of the sensors 2308 (e.g., whether any sensors 2308 are malfunctioning, such as by providing inspection data having noise above a designated threshold or a signal-to-noise ratio below a designated threshold). The monitoring module 2704 may monitor operations of the vehicle system 2300, such as the velocity of the vehicle system 2300 and/or forces exerted on one or more coupler devices 2310 (shown in FIG. 23) in the vehicle system 2300.

An identification module 2706 examines the inspection data provided by the sensors 2308. The identification module 2706 may receive the inspection data from the leading sensor 2308A and determine if the inspection data is indicative or representative of potential damage to the route 2302. For example, with respect to ultrasound data that is acquired as the inspection data, the identification module 2706 may examine the ultrasound echoes off the route 2302 to determine if the echoes represent potential damage to the route 2302. Additionally or alternatively, the identification module 2706 may form images from the ultrasound echoes and communicate the images to an output device (described below) so that an operator of the vehicle system 2300 can manually examine the images. The operator may then manually identify the potential damage and/or confirm identification of the potential damage by the identification module 2706.

The identification module 2706 may examine changes in electric current transmitted through the route 2302, such as by identifying openings or breaks in a circuit that is otherwise closed by the route 2302. The openings or breaks can represent a broken or damaged portion of the route 2302. The identification module 2706 can examine the eddy currents in the route 2302 when the route 2302 is exposed to a magnetic field in order to determine magnetoresistive responses of the route 2302 (e.g., a rail). Based on these responses, the identification module 2706 can identify potential cracks, breaks, and the like, in the route 2302.

The identification module 2706 can examine videos or images of the route 2302 to identify damage to the route 2302. Alternatively or additionally, the identification module 2706 may examine a profile, positions, or displacement of the route 2302 to identify potential damage. The identification module 2706 may form images from the videos, images, profiles, positions, or displacement and communicate the images to an output device (described below) so that an operator of the vehicle system 2300 can manually examine the images. The operator may then manually identify the potential damage and/or confirm identification of the potential damage by the identification module 2706.

The identification module 2706 can examine the sounds (e.g., frequency, duration, and the like) measured by the sensors 2308 to identify potential damage to the route 2302. The identification module 2706 can examine distances to or between portions of the route 2302 and compare these distances to known or designated distances to identify potential damage to the route 2302. The identification module 2706 may examine force measurements from probes of the sensors 2308 that engage and attempt to push sections of the route 2302 to identify potential damage and/or mechanical strength of the route 2302 (which can be indicative of potential damage to the route 2302).

The identification module 2706 identifies the location of the potential damage, such as by identifying where the section of interest 2500 (shown in FIG. 25) is located along the route 2302. The identification module 2706 may communicate with a location determination system (described below) of the vehicle system 2300 to determine where the section of interest 2500 is located. For example, upon identifying the potential damage, the identification module 2706 can obtain the current location of the vehicle system 2300 (or a previous location of the vehicle system 2300 that corresponds to when the inspection data indicative of the potential damage was acquired) and designate the location as the location of the section of interest 2500.

The route examining unit 2700 includes a control module 2708 that controls operations of the sensing system 2400. The control module 2708 can transmit signals to the sensors 2308 to direct the sensors 2308 to activate and/or begin collecting inspection data of the route 2302. The control module 2708 may instruct the sensors 2308 as to how much inspection data is to be obtained, the resolution of the inspection data to be obtained, when to begin collecting the inspection data, how long to collect the inspection data, and the like. The control module 2708 can communicate with the identification module 2706 to determine when potential damage to the route 2302 is identified.

In one embodiment, the control module 2708 automatically directs the sensors 2308 to acquire inspection data. For example, responsive to the leading sensor 2308A acquiring inspection data that is indicative of potential damage to the route 2302, the control module 2708 may autonomously (e.g., without operator intervention or action) direct the trailing sensor 2308B to begin acquiring the additional inspection data, as described herein.

The control module 2708 may select the resolution level at which the trailing sensor 2308B is to acquire the additional inspection data from among several available resolution levels (e.g., resolution levels that the trailing sensor 2308B is capable of acquiring). For example, the trailing sensor 2308B may be associated with several different resolution levels that acquire the inspection data at different resolutions. When the control module 2708 determines that the inspection data acquired by the leading sensor 2308A indicates potential damage to the route 2302, the control module 2708 can select at least one of the resolution levels of the trailing sensor 2308B and direct the trailing sensor 2308B to acquire the additional inspection level at the selected resolution level.

In one embodiment, the control module 2708 can autonomously select the resolution level (e.g., without operator input or intervention). For example, the control module 2708 can select the resolution level for the trailing sensor 2308B based on a current speed of the vehicle system 2300, a category of the potential damage to the route 2302, and/or a degree of the potential damage to the route 2302. Different resolution levels can be associated with different speeds, categories of damage, and/or degrees of damage. For example, faster speeds may be associated with greater resolution levels while slower speeds are associated with lower resolution levels. As another example, a category of damage that includes damage to the interior of the route 2302 (e.g., inside a rail) may be associated with greater resolution levels than a category of damage that includes damage to the exterior of the route 2302. In another example, greater degrees of damage (e.g., more damage, such as a larger volume of damage, larger pits, larger cracks, larger voids, and the like) may be associated with a different resolution level than lesser degrees of damage. Once the speed, category of damage, and/or degree of damage is determined by the control module 2708 (e.g., such as from a speed sensor described below and/or the identification module 2706 that identifies the category and/or degree of damage), the control module 2708 determines the associated resolution level, such as from information stored in an internal or external memory. The control module 2708 may then automatically direct the trailing sensor 2308B to acquire the additional inspection data at the selected resolution level.

Alternatively, upon identification of potential damage to the route 2302 from the inspection data acquired by the leading sensor 2308A, the control module 2708 may direct an output device (e.g., the device 2808 described below) to present the operator of the vehicle system 2300 with one or more choices of resolution levels. The resolution levels that are presented to the operator may be associated with the speed of the vehicle system 2300, category of damage, and/or degree of damage, as described above. The operator may then use an input device (e.g., the input device 2806 described below) to select the resolution level that is to be used by the trailing sensor 2308B to acquire the additional inspection data of the route 2302.

The control module 2708 can communicate with a control unit (described below) of the vehicle system 2300 to control or modify movement of the vehicle system 2300 in response to identification of potential damage to the route 2302. For example, in response to the identification module 2706 determining that the inspection data from the leading sensor 2308A is indicative of potential damage to the route 2302, the control module 2708 can instruct the control unit to slow down movement of the vehicle system 2300 prior to the trailing sensor 2308B passing over the section of interest 2700 and/or to alter movement of the vehicle system 2300 in order to change the slack in the vehicle system 2300, as described above.

Figure 28:
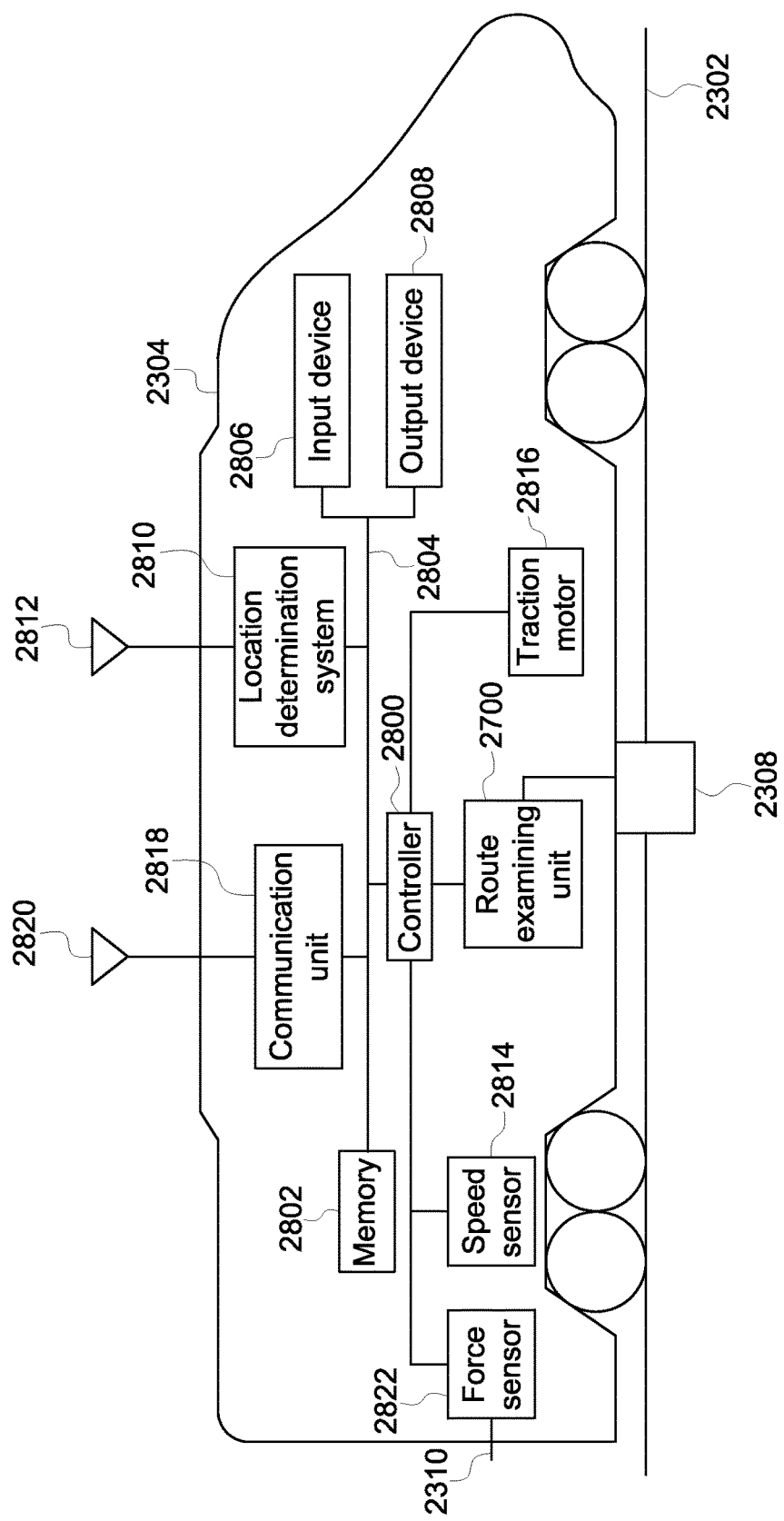
FIG. 28 is a schematic diagram of one embodiment of the vehicle shown in FIG. 23.

FIG. 28 is a schematic diagram of one embodiment of the powered vehicle 2304. The vehicle 2304 may represent the leading vehicle 2304A, the trailing vehicle 2304B, or another vehicle 2304 shown in FIG. 23. The vehicle 2304 includes a controller 2800 that controls operations of the vehicle 2304. The controller 2800 may be embodied in hardware and/or software systems that operate to control operations of the vehicle 2304 and/or vehicle system 2300. The controller 2800 may include one or more computer processors, controllers, and/or other logic-based devices that perform operations based on instructions stored on a tangible and non-transitory computer readable storage medium, such as a computer memory 2802. Alternatively or additionally, the controller 2800 may include a hard-wired device that performs operations based on hard-wired logic of a processor, controller, or other device.

The controller 2800 is communicatively coupled (e.g., with one or more wired and/or wireless communication links 2804) with various components used in operation of the vehicle 2304 and/or vehicle system 2300. The controller 2800 is communicatively coupled with an input device 2806 (e.g., levers, switches, touch screen, keypad, and the like) to receive manual input from an operator of the vehicle 2304 or vehicle system 2300 and an output device 2808 (e.g., display device, speakers, lights, haptic device, and the like) to present information to the operator of the vehicle 2304 or vehicle system 2300. The input device 2806 may be used by the operator to manually control when one or more of the sensors 2308 of the sensing system 2400 (shown in FIG. 2) collect inspection data of the route 2302, the resolution of the inspection data that is collected, the amount of inspection data that is collected, the type of inspection data that is acquired, and the like. The input device 2806 may be used by the operator to manually confirm identification of potential damage to the route 2302 based on the inspection data. The output device 2808 can present information concerning the potential damage to the route 2302 to the operator, such as the location of the section of interest 2700, information representative of the inspection data (e.g., video, images, numbers, values, and the like, of the inspection data).

A location determination system 2810 is communicatively coupled with the controller 2800. The location determination system 2810 obtains data representative of actual locations of the vehicle system 2300 and/or the vehicle 2304. The location determination system 2810 may wirelessly receive signals using transceiver and associated circuitry (shown as an antenna 2812 in FIG. 28), such as signals transmitted by Global Positioning System satellites, signals transmitted by cellular networks, and the like. The location determination system 2810 may use these signals to determine the location of the vehicle system 2300 and/or vehicle 2304, and/or convey the signals to the controller 2800 for determining the location of the vehicle system 2300 and/or vehicle 2304. In another embodiment, the location determination system 2810 may receive speed data indicative of the velocity of the vehicle system 2300 from a speed sensor 2814 of the vehicle 2304 (or another vehicle 2304, 2306 in the vehicle system 2300). The location determination system 2810 may determine the velocity of the vehicle system 2300 based on the speed data and can use an amount of time elapsed since passing or leaving a designated location in order to determine the current location of the vehicle system 2300 or vehicle 2304. As described above, the route examining unit 2700 (shown in FIG. 27) of the sensing system 2400 may communicate with the location determination system 2810 to obtain the location of the vehicle 2304 when the sensor 2308 identifies potential damage to the route 2302 in one embodiment.

The controller 2800 is communicatively coupled with a propulsion system that includes one or more traction motors (shown as "Traction Motor 2816" in FIG. 28) for providing tractive effort to propel the vehicle 2304. Although not shown in FIG. 28, the propulsion system may be powered from an on-board power source (e.g., engine and alternator, battery, and the like) and/or an off-board power source (e.g., electrified rail, catenary, and the like). The controller 2800 can communicate control signals to the propulsion system to control the speed, acceleration, and the like, of the vehicle 2304. The control signals may be based off of manual input received from the input device 2806 and/or may be autonomously generated.

For example, when the route examining unit 2700 identifies potential damage to the route 2302, the route examining unit 2700 may direct the controller 2800 to change movement of the vehicle system 2300. The route examining unit 2700 may direct the controller 2800 to slow down movement of the vehicle system 2300 in response to identification of the potential damage to the route 2302 by the leading sensor 2308A. The controller 2800 may then autonomously control the propulsion system of the vehicle 2304 to slow down movement of the vehicle 2304. With respect to other vehicles 2304, 2306 in the vehicle system 2300, the controller 2800 may transmit control signals to other vehicles 2304 that direct the vehicles 2304 also to autonomously slow down movement. A communication unit 2818 (e.g., transceiver circuitry and hardware, such as a wireless antenna 2820) may be communicatively coupled with the controller 2800 to communicate these control signals to the other vehicles 2304 in the vehicle system 2300 so that the other vehicles 2304 slow down movement of the vehicle system 2300. Additionally or alternatively, the communication unit 2818 may communicate with the other vehicles 2304, 2306 via one or more wired connections extending through the vehicle system 2300. In another embodiment, the controller 2800 may generate and communicate command signals to the output device 2808 that cause the output device 2808 to present information to the operator of the vehicle system 2300 to manually control the vehicle system 2300 to slow down the vehicle system 2300.

A force sensor 2822 is connected with the coupler device 2310 for measuring force data of the coupler device 2310. The force data may represent or be indicative of the amount of slack between the illustrated vehicle 2304 and another vehicle 2304 or 2306 coupled with the illustrated vehicle 2304 by the coupler device 2310. For example, the force data may represent tensile or compressive forces exerted by the coupler device 2310. Additionally or alternatively, the force data can include distance measurements to the other vehicle 2304, 2306 that is coupled with the illustrated vehicle 2304, which may represent or be indicative of the slack in the coupler device 2310. Additional force sensors 2802 may be disposed onboard other vehicles 2304, 2306 in the vehicle system 2300 to measure the force data of the coupler devices 2310 joining the other vehicles 2304, 2306. The force data may be communicated to the illustrated vehicle 2304 via the communication unit 2818.

The force data can be communicated to the route examining unit 2700 to be monitored, as described above. If the route examining unit 2700 determines that the slack between vehicles 2304, 2306 is to be changed (e.g., increased or reduced) in response to identification of potential damage to the route 2302 by the leading sensor 2308A, then the route examining unit 2700 can direct the controller 2800 to change movement of the vehicle system 2300 to effectuate the change in slack. The controller 2800 can transmit signals to the propulsion system of the illustrated vehicle 2304 and to other vehicles 2304, 2306 in the vehicle system 2300 to autonomously apply braking and/or tractive effort to alter the slack between the vehicles 2304, 2306 as requested by the route examining unit 2700. Alternatively, the controller 2800 may generate and communicate command signals to the output device 2808 that cause the output device 2808 to present information to the operator of the vehicle system 2300 to manually control the vehicle system 2300 to change the slack in the vehicle system 2300, such as by stretching out the coupler devices 2310 to reduce slack in the vehicle system 2300.

In one embodiment, the route examining unit 2700 may communicate with an off-board location, such as a dispatch center, a repair or maintenance facility, and the like, when potential damage to the route 2302 is identified. For example, in response to the route examining unit 2700 identifying potential damage to the route 2302 based on the inspection data obtained by the leading sensor 2308A and/or the damage being confirmed by examination of the additional inspection data obtained by the trailing sensor 2308B, the route examining unit 2700 may transmit a signal to the off-board location to request repair to the damaged portion 2404 of the route 2302. This signal may communicate the location of the section of interest 2700, the location of the actually damaged portion 2404, the time at which the damage was identified, and/or an identification of the type or category of damage (e.g., external cracks, internal cracks, external pitting, internal voids, displacement of tracks, and the like) to the off-board location via the communication unit 2818. The type or category of damage can represent a classification of the damage. For example, one category of damage may be external damage to the route 2302 (e.g., damage that is on an exterior surface and/or extends to the exterior surface), while another category includes interior damage (e.g., damage that is inside the route 2302 and not on the exterior surface). As another example, other categories of damage may be defined by the evidence of the damage, such as categories of cracks, pits, voids, and the like. Alternatively, other categories may be used. The off-board location can then send a repair crew to fix and/or replace the damaged portion 2404 of the route 2302.

In another embodiment, the route examining unit 2700 may communicate with another vehicle or vehicle system (that is not coupled with the vehicle system 2300) to warn the other vehicle or vehicle system of the damaged portion 2404 of the route 2302. For example, in response to the route examining unit 2700 identifying potential damage to the route 2302 based on the inspection data obtained by the leading sensor 2308A and/or the damage being confirmed by examination of the additional inspection data obtained by the trailing sensor 2308B, the route examining unit 2700 may transmit a signal to one or more other vehicles or vehicle systems traveling on the route 2302 to warn the other vehicles or vehicle systems of the damaged portion 2404 of the route 2302. The signal may be transmitted to designated vehicles or vehicle systems (e.g., addressed to specific vehicles or vehicle systems as opposed to broadcast to any or several vehicles or vehicle systems within range) using the communication unit 2818. Alternatively, the signal may be broadcast for reception by any vehicles or vehicle systems within range of communication, as opposed to being addressed and sent to specific vehicles or vehicle systems. This signal may communicate the location of the section of interest 2700, the location of the actually damaged portion 2404, the time at which the damage was identified, and/or an identification of the type of damage (e.g., external cracks, internal cracks, external pitting, internal voids, displacement of tracks, and the like) to the off-board location via the communication unit 2818. The vehicles or vehicle systems that receive the signal may then adjust travel accordingly. For example, the vehicles or vehicle systems may change course to avoid traveling over the damaged portion 2404, may slow down when traveling over the damaged portion 2404, and the like.

Figure 29:
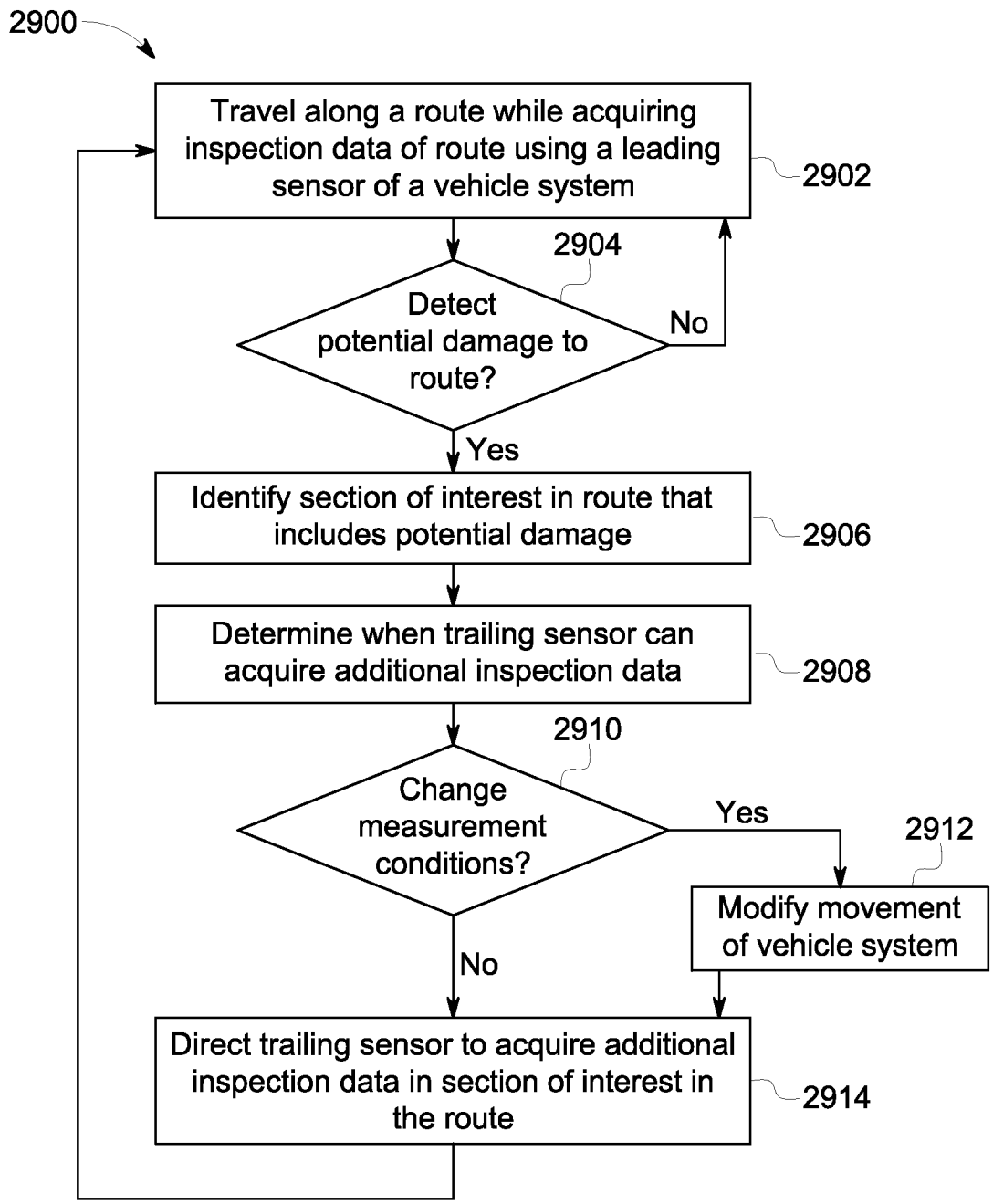
FIG. 29 is a flowchart of one embodiment of a method for obtaining inspection data of a potentially damaged route.

FIG. 29 is a flowchart of one embodiment of a method 2900 for obtaining inspection data of a potentially damaged route. The method 2900 may be used in conjunction with one or more embodiments of the sensing system 2400 (shown in FIG. 2). For example, the method 2900 may be used to acquire inspection data of the route 2302 (shown in FIG. 23) from plural sensors 2308 (shown in FIG. 23) or arrays of sensors 2308 in the vehicle system 2300 during a single pass of the vehicle system 2300 over the route 2302.

At 2902, the vehicle system 2300 travels along the route 2302 while acquiring inspection data of the route 2302 using the leading sensor 2308A of the vehicle system 2300. As described above, the leading sensor 2308A may acquire the inspection data periodically, continuously, and/or when manually or autonomously prompted to collect the data.

At 2904, a determination is made as to whether the inspection data obtained by the leading sensor 2308A is indicative of potential damage to the route 2302. As described above, the route examining unit 2700 (shown in FIG. 27) can determine if the inspection data from the leading sensor 2308A represents damage to the route 2302. If the inspection data does not indicate potential damage to the route 2302, then additional inspection data may not need to be acquired by the trailing sensor 2308B. As a result, flow of the method 2900 may return to 2902, where additional inspection data of the route 2302 is obtained. If the inspection data does indicate potential damage to the route 2302, however, then additional inspection data may be acquired by the trailing sensor 2308B. As a result, flow of the method 2900 may continue to 2906.

At 2906, the section of interest 2700 (shown in FIG. 3) of the route 2302 is identified. As described above, the section of interest 2700 is identified to include the portion of the route 2302 that includes the potential damage. The section of interest 2700 may be identified by determining the location of the leading sensor 2308A when the inspection data that is indicative of the potential damage was acquired.

At 2908, the time at which the trailing sensor 2308B is to acquire additional inspection data of the section of interest 2700 in the route 2302 is determined. This time may be determined based on the separation distance 2600 (shown in FIG. 26) and the velocity of the vehicle system 2300. Additionally or alternatively, this time may be determined based on the separation distance 400 and a designated upcoming change in the velocity of the vehicle system 2300, such as when the controller 2402 (shown in FIG. 24) directs the vehicle system 2300 to slow down for the trailing sensor 2308B, as described above.

At 2910, a determination is made as to whether measurement conditions of the vehicle system 2300 are to be changed for the trailing sensor 2308B. For example, a decision may be made as to whether the vehicle system 2300 should slow down to increase the resolution and/or amount of the additional inspection data acquired by the trailing sensor 2308B. This decision may additionally or alternatively include a determination of whether to reduce slack in the coupler devices 2310 of the vehicle system 2300 to stretch the vehicle system 2300 and reduce false readings by the trailing sensor 2308B. For example, reducing slack and stretching the vehicle system 2300 may eliminate false readings that may occur with the trailing sensor 2308B when the trailing vehicle 2304B suddenly jerks or accelerates relative to the other vehicles 2304, 2306.

If the measurement conditions of the vehicle system 2300 are to be changed, then the movement of the vehicle system 2300 may need to be modified. As a result, flow of the method 2900 may proceed to 2912. Otherwise, flow of the method 2900 may continue to 2914.

At 2912, movement of the vehicle system 2300 is modified, such as by slowing down speed of the vehicle system 2300 and/or changing slack of the vehicle system 2300. As described above, reducing the velocity of the vehicle system 2300 may allow more time for the trailing sensor 2308B to acquire the additional inspection data. Reducing the slack of the vehicle system 2300 (e.g., between the trailing vehicle 2304B and/or one or more other vehicles 2304, 2306) may reduce false readings made by the trailing sensor 2308B. For example, reducing the slack can stretch the vehicle system 2300 so that the trailing vehicle 2304B and the trailing sensor 2308B are not suddenly moved relative to the route 2302.

At 2914, the trailing sensor 2308B is directed to acquire additional inspection data in the section of interest 2700 of the route 2302. The trailing sensor 2308B may be directed to acquire the data at a time when the trailing sensor 2308B passes over the section of interest 2700. In one embodiment, the trailing sensor 2308B may only be activated to acquire the additional inspection data when the section of interest 2700 is identified based on the inspection data acquired by the leading sensor 2308A.

The inspection data acquired by the leading sensor 2308A and/or the trailing sensor 2308B may be used to identify and/or characterize damage to the route 2302. Acquiring different types of inspection data, acquiring different amounts of inspection data, acquiring the inspection data at different resolutions, and the like, during a single pass of the vehicle system 2300 over the potentially damaged portion of the route 2302 can be more efficient than using multiple, different, and/or separate systems or vehicle systems to examine the route 2302.

In another embodiment, a sensing system is provided that includes a leading sensor, a trailing sensor, and a route examining unit. The leading sensor is configured to be coupled to a vehicle system that travels along a route. The leading sensor also is configured to acquire first inspection data indicative of a condition of the route as the vehicle system travels over the route. The condition may represent the health (e.g., damaged or not damaged, a degree of damage, and the like) of the route. The trailing sensor is configured to be coupled to the vehicle system and to acquire additional, second inspection data that is indicative of the condition to the route subsequent to the leading sensor acquiring the first inspection data. The route examining unit is configured to be disposed onboard the vehicle system and to identify a section of interest in the route based on the first inspection data acquired by the leading sensor. The route examining unit also is configured to direct the trailing sensor to acquire the second inspection data within the section of interest in the route when the first inspection data indicates damage to the route in the section of interest.

In one aspect, the leading sensor is configured to be coupled with and acquire the first inspection data from a leading vehicle in the vehicle system and the trailing sensor is configured to be coupled with and acquire the second inspection data from a trailing vehicle in the vehicle system. The leading vehicle and the trailing vehicle are mechanically directly or indirectly interconnected with each other in the vehicle system such that, in at least one direction of travel of the vehicle system, the leading vehicle travels over the section of interest in the route before the trailing vehicle.

In one aspect, the leading sensor and the trailing sensor may be coupled to the same vehicle in the vehicle system.

In one aspect, the leading sensor is configured to acquire the first inspection data and the trailing sensor is configured to acquire the second inspection data during a single pass of the vehicle system over the section of interest in the route.

In one aspect, the first inspection data acquired by the leading sensor and the additional inspection data acquired by the trailing sensor are different types of inspection data.

In one aspect, the leading sensor is configured to acquire the first inspection data at a lower resolution level and the trailing sensor is configured to acquire the second inspection data at a greater resolution level. The resolution levels may represent how much inspection data is acquired per unit time, an amount of inspection data that is acquired during a pass of the respective sensor over the section of interest in the route, and the like.

In one aspect, the leading sensor is configured to be coupled to a leading locomotive and the trailing sensor is configured to be coupled to a trailing locomotive of the vehicle system.

In one aspect, the trailing sensor is configured to acquire the second inspection data responsive to the route examining unit determining that the first inspection data indicates the damage to the route.

In one aspect, the trailing sensor is configured to acquire the second inspection data only when the route examining unit determines that the first inspection data indicates the damage to the route.

In one aspect, the route examining unit is configured to determine when to direct the trailing sensor to begin acquiring the second inspection data based on a velocity of the vehicle system and a separation distance between the leading sensor and the trailing sensor.

In one aspect, the route examining unit is configured to communicate with a location determination system of the vehicle system to determine a location of the section of interest in the route and to direct the trailing sensor to being acquiring the second inspection data based on a velocity of the vehicle system and the location of the section of interest.

In one aspect, the route examining unit is configured to direct a controller of the vehicle system to at least one of autonomously control the vehicle system or direct an operator of the vehicle system to slow the vehicle system down upon determination that the first inspection data indicates damage to the route. The controller may be an onboard processing device that controls operations of the vehicle system or at least one of the vehicles.

In one aspect, the route examining unit is configured to direct a controller of the vehicle system to at least one of autonomously control the vehicle system or direct the operator such that the vehicle system travels faster over the section of interest when the leading sensor passes over the section of interest than when the trailing sensor passes over the section of interest. The controller may be an onboard processing device that controls operations of the vehicle system or at least one of the vehicles.

In one aspect, the route examining unit is configured to direct a controller of the vehicle system to at least one of autonomously control the vehicle system or direct an operator of the vehicle system to reduce slack in one or more coupler devices of the vehicle system between the trailing vehicle and one or more other vehicles in the vehicle system when the first inspection data indicates the damage to the route. The controller may be an onboard processing device that controls operations of the vehicle system or at least one of the vehicles.

In one aspect, the route examining unit is configured to transmit a notification signal to an off-board location responsive to identification of damage to the route based on one or more of the first inspection data and/or the second inspection data, the notification signal notifying the off-board location of at least one of a location of the damage to the route and/or a type of damage to the route.

In one aspect, the route examining unit is configured to transmit a warning signal to one or more other vehicles or vehicle systems responsive to identification of damage to the route based on one or more of the first inspection data and/or the second inspection data, the warning signal notifying the one or more other vehicles or vehicle systems of at least one of a location of the damage to the route and/or a type of damage to the route.

In another embodiment, a method (e.g., for acquiring inspection data of a route) includes acquiring first inspection data indicative of a condition of a route from a leading sensor coupled to a leading vehicle in a vehicle system as the vehicle system travels over the route, determining that the first inspection data indicates damage to the route in a section of interest in the route, and directing a trailing sensor coupled to a trailing vehicle of the vehicle system to acquire additional, second inspection data of the route when the first inspection data indicates the damage to the route. The leading vehicle and the trailing vehicle are mechanically directly or indirectly interconnected with each other in the vehicle system such that the leading vehicle passes over the section of interest of the route before the trailing vehicle.

In one aspect, acquiring the first inspection data and directing the trailing sensor to acquire the second inspection data occurs such that both the first inspection data and the second inspection data are acquired during a single pass of the vehicle system over the section of interest in the route.

In one aspect, the first inspection data acquired by the leading sensor and the second inspection data acquired by the trailing sensor are different types of inspection data.

In one aspect, acquiring the first inspection data is acquired at a first resolution level and the second inspection data is acquired at a second resolution level that is greater than the first resolution level. The resolution levels may represent how much inspection data is acquired per unit time, an amount of inspection data that is acquired during a pass of the respective sensor over the section of interest in the route, and the like.

In one aspect, directing the trailing sensor to acquire the second inspection data includes directing the trailing sensor when to acquire the second inspection data based on a velocity of the vehicle system and a separation distance between the leading sensor and the trailing sensor.

In one aspect, the method also includes slowing movement of the vehicle system responsive to determining that the first inspection data indicates the damage to the route.

In one aspect, the method also includes reducing slack in one or more coupler devices between the trailing vehicle and one or more other vehicles in the vehicle system responsive to determining that the first inspection data indicates the damage to the route.

In another embodiment, a sensing system includes a leading sensor, a trailing sensor, and a route examining unit. The leading sensor is configured to be coupled to a leading rail vehicle of a rail vehicle system that travels along a track. The leading sensor also is configured to acquire first inspection data indicative of a condition of the track in an examined section of the track as the rail vehicle system travels over the track. The trailing sensor is configured to be coupled to a trailing rail vehicle of the rail vehicle system and to acquire additional, second inspection data indicative of the condition to the track subsequent to the leading rail vehicle passing over the examined section of the track and the leading sensor acquiring the first inspection data. The route examining unit is configured to be disposed onboard the rail vehicle system. The route examining unit also is configured to direct the trailing sensor to acquire the second inspection data in the examined section of the track when the first inspection data indicates damage to the track such that both the leading sensor and the trailing sensor acquire the first inspection data and the second inspection data, respectively, of the examined section of the track during a single pass of the rail vehicle system over the examined section of the track.

In one aspect, the leading rail vehicle and the trailing rail vehicle are locomotives mechanically interconnected with each other by one or more railcars in the vehicle system.

In one aspect, the first inspection data acquired by the leading sensor and the second inspection data acquired by the trailing sensor are different types of inspection data.

In one aspect, the leading sensor is configured to acquire the first inspection data at a first resolution level and the trailing sensor is configured to acquire the second inspection data at a second resolution level that is greater than the first resolution level.

In one aspect, at least one of the route examining unit or the trailing sensor is configured to select the second resolution level, from among a plurality of available sensor resolution levels, based on at least one of a current speed of the vehicle system, a category of the damage, or a degree of the damage.

In one aspect, the trailing sensor is configured to acquire the second inspection data responsive to the route examining unit determining that the first inspection data indicates the damage to the track.

In one aspect, the route examining unit is configured to direct a controller of the vehicle system to at least one of autonomously control the rail vehicle system or direct an operator of the rail vehicle system to slow movement of the rail vehicle system down upon determination that the first inspection data indicates damage to the track. The controller may be an onboard processing device that controls operations of the vehicle system or at least one of the vehicles.

In one aspect, the route examining unit is configured to direct a controller of the vehicle system to at least one of autonomously control the rail vehicle system or direct an operator of the rail vehicle system to decrease slack in one or more coupler devices that couple the trailing rail vehicle with one or more other vehicles in the vehicle system when the first inspection data indicates the damage to the track. The controller may be an onboard processing device that controls operations of the vehicle system or at least one of the vehicles.

In one aspect, a sensing system comprises a leading sensor configured to be coupled to a leading rail vehicle of a rail vehicle system that travels along a track. The leading sensor is also configured to automatically acquire first inspection data indicative of a condition of the track in an examined section of the track as the rail vehicle system travels over the track. The first inspection data is acquired at a first resolution level. The sensing system further comprises a trailing sensor configured to be coupled to a trailing rail vehicle of the rail vehicle system and to automatically acquire additional, second inspection data indicative of the condition of the track subsequent to the leading rail vehicle passing over the examined section of the track and the leading sensor acquiring the first inspection data. The second inspection data is acquired at a second resolution level that is greater than the first resolution level. The leading rail vehicle and the trailing rail vehicle are directly or indirectly mechanically connected in the rail vehicle system. The sensing system further includes a route examining unit configured to be disposed onboard the rail vehicle system. The route examining unit is also configured to automatically direct the trailing sensor to acquire the second inspection data in the examined section of the track when the first inspection data indicates damage to the track, such that both the leading sensor and the trailing sensor acquire the first inspection data and the second inspection data, respectively, of the examined section of the track during a single pass of the rail vehicle system over the examined section of the track. In one aspect, the rail vehicle system may be a train, and the leading rail vehicle and the trailing rail vehicle may be first and second locomotives of the train.

In another embodiment, a sensing system includes a route examining unit that is configured to be disposed onboard a vehicle system that travels along a route. The route examining unit also is configured to receive first inspection data from a leading sensor configured to be coupled to a leading vehicle of the vehicle system as the vehicle system travels over the route. The first inspection data is indicative of a condition of the route in an examined section of the route. The route examining unit is further configured to identify damage in the examined section of the route based on the first inspection data and to direct a trailing sensor to acquire second inspection data in the examined section of the route responsive to identifying the damage. The trailing sensor is configured to be coupled to a trailing vehicle of the vehicle system that is indirectly or directly mechanically coupled to the leading vehicle.

In any of the embodiments set forth herein, data communicated to a vehicle in a vehicle consist may be used to control the vehicle for moving along a route, or otherwise for controlling a mechanical, electrical, or electro-mechanical system that is operated in relation to the vehicle moving along the route. That is, the data is received at the vehicle, and the vehicle is controlled, as relating to moving along the route, based on the informational content of the data.

In the context of "communication link" or "linked by a communication channel," "link"/"linked" refers to both physical interconnections for communication (such as over a cable, wire, or other conductor) and to wireless communications, using radio frequency or other wireless technologies.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to those of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter and also to enable any person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods for communicating data in a vehicle consist, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A system comprising:
   a first radio communication unit configured to be disposed onboard a first vehicle configured to travel on a road;
   a first electronic component configured to be disposed onboard the first vehicle and to process command data according to a first function to control operations of the first vehicle, the command data designating a throttle setting;
   a second radio communication unit configured to be disposed onboard a second vehicle configured to travel on a road, the first vehicle and the second vehicle traveling along the road together in a group formed by a wireless communication link between the first radio communication unit and the second radio communication unit;
   a second electronic component configured to be disposed onboard the second vehicle and to process the command data according to the first function to control operations of the second vehicle,
   wherein, responsive to the first electronic component entering a failure state, the second electronic component is configured to receive the command data from the first radio communication unit, to process the command data according to the first function to create processed data, to modify the processed data based on a distance between the first and second vehicle to create modified data, and to direct the second radio communication unit to communicate the modified data to the first vehicle.

2. The system of claim 1, wherein the first radio communication unit is configured to receive the command data to control movement of the first vehicle.

3. The system of claim 1, wherein the first radio communication unit and the second radio communication unit are configured to communicate the command data as network data.

4. The system of claim 1, wherein the first radio communication unit is configured to communicate the command data to the second electronic component via the second radio communication unit and the second electronic component is configured to generate return data by processing the command data according to a second function that is unavailable to the first electronic component, and the second radio communication unit is configured to communicate the return data back to the first radio communication unit.

* * * * *